US012684432B2

(12) United States Patent
Cirik et al.

(10) Patent No.: US 12,684,432 B2
(45) Date of Patent: Jul. 14, 2026

(54) BEAM FAILURE RECOVERY PROCEDURE IN CARRIER AGGREGATION

(71) Applicant: Comcast Cable Communications, LLC, Philadelphia, PA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/705,869

(22) Filed: Mar. 28, 2022

(65) Prior Publication Data

US 2022/0217592 A1      Jul. 7, 2022

Related U.S. Application Data

(63) Continuation of application No. 17/063,598, filed on Oct. 5, 2020, now Pat. No. 11,678,235, which is a
(Continued)

(51) Int. Cl.
*H04W 36/00* (2009.01)
*H04B 7/06* (2006.01)
(Continued)

(52) U.S. Cl.
CPC .... *H04W 36/0079* (2018.08); *H04B 7/06964* (2023.05); *H04B 7/088* (2013.01);
(Continued)

(58) Field of Classification Search
CPC ......... H04W 36/0079; H04W 36/0069; H04W 36/0072; H04W 36/0077; H04W 36/08;
(Continued)

(56) References Cited

U.S. PATENT DOCUMENTS 9,125,218 B2    9/2015  Chang
9,736,795 B2    8/2017  Dinan
(Continued)

FOREIGN PATENT DOCUMENTS

CN        108809580 A    11/2018
EP          3397015 A1    10/2018
(Continued)

OTHER PUBLICATIONS

R1-1801454 3GPP TSG RAN WG1 Meeting #92, Athens, Greece, Feb. 26-Mar. 2, 2018, Source: Huawei, HiSilicon, Title: Remaining issues on beam failure recovery.
(Continued)

*Primary Examiner* — Yaotang Wang
(74) *Attorney, Agent, or Firm* — Banner & Witcoff, Ltd.

(57) ABSTRACT

Wireless communications may comprise communications between a base station and a wireless device. A wireless device may perform a recovery procedure associated with a secondary cell and/or an access procedure associated with the secondary cell. Based on a deactivation condition associated with the secondary cell, the wireless device may abort the recovery procedure and/or the access procedure.

34 Claims, 37 Drawing Sheets

Related U.S. Application Data continuation of application No. 16/271,435, filed on Feb. 8, 2019, now Pat. No. 10,798,622.

(60) Provisional application No. 62/629,936, filed on Feb. 13, 2018, provisional application No. 62/628,609, filed on Feb. 9, 2018, provisional application No. 62/628,615, filed on Feb. 9, 2018.

(51) Int. Cl.
| | |
|---|---|
| *H04B 7/08* | (2006.01) |
| *H04W 36/08* | (2009.01) |
| *H04W 36/24* | (2009.01) |

(52) U.S. Cl.
CPC . *H04W 36/00692* (2023.05); *H04W 36/0077* (2013.01); *H04W 36/085* (2023.05); *H04W 36/249* (2023.05)

(58) Field of Classification Search
CPC .... H04W 76/15; H04W 76/19; H04B 7/0695; H04B 7/088
See application file for complete search history.

(56) References Cited

U.S. PATENT DOCUMENTS

| | | | |
|---|---|---|---|
| 9,949,298 | B1 | 4/2018 | Akoum et al. |
| 2010/0279700 | A1 | 11/2010 | Kim et al. |
| 2013/0039345 | A1 | 2/2013 | Kim et al. |
| 2013/0188580 | A1 | 7/2013 | Dinan |
| 2013/0250828 | A1 | 9/2013 | Chou et al. |
| 2015/0181461 | A1 | 6/2015 | Kim et al. |
| 2015/0189574 | A1 | 7/2015 | Ng et al. |
| 2015/0208462 | A1 | 7/2015 | Lee et al. |
| 2015/0365921 | A1 | 12/2015 | Wu |
| 2016/0302228 | A1 | 10/2016 | Kazmi et al. |
| 2017/0195998 | A1 | 7/2017 | Zhang et al. |
| 2017/0207843 | A1 | 7/2017 | Jung et al. |
| 2017/0332406 | A1 | 11/2017 | Islam et al. |
| 2017/0339662 | A1 | 11/2017 | Lin et al. |
| 2017/0373731 | A1 | 12/2017 | Guo et al. |
| 2018/0006770 | A1 | 1/2018 | Guo et al. |
| 2018/0054348 | A1 | 2/2018 | Luo et al. |
| 2018/0054382 | A1 | 2/2018 | Luo et al. |
| 2018/0054783 | A1 | 2/2018 | Luo et al. |
| 2018/0054811 | A1 | 2/2018 | Luo et al. |
| 2018/0054812 | A1 | 2/2018 | Luo et al. |
| 2018/0054832 | A1 | 2/2018 | Luo et al. |
| 2018/0083753 | A1 | 3/2018 | Nagaraja et al. |
| 2018/0098334 | A1 | 4/2018 | Tie et al. |
| 2018/0110066 | A1 | 4/2018 | Luo et al. |
| 2018/0115940 | A1 | 4/2018 | Abedini et al. |
| 2018/0115990 | A1 | 4/2018 | Abedini et al. |
| 2018/0124687 | A1 | 5/2018 | Park et al. |
| 2018/0132266 | A1 | 5/2018 | Chen et al. |
| 2018/0138962 | A1 | 5/2018 | Islam et al. |
| 2018/0176958 | A1 | 6/2018 | Islam et al. |
| 2018/0191422 | A1 | 7/2018 | Xia et al. |
| 2018/0219604 | A1 | 8/2018 | Lu et al. |
| 2018/0220448 | A1 | 8/2018 | Akkarakaran et al. |
| 2018/0227899 | A1 | 8/2018 | Yu et al. |
| 2018/0234960 | A1 | 8/2018 | Nagaraja et al. |
| 2018/0241452 | A1 | 8/2018 | Akkarakaran et al. |
| 2018/0249453 | A1 | 8/2018 | Nagaraja et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0278310 | A1 | 9/2018 | Lee et al. |
| 2018/0279150 | A1 | 9/2018 | He et al. |
| 2018/0279193 | A1 | 9/2018 | Park et al. |
| 2018/0279229 | A1 | 9/2018 | Dinan et al. |
| 2018/0288756 | A1 | 10/2018 | Xia et al. |
| 2018/0302889 | A1 | 10/2018 | Guo et al. |
| 2018/0310321 | A1 | 10/2018 | Basu Mallick et al. |
| 2018/0317123 | A1 | 11/2018 | Chen et al. |
| 2018/0323856 | A1 | 11/2018 | Xiong et al. |
| 2018/0324723 | A1 | 11/2018 | Akkarakaran et al. |
| 2018/0324867 | A1 | 11/2018 | Basu Mallick et al. |
| 2018/0343653 | A1 | 11/2018 | Guo |
| 2018/0351611 | A1 | 12/2018 | Nagaraja et al. |
| 2018/0367374 | A1 | 12/2018 | Liu et al. |
| 2018/0368126 | A1 | 12/2018 | Islam et al. |
| 2018/0368142 | A1 | 12/2018 | Liou |
| 2019/0028174 | A1 | 1/2019 | Chakraborty et al. |
| 2019/0037423 | A1 | 1/2019 | Yu et al. |
| 2019/0037498 | A1 | 1/2019 | Tseng et al. |
| 2019/0037604 | A1 | 1/2019 | Akkarakaran et al. |
| 2019/0059129 | A1 | 2/2019 | Luo et al. |
| 2019/0069322 | A1 | 2/2019 | Davydov et al. |
| 2019/0074882 | A1 | 3/2019 | Zhou et al. |
| 2019/0173740 | A1 | 6/2019 | Zhang et al. |
| 2019/0230545 | A1 | 7/2019 | Liou et al. |
| 2019/0268893 | A1 | 8/2019 | Tsai et al. |
| 2020/0076556 | A1 * | 3/2020 | Takahashi ............. H04L 5/0053 |
| 2020/0374960 | A1 * | 11/2020 | Deenoo ............. H04W 74/0833 |
| 2020/0389222 | A1 | 12/2020 | Wu et al. |
| 2021/0058129 | A1 | 2/2021 | Takeda et al. |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |

(56) References Cited

FOREIGN PATENT DOCUMENTS

| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R1-1801722 3GPP TSG RAN WG1 Meeting #92, Athens, Greece, Feb. 26-Mar. 2, 2018, Source: CATT, Title: Remaining issues on DL beam failure recovery.

R1-1802393 3GPP TSG RAN WG1 Meeting #92, Athens, Greece, Feb. 26-Mar. 2, 2018, Source: Intel Corporation, Title: On beam management issues for mutli-CC operation.

R1-1802397 3GPP TSG RAN WG1 Meeting #92, Athens, Greece, Feb. 26-Mar. 2, 2018, Source: Intel Corporation, Title: Remaining Issues on Beam Failure Recovery.

R1-1802472 3GPP TSG RAN WG1 Meeting #92, Athens, Greece, Feb. 26-Mar. 2, 2018, Source: NTT Docomo, Title: Remaining issues on beam recovery.

R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.

R1-1802593 3GPP TSG RAN WG1 Meeting #92, Athens, Greece, Feb. 26-Mar. 2, 2018, Source: AT&T, Title: In support of partial beam failure.

R1-1802744 3GPP TSG RAN WG1 Meeting #92, Athens, Greece, Feb. 26-Mar. 2, 2018, Source: Ericsson, Title: Remaining details on beam recovery.

R1-1802824 3GPP TSG RAN WG1 Meeting #92, Athens, Greece, Feb. 26-Mar. 2, 2018, Source: Qualcomm Incorporated, Title: Beam recovery procedures.

R1-1803362 3GPP TSG RAN WG1 Meeting #92, Athens, Greece, Feb. 26-Mar. 2, 2018, Source: MediaTek Inc., Title: Summary on Remaining issues on Beam Failure Recovery.

R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.

R1-1803745 3GPP TSG-RAN WG1 Meeting #92bis, Sanya, China, Apr. 16-20, 2018, Source: CATT, Title: Remaining Details on Beam Failure Recovery.

R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.

R1-1804363 3GPP TSG-RAN WG1 Meeting #92bis, Sanya, China, Apr. 16-20, 2018, Source: Samsung, Title: Simultaneous Reception of Physical Channels and Reference Signals.

R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.

R1-1804975 3GPP TSG-RAN WG1 Meeting #92bis, Sanya, China, Apr. 16-20, 2018, Source: Ericsson, Title: Remaining Issues on Beam Recovery.

R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.

R1-1805538 3GPP TSG-RAN WG1 Meeting #92bis, Sanya, China, Apr. 16-20, 2018, Source: NTT Docomo, Inc., Title: Offline Summary for AI 7.1.3.1.2 Search Space.

R1-1806616 3GPP TSG-RAN WG1 #93, Busan, Korea, May 21-25, 2018, Source: LG Electronics, Title: Remaining Issues on Search Space.

R1-1806729 3GPP TSG-RAN WG1 #93, Busan, Korea, May 21-25, 2018, Source: Samsung, Title: Corrections on Search Space Design.

R2-1707999 3GPP TSG-RAN WG2 #99, Berlin, Germany, Aug. 21-25, 2017, Source: MediaTek Inc., Title: Beam Management and Beam Recovery in MAC.

R2-1708677 3GPP TSG RAN WG2 #99, Berlin, Germany, Aug. 21-25, 2017, Source: Nokia, Nokia Shanghai Bell, Title: Beam Recovery in NR.

R2-1708697 3GPP TSG RAN WG2 #99, Berlin, Germany, Aug. 21-25, 2017, Source: Huawei, HiSilicon, Title: Handling of Resources for Beam Failure Recovery.

R2-1709085 3GPP TSG-RAN WG2 #99, Berlin, Germany, Aug. 21-25, 2017, Source: Qualcomm Incorporated, Title: Beam Recovery Request.

R2-1709320 3GPP TSG-RAN WG2 #99, Berlin, Germany, Aug. 21-25, 2017, Source: ASUSTek, Title: Discussion on Beam Recover Request in NR.

R2-1800042 3GPP TSG-RAN WG2 AH, Vancouver, Canada, Jan. 22-26, 2018, Source: ASUSTeK, Title: Discussion on Beam Failure Recovery Request in NR.

R2-1800049 3GPP TSG-RAN WG2 AH, Vancouver, Canada, Jan. 22-26, 2018, Source: ASUSTeK, Title: UE Behaviours Upon Beam Failure and Recovery.

R2-1800168 3GPP TSG-RAN WG2 AH, Vancouver, Canada, Jan. 22-26, 2018, Source: CATT, Title: Solution for PH Type Inconsistency Between RAN1 and RAN2.

R2-1800169 3GPP TSG-RAN WG2 AH, Vancouver, Canada, Jan. 22-26, 2018, Source: CATT, Title: PHR MAC CE for EN-DC.

R2-1800231 3GPP TSG-RAN WG2 #100, Reno, USA, Nov. 27-Dec. 1, 2017, Source: Xiaomi, Title: Consideration on PHR Trigger Condition for Supporting SUL.

R2-1800253 3GPP TSG-RAN WG2 AH, Vancouver, Canada, Jan. 22-26, 2018, Source: ASUSTeK, Title: Pathloss Change for Triggering PHR.

R2-1800254 3GPP TSG-RAN WG2 AH, Vancouver, Canada, Jan. 22-26, 2018, Source: CATT, Title: RA Procedure and Parameters for BFR.

R2-1800343 3GPP TSG-RAN WG2 AH, Vancouver, Canada, Jan. 22-26, 2018, Source: Ericsson, Title: PHR Format for SUL.

R2-1800614 3GPP TSG-RAN WG2 AH, Vancouver, Canada, Jan. 22-26, 2018, Source: Samsung, Title: Support for Type 2 PH in NR.

R2-1800619 3GPP TSG-RAN WG2 Ah, Vancouver, Canada, Jan. 22-26, 2018, Source: Samsung, Title: SUL and PHR.

R2-1800642 3GPP TSG-RAN WG2 AH, Vancouver, Canada, Jan. 22-26, 2018, Source: Huawei, HiSilicon, Title: PHR Alignment Between RAN1 and RAN2.

R2-1800680 3GPP TSG-RAN WG2 AH, Vancouver, Canada, Jan. 22-26, 2018, Source: Lenovo, Motorola Mobility, Title: PHR for NR CA.

R2-1800822 3GPP TSG-RAN WG2 AH, Vancouver, Canada, Jan. 22-26, 2018, Source: Spreadtrum Communications, Title: Beam Failure Recovery Clarification.

R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.

R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.

R2-1801041 3GPP TSG-RAN WG2 AH, Vancouver, Canada, Jan. 22-26, 2018, Source: Huawei, HiSilicon, Title: Remaining Issue of Power Management in NR.

R2-1801043 3GPP TSG-RAN WG2 AH, Vancouver, Canada, Jan. 22-26, 2018, Source: Huawei, HiSilicon, Title: Consideration of PHR with Multi-Beam Operation.

R2-1801404 3GPP TSG-RAN WG2 AH, Vancouver, Canada, Jan. 22-26, 2018, Source: NTT Docomo, Inc., Title: Discussion on Beam Failure Recovery.

R2-1801406 3GPP TSG-RAN WG2 AH, Vancouver, Canada, Jan. 22-26, 2018, Source: NTT Docomo, Inc., Title: Remaining Issue on PHR.

R2-1801539 3GPP TSG-RAN WG2 AH, Vancouver, Canada, Jan. 22-26, 2018, Source: CATT, Title: PHR MAC CE for EN-DC.

R2-1801540 3GPP TSG-RAN WG2 AH, Vancouver, Canada, Jan. 22-26, 2018, Source: CATT, Title: Correction on PHR MAC CE in EN-DC in TS38.321.

R2-1801564 3GPP TSG-RAN WG2 AH, Vancouver, Canada, Jan. 22-26, 2018, Source: NTT Docomo, Inc., Title: LS on PHR.

(56) References Cited

OTHER PUBLICATIONS

R2-1801568 3GPP TSG-RAN WG2 AH, Vancouver, Canada, Jan. 22-26, 2018, Source: Ran WG2, Title: LS on PHR.

R2-1801814 3GPP TSG-RAN WG2 #101, Athens, Greece, Feb. 26-Mar. 2, 2018, Source: Huawei, HiSilicon, Title: Beam Failure Recovery on SCell.

R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.

MCC Support: "Final Report of 3GPP TSG RAN WG1 #90bis v1.0.0 (Prague, Czech Rep, Oct. 9-13, 2017)" 3GPP Draft; FINAL_MINUTES_REPORT_RAN1#90B_V100, 3rd Generation Partnership Project (3GPP), Mobile Competence Centre; 650, Route Des Lucioles; F-06921 Sophia-Antipolis Cedex ; France vol. RAN WG1, No. Reno, USA; Nov. 27, 2017-Dec. 1, 2017 Nov. 24, 2017 (Nov. 24, 2017), XP051368768, Retrieved from the Internet: URL:http://www.3gpp.org/ftp/tsg%5Fran/WG1% 5FRL1/TSGR1%5F90b/Report/.

Samsung (Rapporteur): "General corrections on TS 38.321", 3GPP Draft; 38321_crucxxx_(REL-15)_R2-1801546, 3rd Generation Partnership Project (3GPP), Mobile Competence Centre; 650, Route Des Lucioles; F-06921 Sophia-Antipolis Cedex ; France vol. RAN WG2, No. Vancouver, Canada) Jan. 22, 2018-Jan. 26, 2018 Feb. 2, 2018 (Feb. 2, 2018), XP051401111, Retrieved from the Internet: URL:http://www.3gpp.org/ftp/tsg%5Fran/WG2% 5FRL2/TSGR2% 5FAHs/2018%5F01%5FNR/Docs/.

Dec. 13, 2022—EP Search Report—EP App. No. 22192976.3.

R1-1704478 3GPP TSG RAN WG1 Meeting #88bis, Spokane, USA, Apr. 3-7, 2017, Source: Fujitsu, Title: Discussion on beam failure recovery procedure.

R1-1704723 3GPP TSG RAN WG1 Meeting #88bis, Spokane, USA, Apr. 3-7, 2017, Source: Intel Corporation, Title: Details for UL Beam Management.

R1-1704725 3GPP TSG RAN WG1 Meeting #88bis, Spokane, USA, Apr. 3-7, 2017, Source: Intel Corporation, Title: On UE Initiated Beam Recovery.

R1-1705582 3GPP TSG RAN WG1 Meeting #88bis, Spokane, USA, Apr. 3-7, 2017, Source: Qualcomm Incorporated, Title: Beam recovery procedures.

R1-1705893 3GPP TSG RAN WG1 Meeting #88bis, Spokane, USA, Apr. 3-7, 2017, Source: Ericsson, Title: Beam failure detection and beam recovery actions.

R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.

R1-1706928 3GPP TSG RAN WG1 Meeting #89, Hangzhou, China, May 15-19, 2017, Source: Huawei, HiSilicon, Title: Beam management across multiple carriers.

R1-1707255 3GPP TSG RAN WG1 Meeting #89, Hangzhou, China, May 15-19, 2017, Source: Fujitsu, Title: Discussion on beam failure recovery procedure.

R1-1707356 3GPP TSG RAN WG1 Meeting #89, Hangzhou, China, May 15-19, 2017, Source: Intel Corporation, Title: Discussion for Mechanism to Recover from Beam Failure.

R1-1707477 3GPP TSG RAN WG1 Meeting #89, Hangzhou, China, May 15-19, 2017, Source: CATT, Title: Discussion on DL beam recovery.

R1-1707698 3GPP TSG RAN WG1 Meeting #89, Hangzhou, China, May 15-19, 2017, Source: Guangdong OPPO Mobile Telecom, Title: On Beam Recovery Mechanism.

R1-1707782 3GPP TSG RAN WG1 Meeting #89, Hangzhou, China, May 15-19, 2017, Source: Spreadtrum Communications, Title: Discussion on UE initiated recovery from beam failure.

R1-1707814 3GPP TSG RAN WG1 Meeting #89, Hangzhou, China, May 15-19, 2017, Source: NEC, Title: Low latency beam failure recovery by PRACH/PRACH-like.

R1-1707954 3GPP TSG RAN WG1 Meeting #89, Hangzhou, China, May 15-19, 2017, Source: Samsung, Title: Discussion on beam recovery procedure.

R1-1708678 3GPP TSG RAN WG1 Meeting #89, Hangzhou, China, May 15-19, 2017, Source: Ericsson, Title: Beam failure recovery mechanism.

R1-1708905 3GPP TSG RAN WG1 Meeting #89, Hangzhou, China, May 15-19, 2017, Source: Nokia, Alcatel-Lucent Shanghai Bell, Title: Beam Recovery.

R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.

R1-1710185 3GPP TSG RAN WG1 NR Ad-Hoc #2, Qingdao, China, Jun. 27-30, 2017, Source: ZTE, Title: Discussion on beam recovery mechanism.

R1-1710527 3GPP TSG RAN WG1 NR Ad-Hoc #2, Qingdao, China, Jun. 27-30, 2017, Source: Intel Corporation, Title: Discussion for mechanism to recover from beam failure.

R1-1710655 3GPP TSG RAN WG1 NR Ad-Hoc #2, Qingdao, China, Jun. 27-30, 2017, Source: Samsung, Title: Beam failure recovery.

R1-1714251 3GPP TSG RAN WG1 Meeting #90, Prague, Czech Republic, Aug. 21-25, 2017, Source: Nokia, Nokia Shanghai Bell, Title: Beam recovery in NR.

R1-1715468 3GPP TSG RAN WG1 Meeting NR#3, Nagoya, Japan, Sep. 18-21, 2017, Source: Huawei, HiSilicon, Title: Beam Failure Recovery Design Details.

R1-1715860 3GPP TSG RAN WG1 Meeting NR#3, Nagoya, Japan, Sep. 18-21, 2017, Source: LG Electronics, Title: Discussion on beam failure recovery.

R1-1800362 3GPP TSG RAN WG1 Meeting AH 1801, Vancouver, Canada, Jan. 22-26, 2018, Source: LG Electronics, Title: Clarification on PDCCH beam indication by higher-layers.

R1-1800363 3GPP TSG RAN WG1 Meeting AH 1801, Vancouver, Canada, Jan. 22-26, 2018, Source: LG Electronics, Title: Text proposals on UL beam management.

R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.

R1-1800401 3GPP TSG RAN WG1 Meeting AH 1801, Vancouver, Canada, Jan. 22-26, 2018, Source: Lenovo, Motorola Mobility, Title: Corrections on beam management.

R1-1800402 3GPP TSG RAN WG1 Meeting AH 1801, Vancouver, Canada, Jan. 22-26, 2018, Source: Lenovo, Motorola Mobility, Title: Corrections on beam failure recovery.

R1-1800432 3GPP TSG RAN WG1 Meeting AH 1801, Vancouver, Canada, Jan. 22-26, 2018, Source: Samsung, Title: Issues on beam management.

R1-1800433 3GPP TSG RAN WG1 Meeting AH 1801, Vancouver, Canada, Jan. 22-26, 2018, Source: Samsung, Title: Aperiodic beam reporting.

R1-1800434 3GPP TSG RAN WG1 Meeting AH 1801, Vancouver, Canada, Jan. 22-26, 2018, Source: Samsung, Title: Issues on beam failure recovery.

R1-1800472 3GPP TSG RAN WG1 Meeting AH 1801, Vancouver, Canada, Jan. 22-26, 2018, Source: Samsung, Title: PHR for CA.

R1-1800498 3GPP TSG RAN WG1 Meeting AH 1801, Vancouver, Canada, Jan. 22-26, 2018, Source: OPPO, Title: Text Proposal for Beam Management.

R1-1800499 3GPP TSG RAN WG1 Meeting AH 1801, Vancouver, Canada, Jan. 22-26, 2018, Source: OPPO, Title: Text Proposal for Beam Failure Recovery.

R1-1715941 3GPP TSG RAN WG1 Meeting NR#3, Nagoya Japan, Sep. 18-21, 2017, Source: Samsung, Title: Beam Failure recovery.

R1-1716295 3GPP TSG RAN WG1 Meeting NR#3, Nagoya, Japan, Sep. 18-21, 2017, Source: Intel Corporation, Title: Remaining Issues on Beam Failure Recovery.

R1-1716397 3GPP TSG RAN WG1 Meeting NR#3, Nagoya, Japan, Sep. 18-21, 2017, Source: Qualcomm Incorporated, Title: Beam recovery procedure.

R1-1716500 3GPP TSG RAN WG1 Meeting NR#3, Nagoya, Japan, Sep. 18-21, 2017, Source: Nokia, Nokia Shanghai Bell, Title Beam Recovery in NR.

R1-1716469 3GPP TSG RAN WG1 Meeting NR#3, Nagoya, Japan, Sep. 18-21, 2017: Source: InterDigital, Inc., Title: Remaining issues on beam recovery.

(56) References Cited

OTHER PUBLICATIONS

R1-1717302 3GPP TSG RAN WG1 Meeting #90bis, Prague, Czech Republic, Oct. 9-13, 2017, Source: Huawei, HiSilicon Title: Beam failure recovery design details.

R1-1717369 3GPP TSG RAN WG1 Meeting #90bis, Prague, Czech Republic, Oct. 9-13, 2017, Source: Intel Corporation, Title: Remaining Issues on Beam Failure Recovery.

R1-1717473 3GPP TSG RAN WG1 Meeting #90bis, Prague, Czech Republic, Oct. 9-13, 2017, Source: vivo, Title: Discussion on beam failure recovery.

R1-1717606 3GPP TSG RAN WG1 Meeting #90bis, Prague, Czech Republic, Oct. 9-13, 2017, Source: Samsung, Title: Beam failure recovery.

R1-1717942 3GPP TSG RAN WG1 Meeting #90bis, Prague, Czech Republic, Oct. 9-13, 2017, Source: LG Electronics, Title: Discussion on beam failure recovery.

R1-1718010 3GPP TSG RAN WG1 Meeting #90bis, Prague, Czech Republic, Oct. 9-13, 2017, Source: NEC, Title: Discussion on Beam Failure Recovery.

R1-1718055 3GPP TSG RAN WG1 Meeting #90bis, Prague, Czech Republic, Oct. 9-13, 2017, Source: OPPO, Title: Discussion on Beam Recovery Mechanism.

R1-1718193 3GPP TSG RAN WG1 Meeting #90bis, Prague, Czech Republic, Oct. 9-13, 2017, Source: NTT Docomo, Title: Views on beam recovery.

R1-1718389 3GPP TSG RAN WG1 Meeting #90bis, Prague, Czech Republic, Oct. 9-13, 2017, Source: AT&T, Title: Beam Recovery for Full and Partial Control Channel Failure.

R1-1718512 3GPP TSG RAN WG1 Meeting #90bis, Prague, Czech Republic, Oct. 9-13, 2017, Source: Nokia, Nokia Shanghai Bell, Title: Beam Recovery in NR.

R1-1718542 3GPP TSG RAN WG1 Meeting #90bis, Prague Czech Republic, Oct. 9-13, 2017, Source: Qualcomm Incorpated, Title: Beam recovery procedure.

R1-1719423 3GPP TSG RAN WG1 Meeting #91, Reno, USA, Nov. 27-Dec. 1, 2017, Source: Huawei, HiSilicon, Title: Remaining details on beam failure recovery.

R1-1719619 3GPP TSG RAN WG1 Meeting #91, Reno, USA, Nov. 27-Dec. 1, 2017, Source: Fujitsu, Title: Discussion on beam failure recovery.

R1-1719633 3GPP TSG RAN WG1 Meeting #91, Reno, USA, Nov. 27-Dec. 1, 2017, Source: AT&T, Title: Remaining Details on Mechanisms to Recover from Beam Failure.

R1-1719695 3GPP TSG RAN WG1 Meeting #91, Reno, USA, Nov. 27-Dec. 1, 2017, Source: Spreadtrum Communications, Title: Remaining issues on beam failure recovery mechanism.

R1-1719770 3GPP TSG RAN WG1 Meeting #91, Reno, USA, Nov. 27-Dec. 1, 2017, Source: vivo, Title: Remaining details on mechanism to recover from beam failure.

R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.

R1-1719908 3GPP TSG RAN WG1 Meeting #91, Reno, USA, Nov. 27-Dec. 1, 2017, Source: LG Electronics, Title: Discussion on beam failure recovery.

R1-1719988 3GPP TSG RAN WG1 Meeting #91, Reno, USA, Nov. 27-Dec. 1, 2017, Source: Discussion on Beam Recovery Mechanism.

R1-1720072 3GPP TSG RAN WG1 Meeting #91, Reno, USA, Nov. 27-Dec. 1, 2017, Source: Intel Corporation, Title: Remaining Issues on Beam Failure Recovery.

R1-1720291 3GPP TSG RAN WG1 Meeting #91, Reno, USA, Nov. 27-Dec. 1, 2017, Source Samsung, Title: Beam failure recovery.

R1-1720305 3GPP TSG RAN WG1 Meeting #91, Reno, USA, Nov. 27-Dec. 1, 2017, Source: Samsung, Title: Discussion on cross-carrier beam management.

R1-1720574 3GPP TSG RAN WG1 Meeting #91, Reno, USA, Nov. 27-Dec. 1, 2017, Source: NEC, Title: On Partial Beam Failure Recovery.

R1-1720631 3GPP TSG RAN WG1 Meeting #91, Reno, USA, Nov. 27-Dec. 1, 2017, Source: InterDigital, Inc., Title: Remaining issues on beam recovery.

R1-1720804 3GPP TSG RAN WG1 Meeting #91, Reno, USA, Nov. 27-Dec. 1, 2017, Source: NTT Docomo, Title: Remaining issue on beam recovery.

R1-1720891 3GPP TSG RAN WG1 Meeting #91, Reno, USA, Nov. 27-Dec. 1, 2017, Source: Nokia, Nokia Shanghai Bell, Title: Beam Recovery in NR.

R1-1721523 3GPP TSG RAN WG1 Meeting #91, Reno, USA, Nov. 27-Dec. 1, 2017, Source: NTT Docomo, Samsung, Mediatek, AT&T, ZTE, Intel, Huawei, CATT, Qualcomm, Fujitsu, Spreadtrum, Title: WF for handling partial beam failure.

R1-1721673 3GPP TSG RAN WG1 Meeting #91, Reno, USA, Nov. 27-Dec. 1, 2017, Source: NTT Docomo, Intel, Huawei, NEC, Spreadtrum, Mediatek, China Telecom, AT&T, Samsung, ZTE, CATT, Qualcomm, Fujitsu, Nokia, Title: WF for handling partial beam failure.

R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.

R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.

R1-1800110 3GPP TSG RAN WG1 Meeting Ad Hoc, Vancouver, Canada, Jan. 22-26, 2018, Source: ZTE, Sanechips, Title: Remaining details on bean management.

R1-1800111 3GPP TSG RAN WG1 Meeting Ad Hoc, Vancouver, Canada, Jan. 22-26, 2018, Source: ZTE, Sanechips, Title: Remaining details on mean management.

R1-1800312 3GPP TSG RAN WG1 Meeting Ad Hoc, Vancouver, Canada, Jan. 22-26, 2018, Source: Intel Corporation, Title: Remaining Issues on Beam Failure Recovery.

R1-1800526 3GPP TSG RAN WG1 Meeting Ad Hoc, Vancouver, Canada, Jan. 22-26, 2018, Source: Huawei, HiSilicon, Title: Remaining details of PHR.

R1-1800542 3GPP TSG RAN WG1 Meeting Ad Hoc, Vancouver, Canada, Jan. 22-26, 2018, Source: CMCC, Title: Discussion on remaining issues for beam indication.

R1-1800543 3GPP TSG RAN WG1 Meeting Ad Hoc, Vancouver, Canada, Jan. 22-26, 2018, Source: CMCC, Title: Discussion on beam recovery mechanism.

R1-1800582 3GPP TSG RAN WG1 Meeting Ad Hoc, Vancouver, Canada, Jan. 22-26, 2018, Source: AT&T, Title: TCI states configuration design to support dynamic BWP switching.

R1-1800583 3GPP TSG RAN WG1 Meeting Ad Hoc, Vancouver, Canada, Jan. 22-26, 2018, Source: AT&T, Title: In support of partial beam failure.

R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.

R1-1800629 3GPP TSG RAN WG1 Meeting Ad Hoc, Vancouver, Canada, Jan. 22-26, 2018, Source: InterDigital, Inc., Title: Remaining details on beam failure recovery.

R1-1800642 3GPP TSG RAN WG1 Meeting Ad Hoc, Vancouver, Canada, Jan. 22-26, 2018, Source: ITRI, Title: Discussion on timer for beam failure recovery.

R1-1800660 3GPP TSG RAN WG1 Meeting Ad Hoc, Vancouver, Canada, Jan. 22-26, 2018, Source: NTT Docomo, Title: Remaining Issue on Beam Indication.

R1-1800661 3GPP TSG RAN WG1 Meeting Ad Hoc, Vancouver, Canada, Jan. 22-26, 2018, Source: NTT Docomo, Title: Remaining issue on beam recovery.

R1-1800682 3GPP TSG RAN WG1 Meeting Ad Hoc, Vancouver, Canada, Jan. 22-26, 2018, Source: NTT Docomo, Inc., Title: Remaining issues on PHR.

R1-1800699 3GPP TSG RAN WG1 Meeting Ad Hoc, Vancouver, Canada, Jan. 22-26, 2018, Source: Ericsson, Title: Remaining details on beam management.

R1-1800700 3GPP TSG RAN WG1 Meeting Ad Hoc, Vancouver, Canada, Jan. 22-26, 2018, Source: Ericsson, Title: Remaining details and corrections for beam recovery.

(56) References Cited

OTHER PUBLICATIONS

R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT Docomo, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101bis, Sanya, China, Apr. 16-20, 2018, Source: Spreadtrum Communications, Title: Beam Failure recovery on SCell.

R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 mailing date Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.

(56) References Cited

OTHER PUBLICATIONS

R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www. mymowireless.com.
Jul. 16, 2019—European Extended Search Report—EP 19166184. 2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.

R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CES.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC Impacts on supporting BFR procedure on SCell.
R2-1807444 3GPP TSG RAN WG2 Meeting #102, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining Issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.

(56)     References Cited

OTHER PUBLICATIONS

R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018. 1.
Dec. 20, 2019—European Extended Search Report—EP 19199208. 0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTek, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658. 6.
Dec. 10, 2020—European Office Action—EP 19156175.2.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.

R2-1804763 3GPP TSG-RAN WG2 Meeting #101bis, Sanya, China, Apr. 16-20, 2018, Source: Nokia, Nokia Shanghai Bell, Title: Running MAC CR for euCA.
R1-180XXXX 3GPP TSG-RAN WG1 Meeting #94, Gothenburg, Sweden, Aug. 20-24, 2018, Source: NTT Docomo, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining ssues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining Issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.

(56) References Cited

OTHER PUBLICATIONS

R2-1802143 3GPP TSG-RAN WG2 #101, Athens, Greece, Feb. 26-Mar. 2, 2018, Source: CATT, Title: RACH eattempt considering beam selection.

R2-1802151 3GPP TSG-RAN WG2 #101, Athens, Greece, Feb. 26-Mar. 2, 2018, Source: CATT, Title: Beam failure recovery.

R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.

R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.

R2-1803564 3GPP TSG RAN WG2 Meeting #101, Athens, Greece, Feb. 26-Mar. 2, 2018, Source: Qualcomm Incorporated, Title: Dormant BWP for fast SCell activation.

R2-1804279 3GPP TSG-RAN WG2 Meeting #101, Sanya, China, Apr. 16-20, 2018, Source: ASUSTek, Title: UE behaviours upon beam failure and recovery.

R2-1804303 3GPP TSG-RAN WG2 Meeting #101, Sanya, China, Apr. 16-20, 2018, Source: Samsung, Title: MAC Impacts: Beam Failure Recovery for SCell.

R2-1804407 3GPP TSG-RAN WG2 Meeting #101, Sanya, China, Apr. 16-20, 2018, Source: ZTE, Sanechips, Title: Consideration on beam failure recovery for SCell.

R2-1804410 3GPP TSG-RAN WG2 Meeting #101, Sanya, China, Apr. 16-20, 2018, Source: Huawei, HiSilicon, Title: Beam failure recovery using MAC CE.

R2-1804411 3GPP TSG-RAN WG2 Meeting #101, Sanya, China, Apr. 16-20, 2018, Source: Huawei, HiSilicon, Title: BWP issues for BFR.

R2-1804434 3GPP TSG-RAN WG2 Meeting #101, Sanya, China, Apr. 16-20, 2018, Source: OPPO, Title: Issues on supporting SCell BFR RACH.

R2-1804481 3GPP TSG-RAN WG2 Meeting #101, Sanya, China, Apr. 16-20, 2018, Source: CATT, Title: Leftover Issues for BFR.

R2-1804482 3GPP TSG-RAN WG2 Meeting #101, Sanya, China, Apr. 16-20, 2018, Source: CATT, Title: BFR configurations and fallback options.

R2-1804483 3GPP TSG-RAN WG2 Meeting #101, Sanya, China, Apr. 16-20, 2018, Source: CATT, Title: BFR on SCell.

R2-1804696 3GPP TSG-RAN WG2 Meeting #101, Sanya, China, Apr. 16-20, 2018, Source: vivo, Title: Discussion on the SCell BFR.

R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.

R2-1805414 3GPP TSG-RAN WG2 Meeting #101, Sanya, China, Apr. 16-20, 2018, Source: Ericsson, Title: Beam Failure Recovery in SCell and contention-based BFR on SpCell.

R2-1805896 3GPP TSG-RAN WG2 Meeting #101, Sanya, China, Apr. 16-20, 2018, Source: Huawei, HiSilicon, Title: ASN. 1 for Beam Failure Recovery.

R2-1805905 3GPP TSG-RAN WG2 Meeting #101, Sanya, China, Apr. 16-20, 2018, Source: Huawei, HiSilicon, Title: Discussions on RA for SCells BFR.

R2-1802554 3GPP TSG-RAN WG2 #101, Athens, Greece, Feb. 26-Mar. 2, 2018, Source: ASUSTeK, Title: Discussion on Beam Failure Recovery Request in NR.

R2-1803195 3GPP TSG-RAN WG2 #101, Athens, Greece, Feb. 26-Mar. 2, 2018, Source: Ericsson, Title: Beam Failure Recovery in Scell.

R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.

R2-18006164 3GPP TSG-RAN WG2 Meeting #101bis, Sanya, China, Apr. 16-20, 2018, Source: Media Tek Inc., Title: On Parallel SR and RACH Procedure in NR.

R1-170xxxx 3GPP TSG RAN WG1 Meeting #88b, Spokane, USA, Apr. 3-7, 2017, Source: Huawei, HiSilicon, Title: WF on Beam Failure Recovery.

R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.

R1-1704230 3GPP TSG RAN WG1 Meeting #88b, Spokane, USA, Apr. 3-7, 2017, Source: Huawei, HiSilicon, Title: Link recovery procedure for beam failure.

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).

3GPP TSG RAN WG1 Meeting #90, Prague, Czech Republic, Aug. 21-25, 2017, Title: RAN1 Chairman's Notes.

R1-1705719 3GPP TSG RAN WG1 Meeting #88bis, Spokane, USA, Apr. 3-7, 2017, Source: NTT Docomo, Inc., Title: Further views on mechanism to recover from beam failure.

R1-1711016 3GPP TSG RAN WG1 #89AH-NR, Qingdao, China, Jun. 27-30, 2017, Source: Ericsson, Title: UL beam management details.

R1-1712223 3GPP TSG RAN WG1 Meeting #90, Prague, Czech Republic, Aug. 21-25, 2017, Source: Huawei, HiSilicon, Title: UL beam management.

R1-1712224 3GPP TSG RAN WG1 Meeting #90, Prague, Czech Republic, Aug. 21-25, 2017, Source: Huawei, HiSilicon, Title: Procedure details for beam failure recovery.

R1-1712268 3GPP TSG RAN WG1 Meeting #90, Prague, Czech Republic, Aug. 21-25, 2017, Source: Xinwei, Title: Discussion on beam failure recovery.

R1-1712299 3GPP TSG RAN WG1 Meeting #90, Prague, Czech Republic, Aug. 21-25, 2017, Source: ZTE, Title: UL beam management for NR MIMO.

R1-1712378 3GPP TSG RAN WG1 Meeting #90, Prague, Czech Republic, Aug. 21-25, 2017, Source: CATT, Title: Considerations on UL beam management.

R1-1712379 3GPP TSG RAN WG1 Meeting #90, Prague, Czech Republic, Aug. 21-25, 2017, Source: CATT, Title: Beam failure detection and recovery.

R1-1712551 3GPP TSG RAN WG1 Meeting #90, Prague, Czech Republic, Aug. 21-25, 2017, Source: Intel Corporation, Title: Details for UL beam management.

R1-1712552 3GPP TSG RAN WG1 Meeting #90, Prague, Czech Republic, Aug. 21-25, 2017, Source: Intel Corporation, Title: Discussion for mechanism to recover from beam failure.

R1-1721672 3GPP TSG RAN WG1 Meeting #90, Prague, Czech Republic, Aug. 21-25, 2017, Source: Lenovo, Motorola Mobility, Title: Discussion of beam failure recovery.

R1-1712713 3GPP TSG RAN WG1 Meeting #90, Prague, Czech Republic, Aug. 21-25, 2017, Source: AT&T, Title: Mechanisms to recover from beam failure.

R1-1712838 3GPP TSG RAN WG1 Meeting #90, Prague, Czech Republic, Aug. 21-25, 2017, Source: Vivo, Title: Discussion on uplink beam management.

R1-1712966 3GPP TSG RAN WG1 Meeting #90, Prague, Czech Republic, Aug. 21-25, 2017, Source: Sony, Title: Considerations on UL beam management.

R1-1713287 3GPP TSG RAN WG1 Meeting #90, Prague, Czech Republic, Aug. 21-25, 2017, Source: Guangdong OPPO Mobile Telecom, Title: Discussion on the UL beam management.

R1-1713596 3GPP TSG RAN WG1 Meeting #90, Prague, Czech Republic, Aug. 21-25, 2017, Source: Samsung, Title: Discussion on UL beam management.

R1-1714143 3GPP TSG RAN WG1 Meeting #90, Prague, Czech Republic, Aug. 21-25, 2017, Source: InterDigital, Inc., Title: On efficient UL beam management.

R1-1714250 3GPP TSG RAN WG1 Meeting #90, Prague, Czech Republic, Aug. 21-25, 2017, Source: Nokia, Nokia Shanghai Bell, Title: SRS transmission for beam management.

R1-1714292 3GPP TSG RAN WG1 Meeting #90, Prague, Czech Republic, Aug. 21-25, 2017, Source: Ericsson, Title: On UL beam management.

R1-1714383 3GPP TSG RAN WG1 Meeting #90, Prague, Czech Republic, Aug. 21-25, 2017, Source: ASUSTek, Title: Considerations on UE Beamforming Management.

(56) References Cited

OTHER PUBLICATIONS

3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5Qls for URLLC.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.

* cited by examiner

User Plane Protocol Stack

Control Plane Protocol Stack

| Index | LCID values |
|---|---|
| 000000 | CCCH |
| 000001-100000 | Identity of a logical channel |
| 100001-110111 | Reserved |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18A

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

BEAM FAILURE RECOVERY PROCEDURE IN CARRIER AGGREGATION

CROSS-REFERENCE TO RELATED APPLICATIONS

This application is a continuation of U.S. application Ser. No. 17/063,598, filed Oct. 5, 2020, which is a continuation of U.S. application Ser. No. 16/271,435, filed Feb. 8, 2019, now U.S. Pat. No. 10,798,622, which claims the benefit of U.S. Provisional Application No. 62/628,615, titled "Beam Failure Recovery Procedure in Carrier Aggregation" and filed on Feb. 9, 2018; U.S. Provisional Application No. 62/628,609, titled "Monitoring Beam Failure Recovery Request Response in Carrier Aggregation" and filed on Feb. 9, 2018; and U.S. Provisional Application No. 62/629,936, titled "Resource Association for Beam Failure Recovery Transmission in Carrier Aggregation" and filed on Feb. 13, 2018. Each of the above-referenced applications is hereby incorporated by reference in its entirety.

BACKGROUND

Wireless communications may incur beam failures. An insufficient response to a beam failure may decrease the reliability of a wireless device. It is desired to improve wireless communications by improving responses to beam failures without adversely increasing signaling overhead or interference, increasing power consumption, and/or decreasing spectral efficiency.

SUMMARY

The following summary presents a simplified summary of certain features. The summary is not an extensive overview and is not intended to identify key or critical elements.

Systems, apparatuses, and methods are described for enhanced beam failure recovery procedures, including beam failure recovery (BFR) procedures of a secondary cell. A wireless device may initiate a random access procedure associated with a primary cell, for example, if it detects a beam failure of a secondary cell. If the secondary cell is deactivated, the wireless device may abort the random access procedure associated with the primary cell The base station may introduce an association between random access resources for the BFR procedure of the secondary cell and one or more candidate beams of the secondary cell such that the base station may distinguish the candidate beam selected by the wireless device for the secondary cell BFR procedure. By using a particular control resource set, the wireless device can inform the base station of a candidate beam selection.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 17A and FIG. 17B show examples of uplink/downlink (UL/DL) MAC protocol data unit (PDU).

FIG. 18A and FIG. 18B show examples of logical channel identifiers (LCIDs).

DETAILED DESCRIPTION

Figure 1:
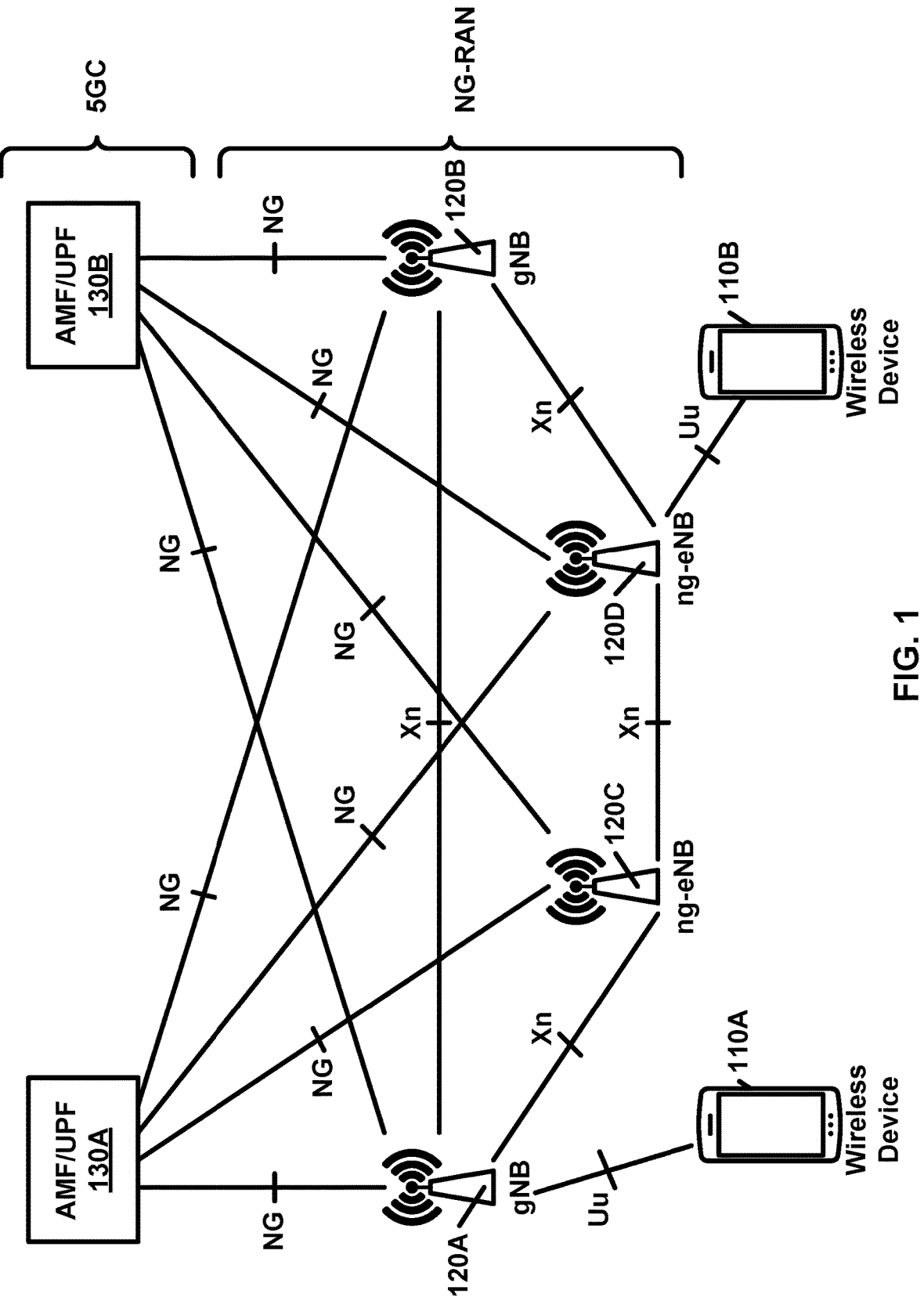
FIG. 1 shows a diagram of an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying

US 12,684,432 B2

5

RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., an gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
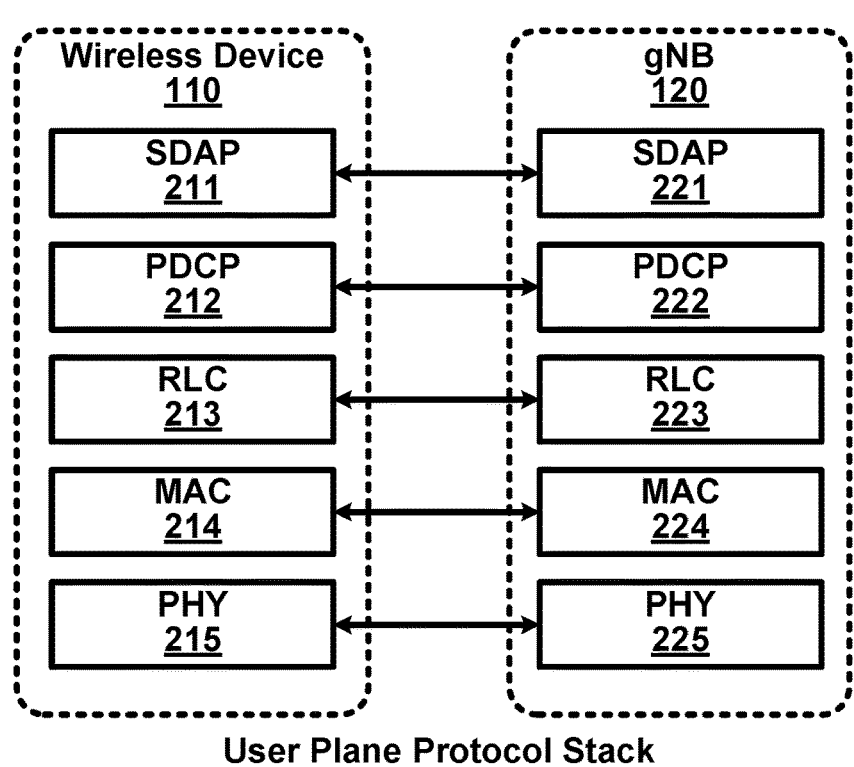
FIG. 2A shows a diagram of an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
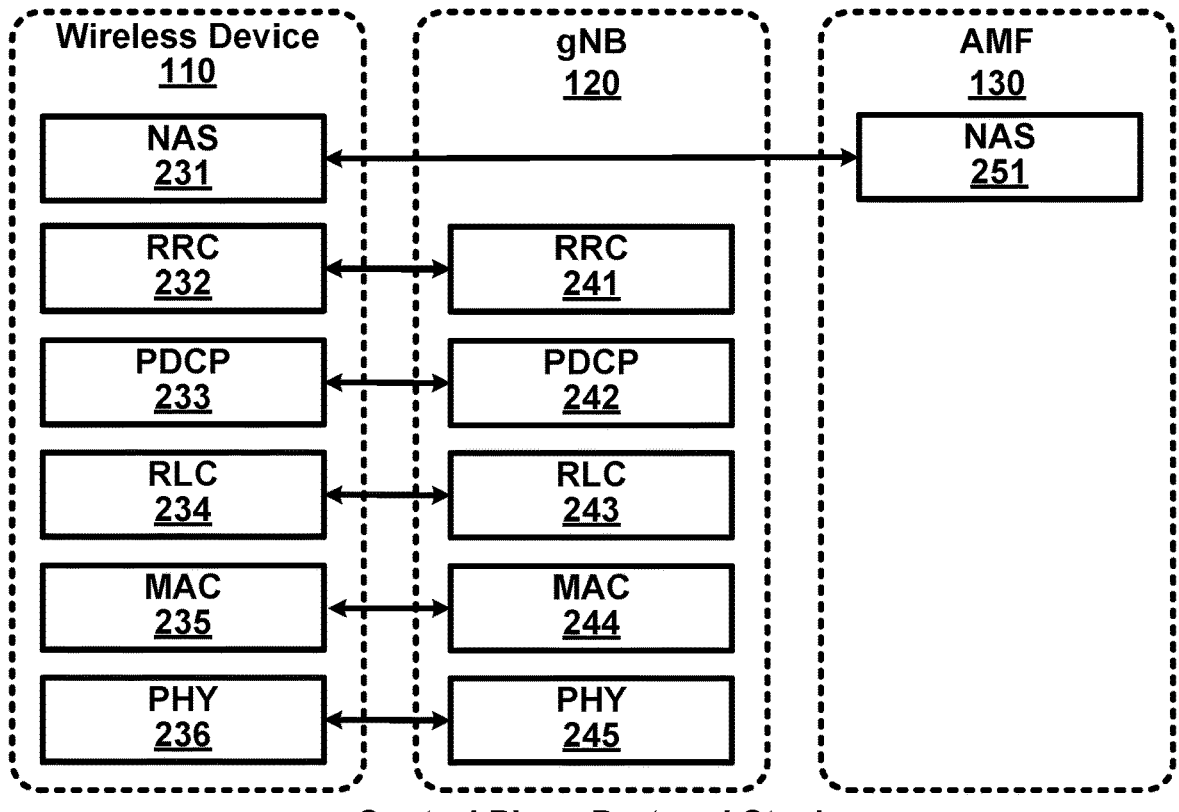
FIG. 2B shows a diagram of an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
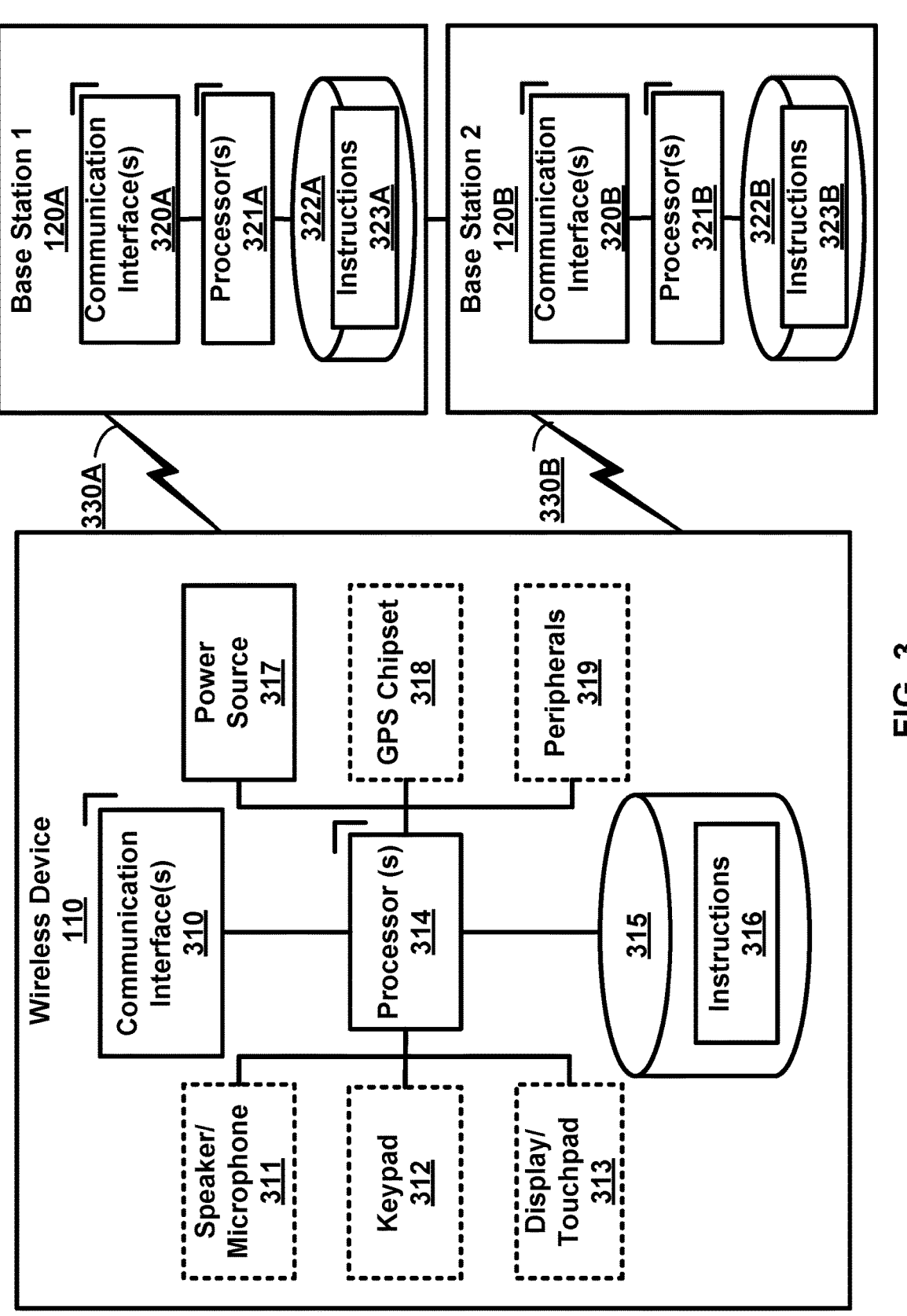
FIG. 3 shows a diagram of an example wireless device and two base stations.

FIG. 3 shows a diagram of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and System-InformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to a E-UTRAN. The RRC-ConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc) may comprise one or more communication interfaces, one or more processors, and memory storing instructions.

A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figures 4A, 4B, 4C, 4D:
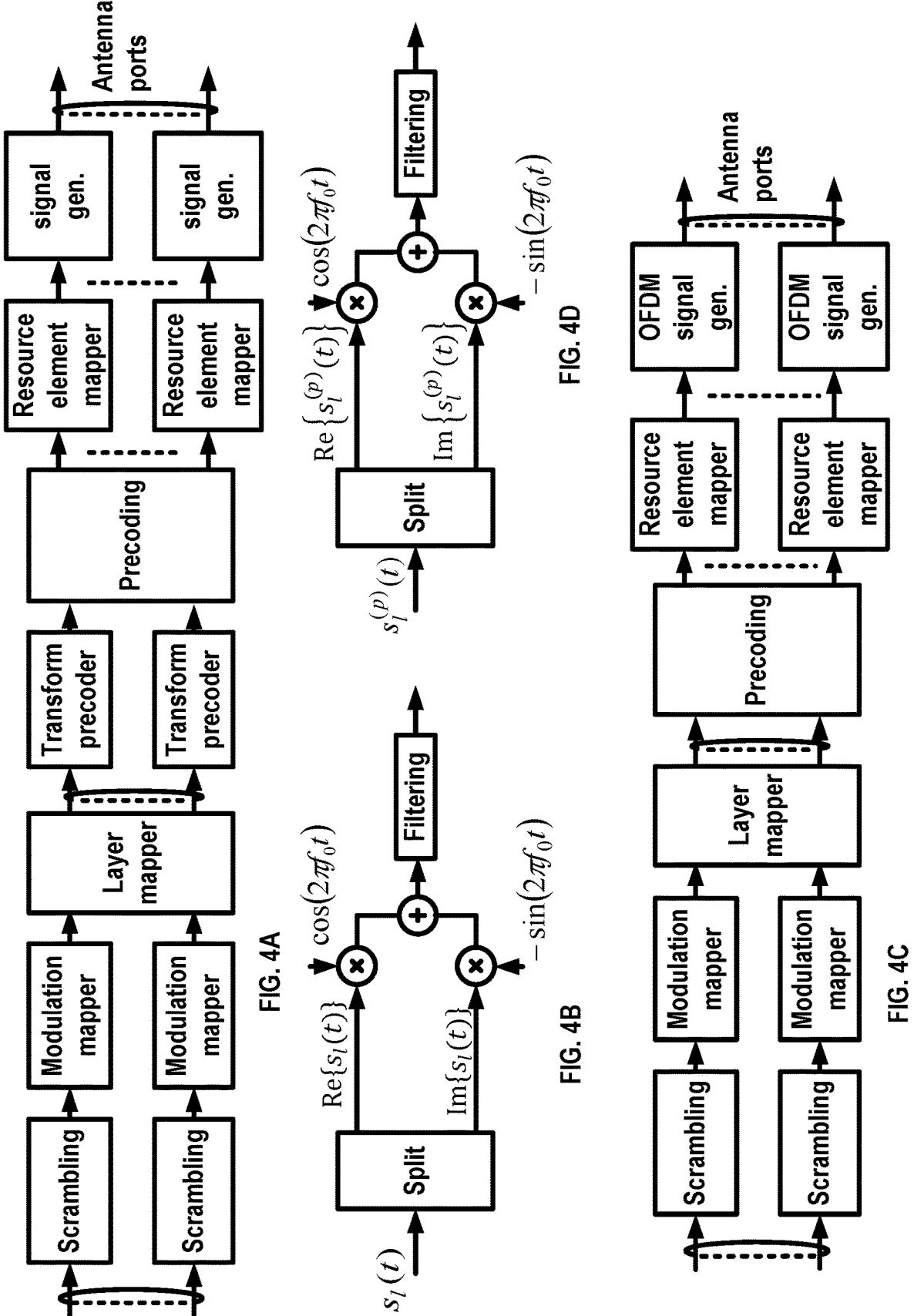
FIG. 4A, FIG. 4B, FIG. 4C and FIG. 4D show example diagrams for uplink and downlink signal transmission.

FIG. 4A, FIG. 4B, FIG. 4C and FIG. 4D show example diagrams for uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. An CP-OFDM signal for uplink transmission may be generated by FIG. 4A, for example, if transform precoding is not enabled. These functions are shown as examples and it is anticipated that other mechanisms may be implemented in various embodiments.

FIG. 4B shows an example for modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example for downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and it is anticipated that other mechanisms may be implemented in various other examples.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
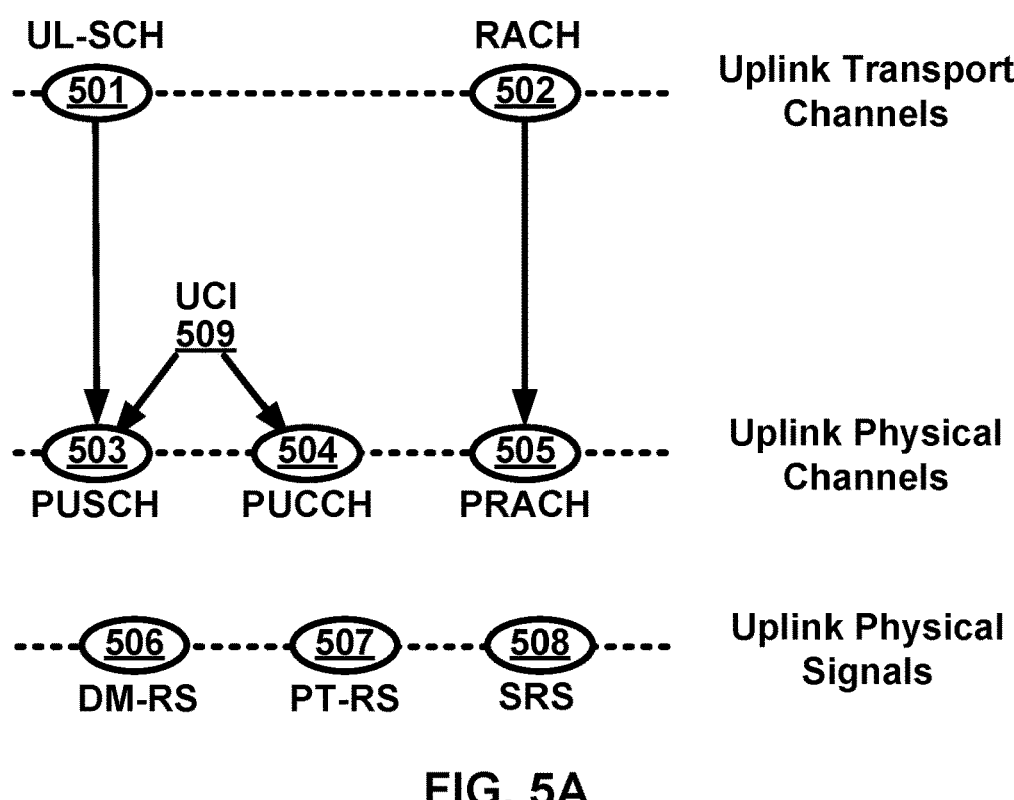
FIG. 5A shows a diagram of an example uplink channel mapping and example uplink physical signals.

FIG. 5A shows a diagram of an example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. The uplink PT-RS 507 may be confined in the scheduled time/frequency duration for a wireless device.

a wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
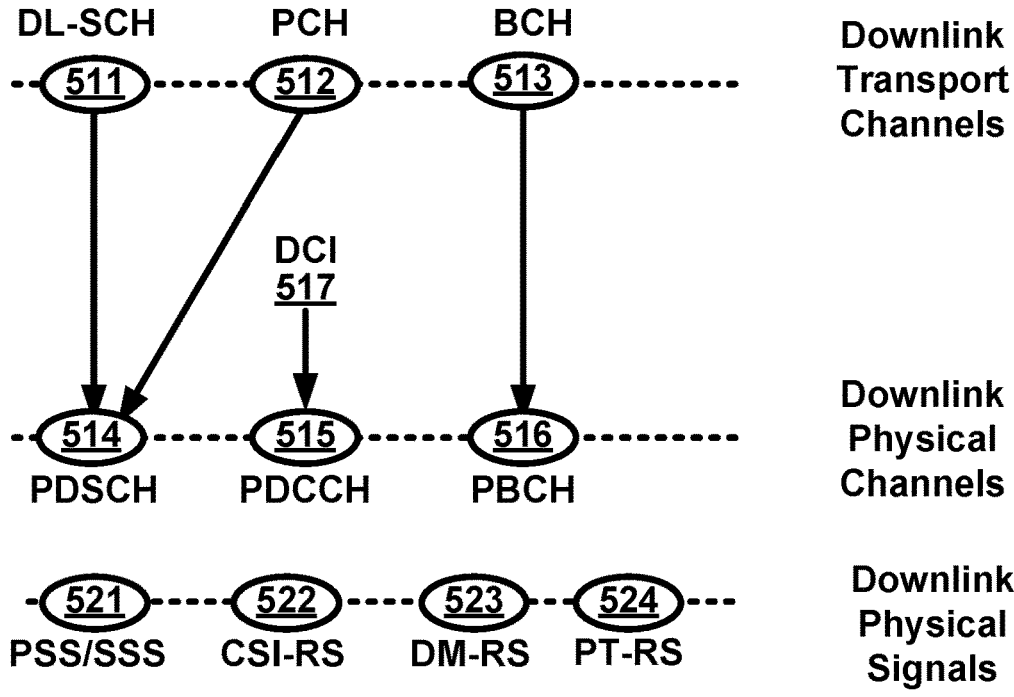
FIG. 5B shows a diagram of an example downlink channel mapping and example downlink physical signals.

FIG. 5B shows a diagram of an example downlink channel mapping and a downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more reference signals (RSs) may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers.

A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
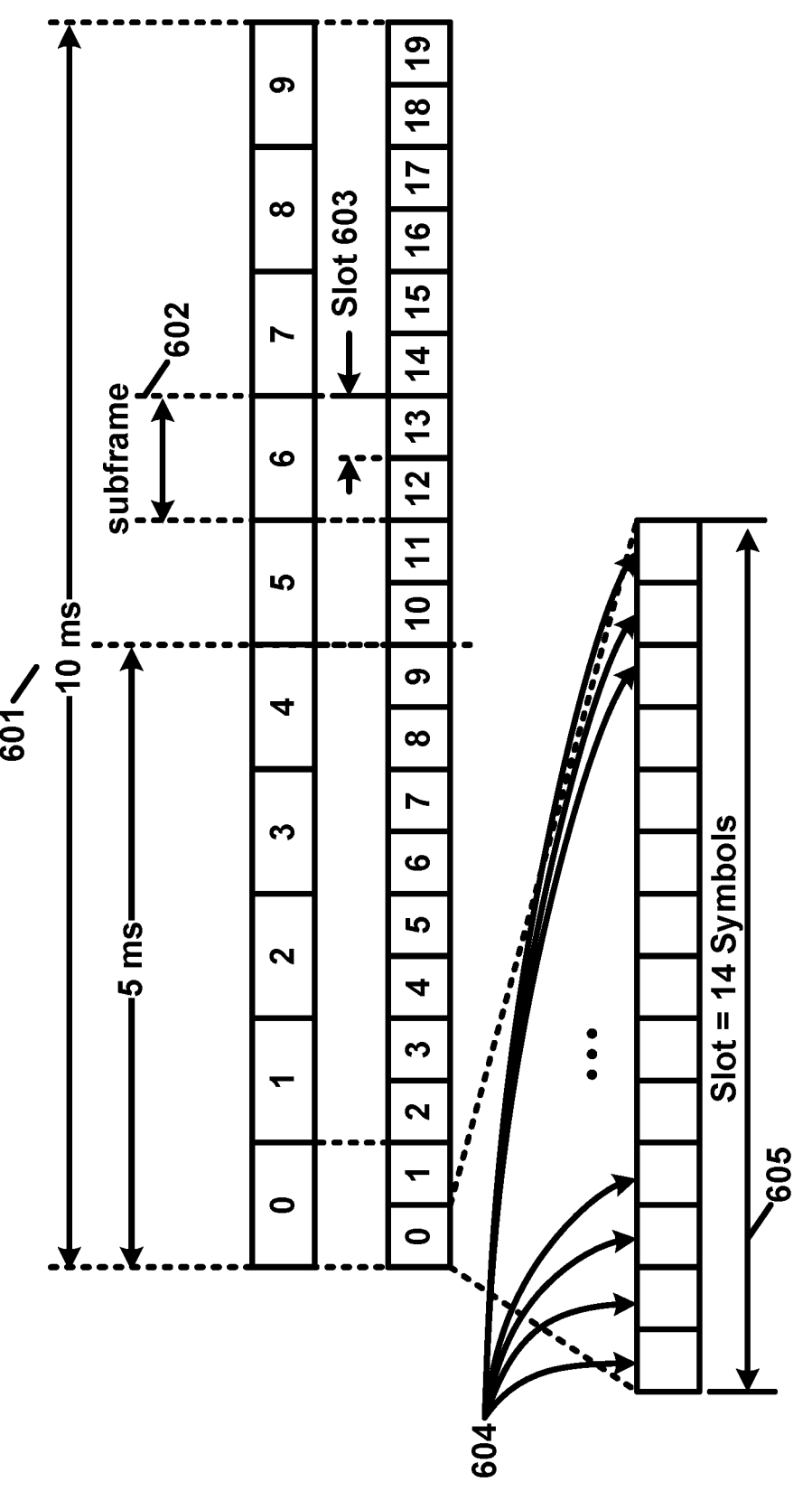
FIG. 6 shows a diagram of an example transmission time and/or reception time for a carrier.

FIG. 6 shows a diagram with an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
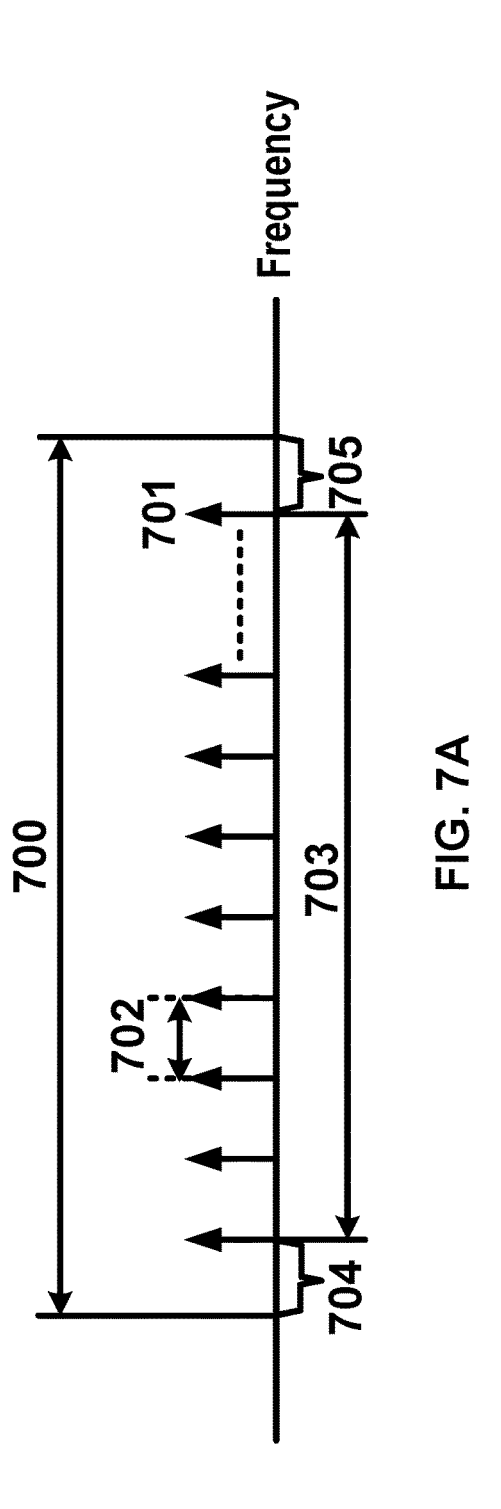
FIG. 7A and FIG. 7B show diagrams of example sets of orthogonal frequency division multiplexing (OFDM) subcarriers.

FIG. 7A shows a diagram with example sets of OFDM subcarriers. A base station may communicate with a wireless device using a carrier having an example channel bandwidth 700. Arrow(s) in the diagram may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
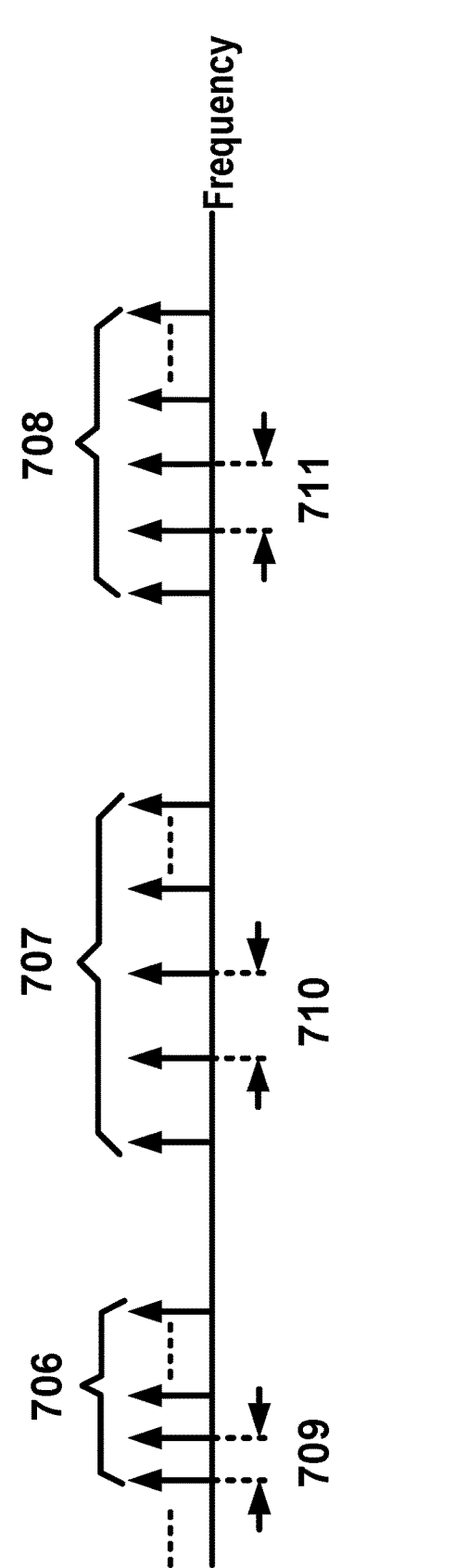

FIG. 7B shows an example diagram with component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
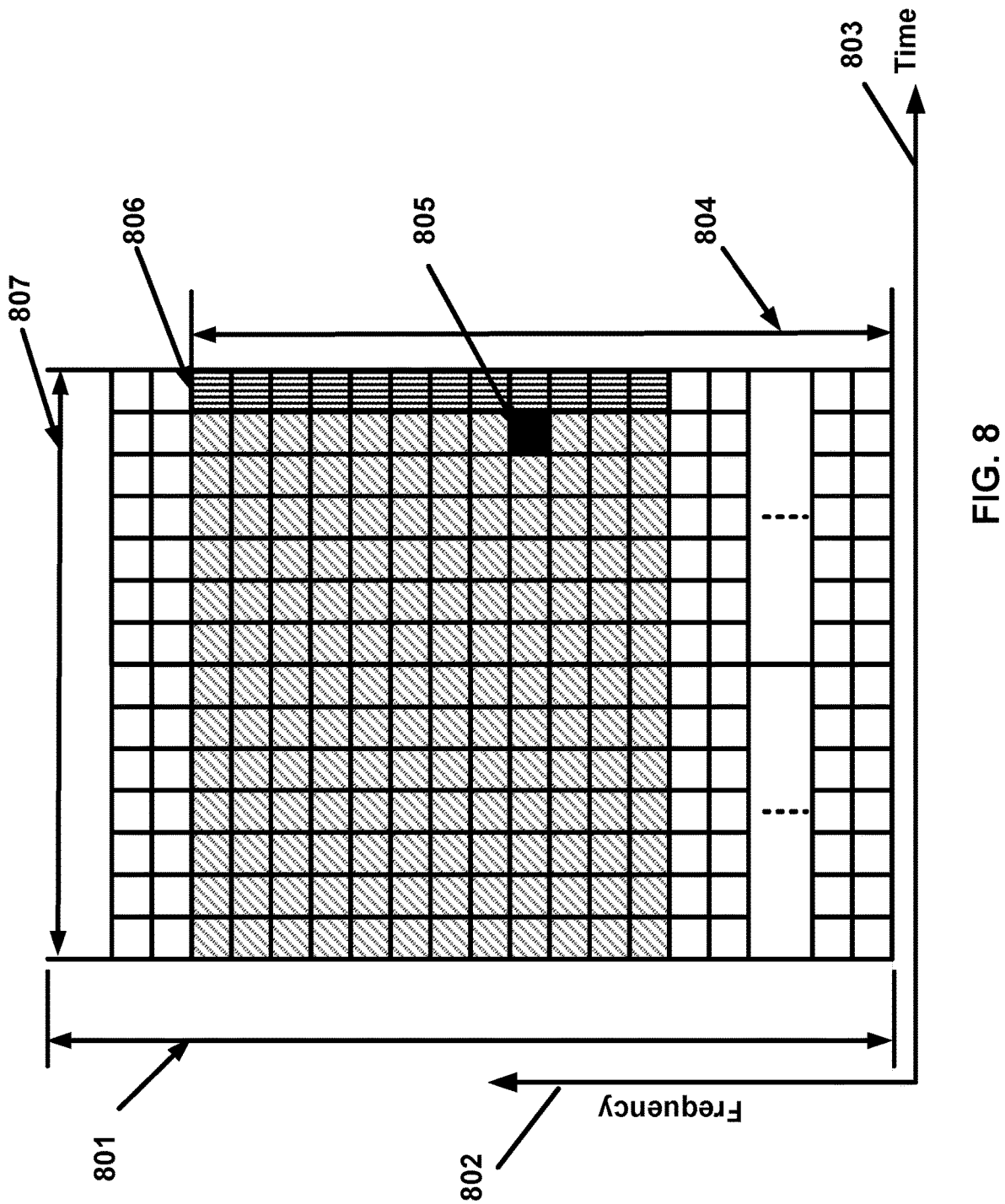
FIG. 8 shows a diagram of example OFDM radio resources.

FIG. 8 shows a diagram of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

a base station may allocate Configured Scheduling (CS) resources for down link transmission to a wireless device. The base station may send (e.g., transmit) one or more RRC messages indicating a periodicity of the CS grant. The base station may send (e.g., transmit) a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) a DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) a DCI comprising a slot format indicator (SFI) indicating a slot format. The base station may send (e.g., transmit) a DCI comprising a pre-emption indication indicating the PRB(s) and/or OFDM symbol(s) in which a wireless device may assume no transmission is intended for the wireless device. The base station may send (e.g., transmit) a DCI for group power control of the PUCCH, the PUSCH, and/or an SRS. A DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figures 9A, 9B:
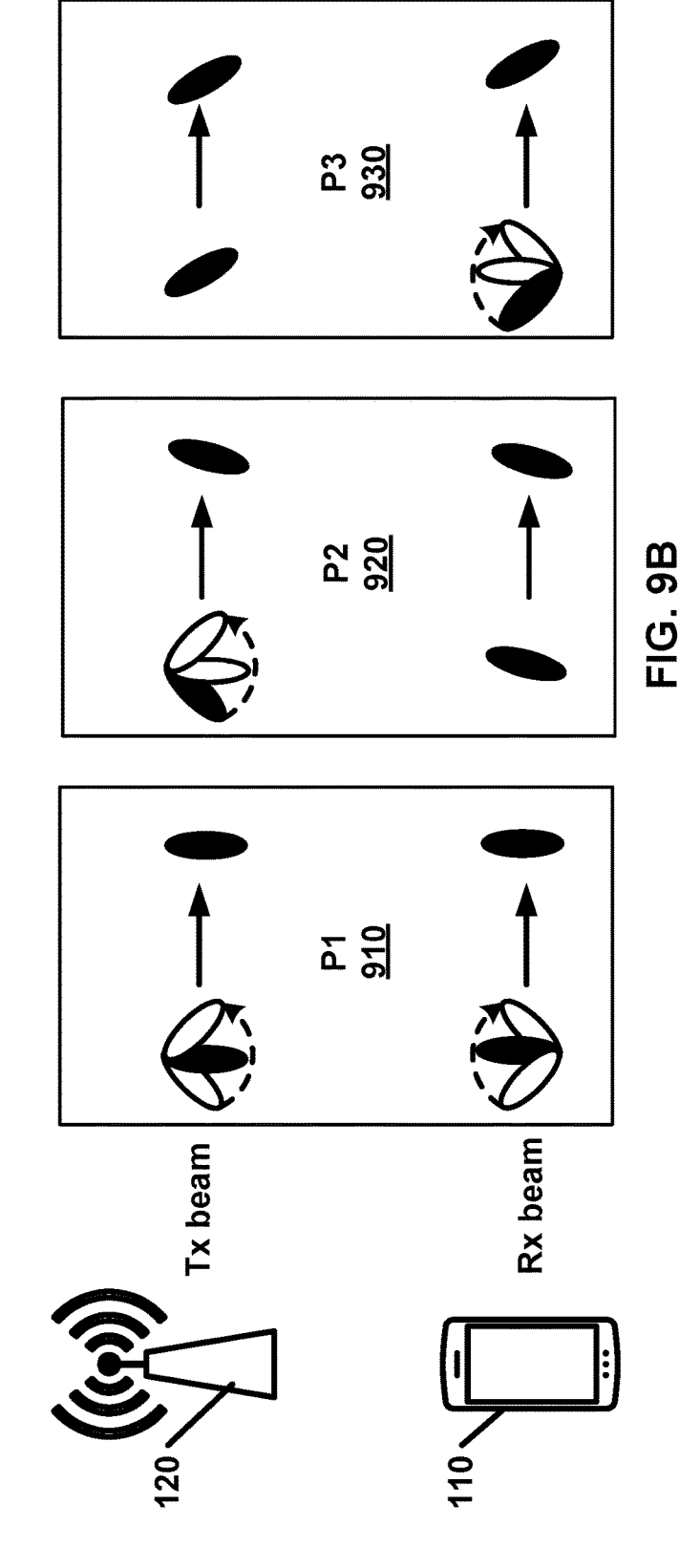
FIG. 9A shows a diagram of an example channel state information reference signal (CSI-RS) and/or synchronization signal (SS) block transmission in a multi-beam system.
FIG. 9B shows a diagram of an example downlink beam management procedure.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
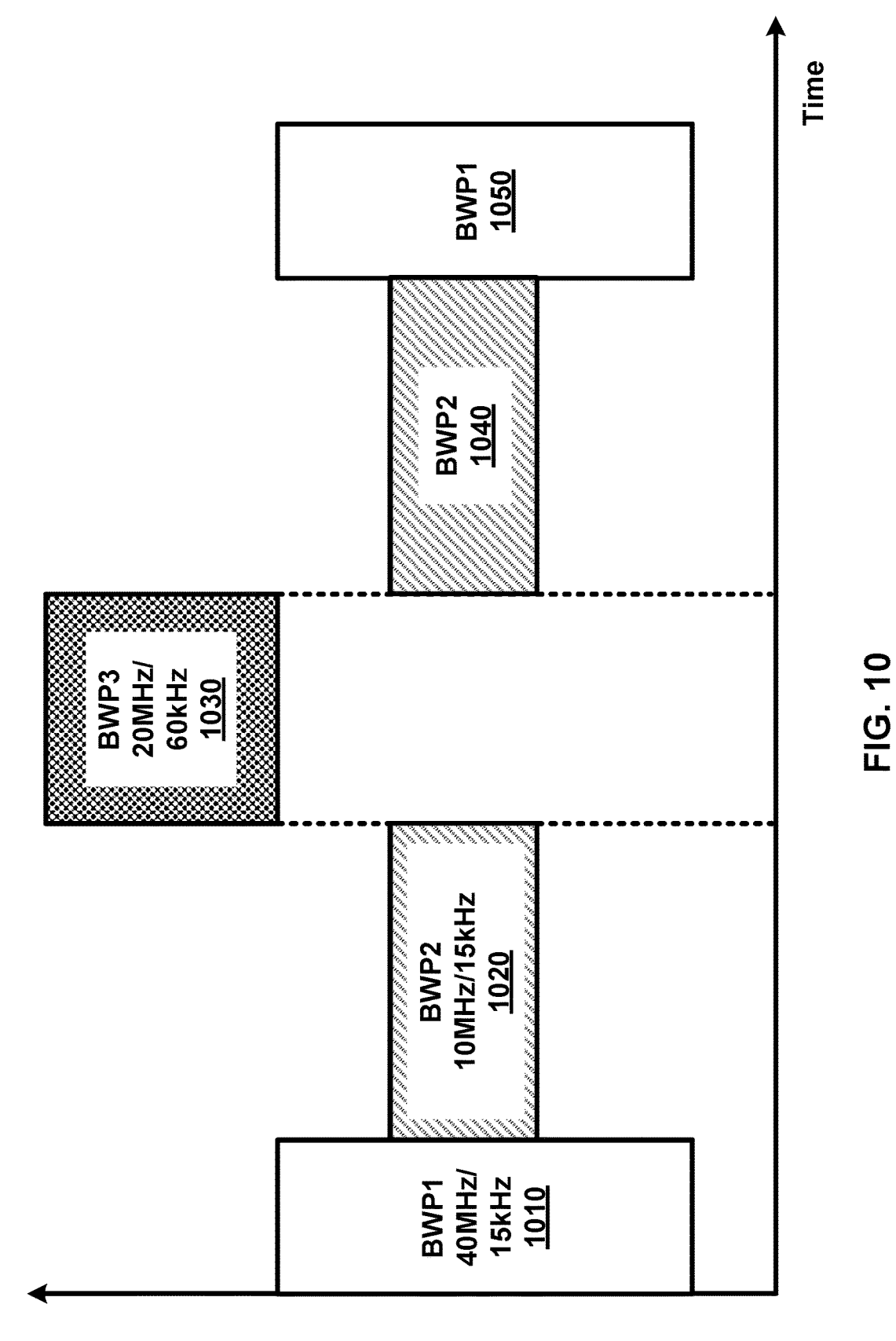
FIG. 10 shows an example diagram of configured bandwidth parts (BWPs).

FIG. 10 shows an example diagram of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

A DCI may comprise a BWP indicator field. The BWP indicator field value may indicate an active DL BWP, from a configured DL BWP set, for one or more DL receptions.

The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects a DCI indicating an active DL BWP, other than a default DL BWP, for a paired spectrum operation, and/or if a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect a DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving a DCI indicating the second BWP as an active BWP, and/or after or in response to an expiry of BWP inactivity timer (e.g., the second BWP may be a default BWP). FIG. 10 shows an example diagram of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving a DCI indicating BWP3 1030 as an active BWP. Switching an active BWP from BWP3 1030 to BWP2 1040 and/or from BWP2 1040 to BWP1 1050 may be after or in response to receiving a DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
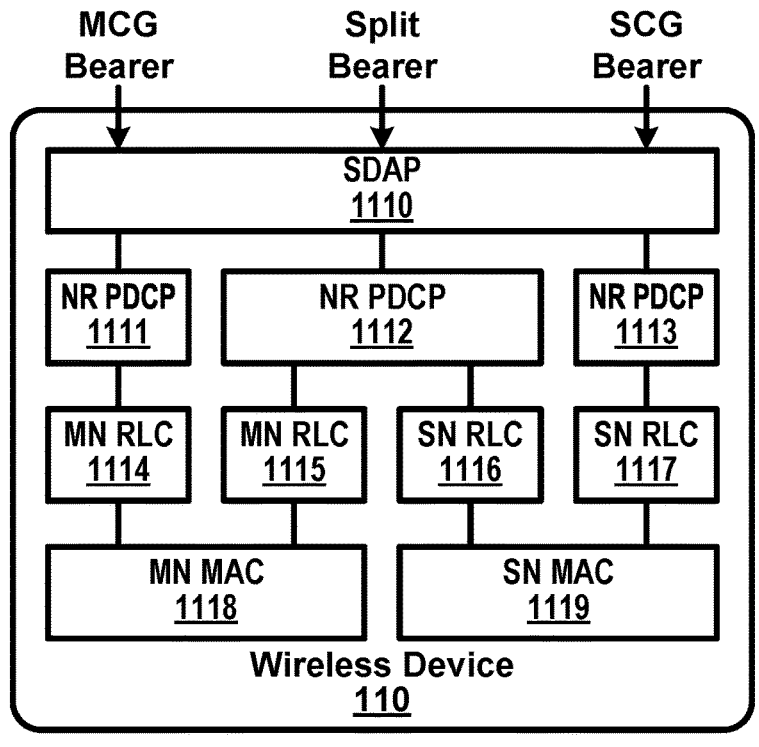
FIG. 11A, and FIG. 11B show diagrams of an example multi connectivity.
Figure 11B:
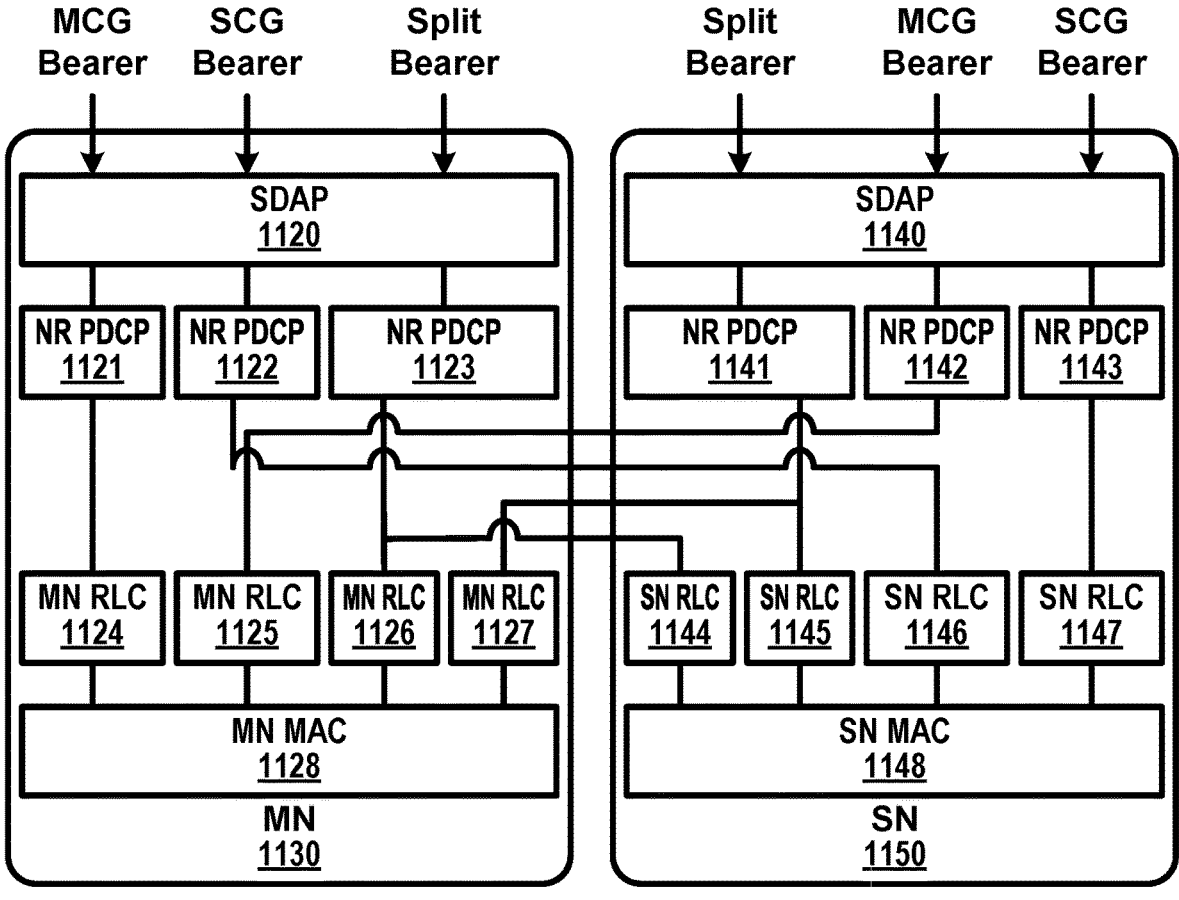

FIG. 11A and FIG. 11B show packet flows using a multi connectivity (e.g., dual connectivity, multi connectivity, tight interworking, and/or the like). FIG. 11A shows an example diagram of a protocol structure of a wireless device 110 (e.g., UE) with CA and/or multi connectivity. FIG. 11B shows an example diagram of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap).

Dedicated RRC signaling may be used for sending required system information of a cell as for CA, for example, if adding a new SCG SCell, except for an SFN acquired from an MIB of a PSCell of a SCG.

Figure 12:
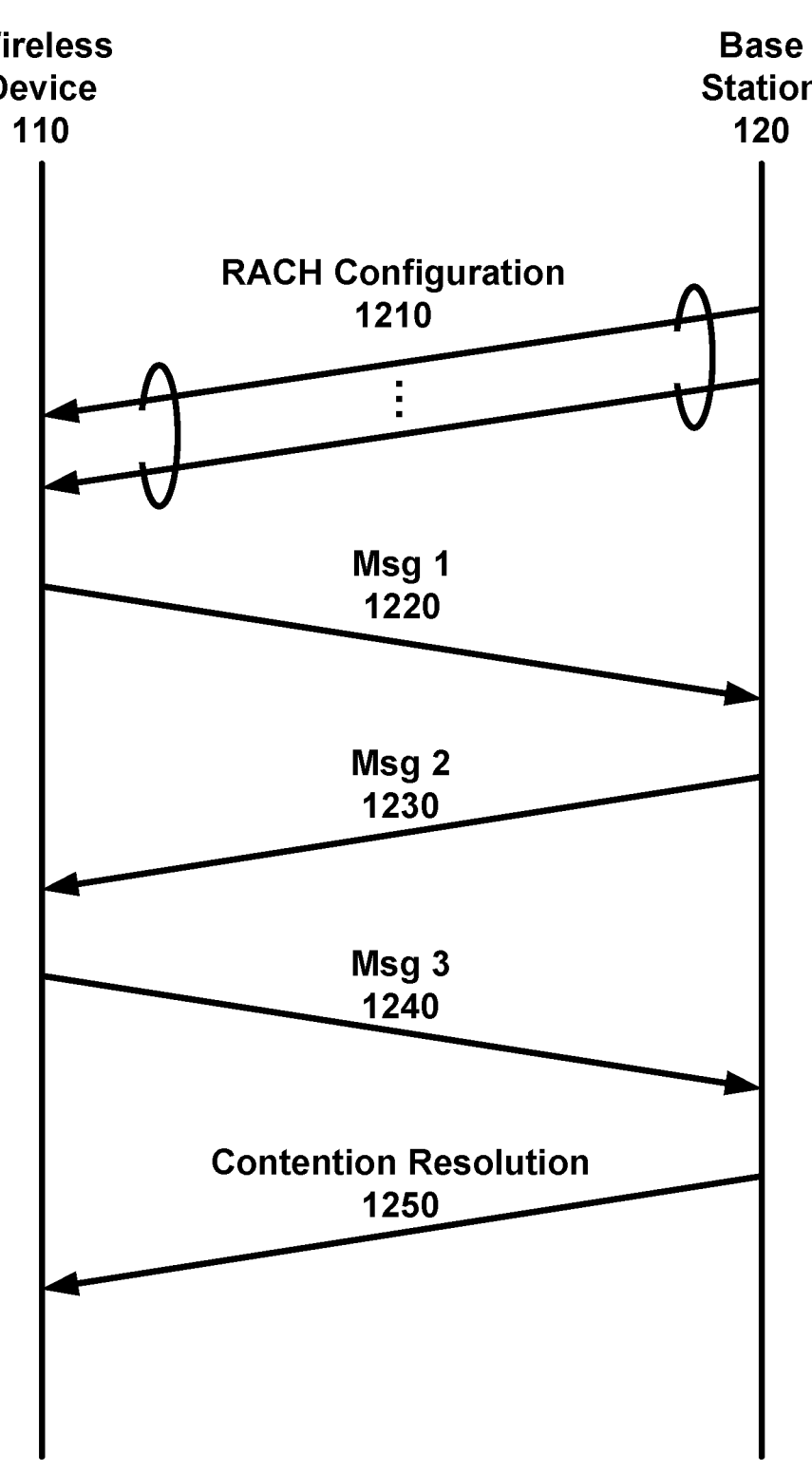
FIG. 12 shows a diagram of an example random access procedure

FIG. 12 shows an example diagram of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for beam failure recovery request and corresponding PRACH resource(s) (e.g., if any), a time window to monitor RA response(s), a time window to monitor response(s) on beam failure recovery request, and/ or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for beam failure recovery request associated with at least one of SS blocks and/or CSI-RSs. A wireless device may select a random access preamble index corresponding to a selected SS block or a CSI-RS from a set of one or more random access preambles for beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine an PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For beam failure recovery request, the base station may configure the wireless device with a different time window (e.g., bfr-Response-Window) to monitor response on beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3

1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
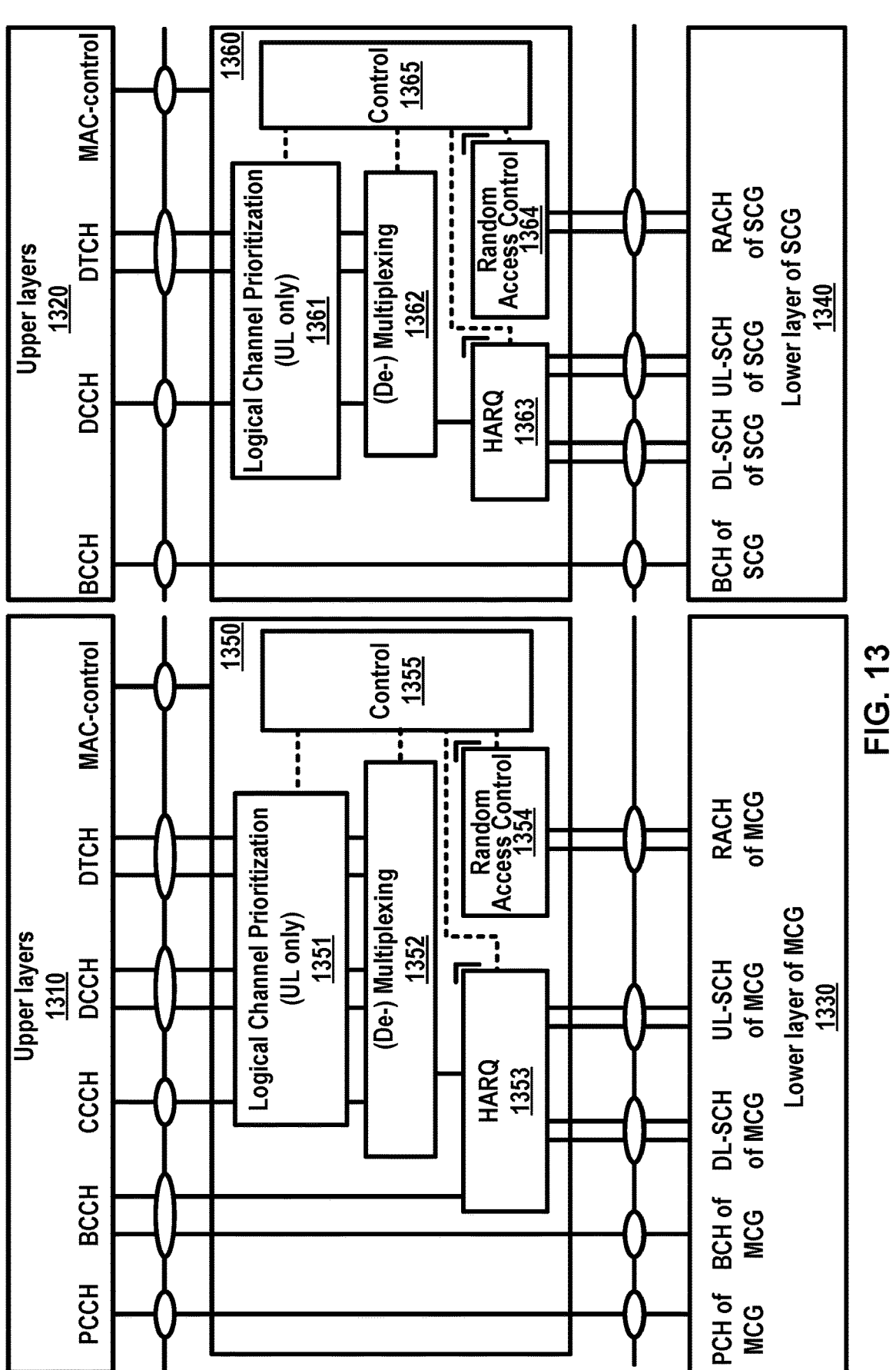
FIG. 13 shows a structure of example medium access control (MAC) entities.

FIG. 13 shows an example structure for MAC entities. A wireless device may be configured to operate in a multi-connectivity mode. A wireless device in RRC_CON-NECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
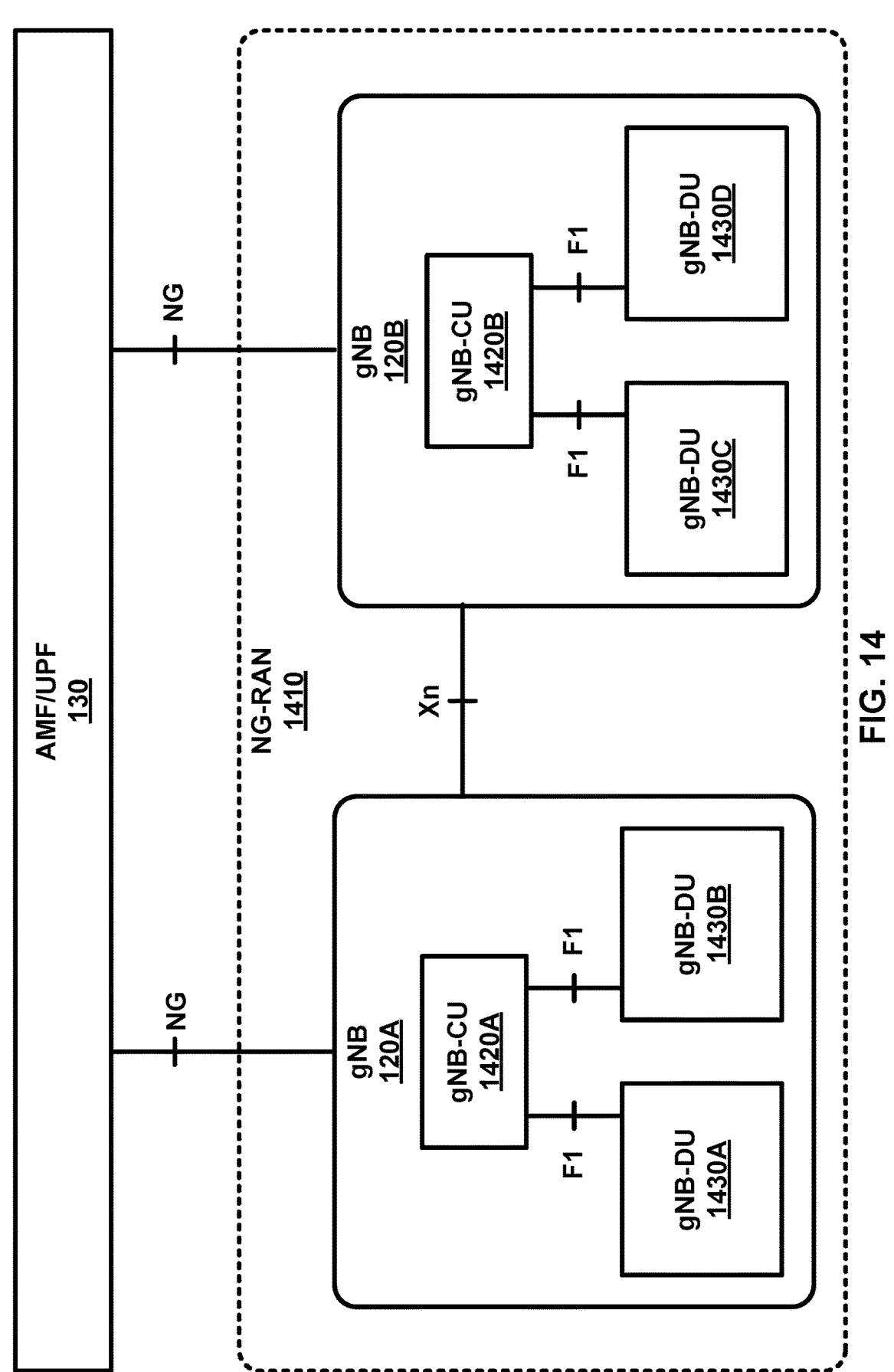
FIG. 14 shows a diagram of an example RAN architecture.

FIG. 14 shows an example diagram of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
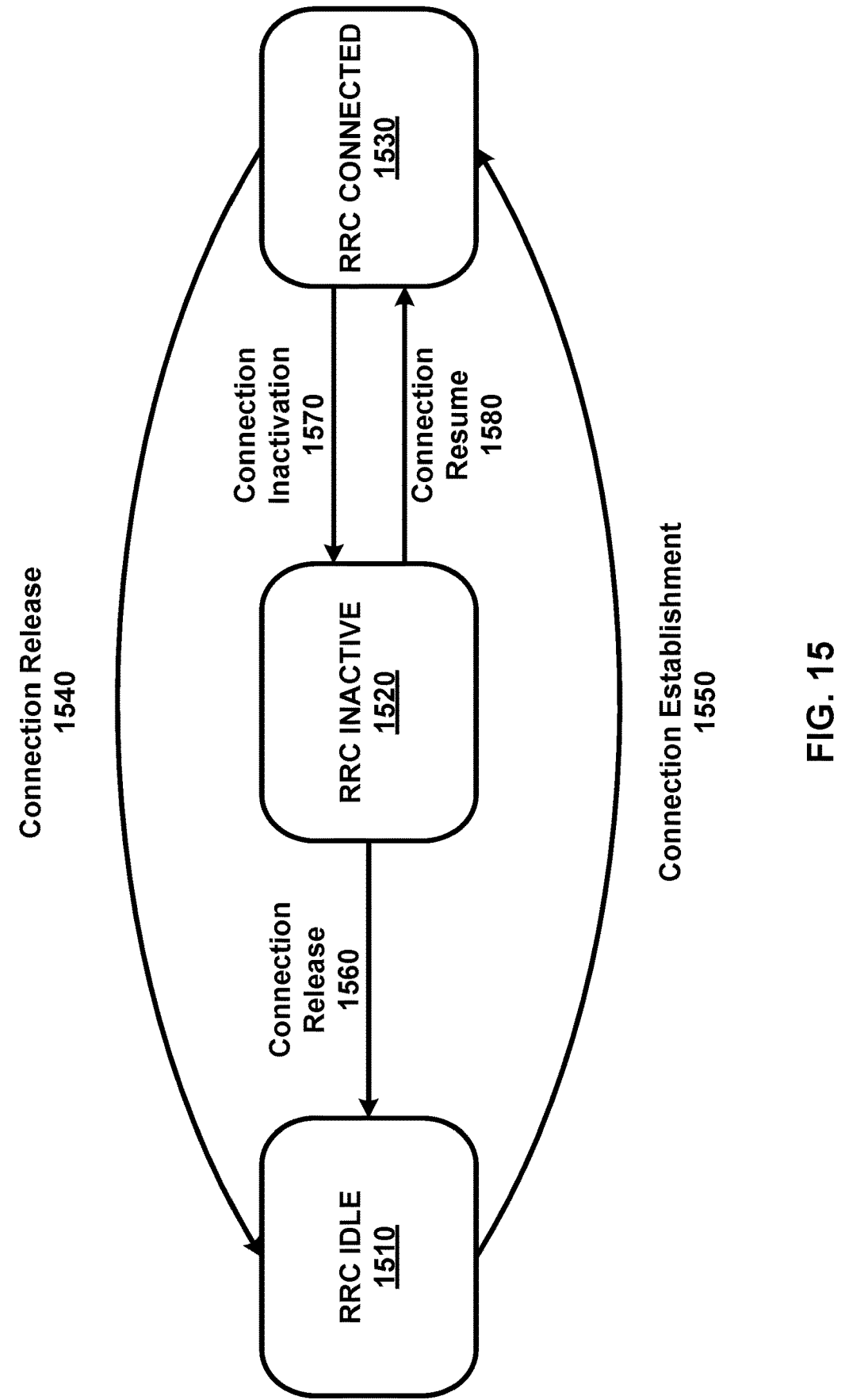
FIG. 15 shows a diagram of example radio resource control (RRC) states.

FIG. 15 shows an example diagram showing RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/ MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2 stage or 2-step random access) and/or four messages (e.g., 4 stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station.

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subhearder and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
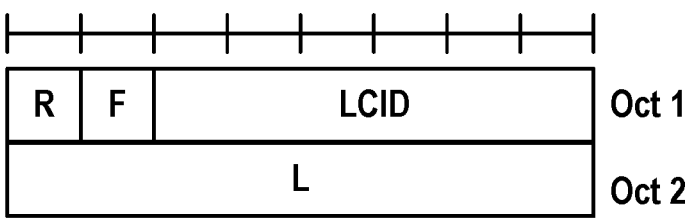
FIG. 16A, FIG. 16B and FIG. 16C show examples of a MAC subheader.

FIG. 16A shows an example of a MAC subheader comprising an eight-bit L field. The LCID field may have six bits in length. The L field may have eight bits in length.

Figure 16B:
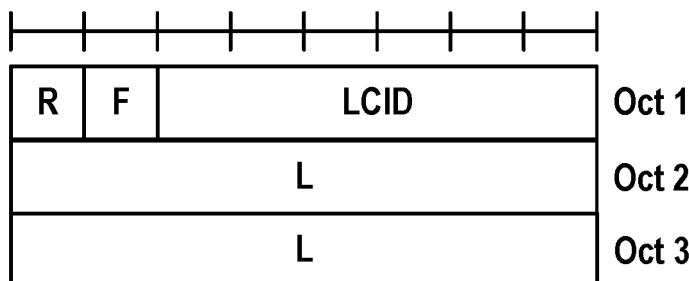

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
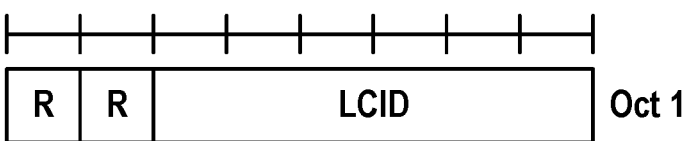

FIG. 16C shows an example of the MAC subheader. The LCID field may comprise six bits in length, and the R field may comprise two bits in length.

Figures 17A, 17B:
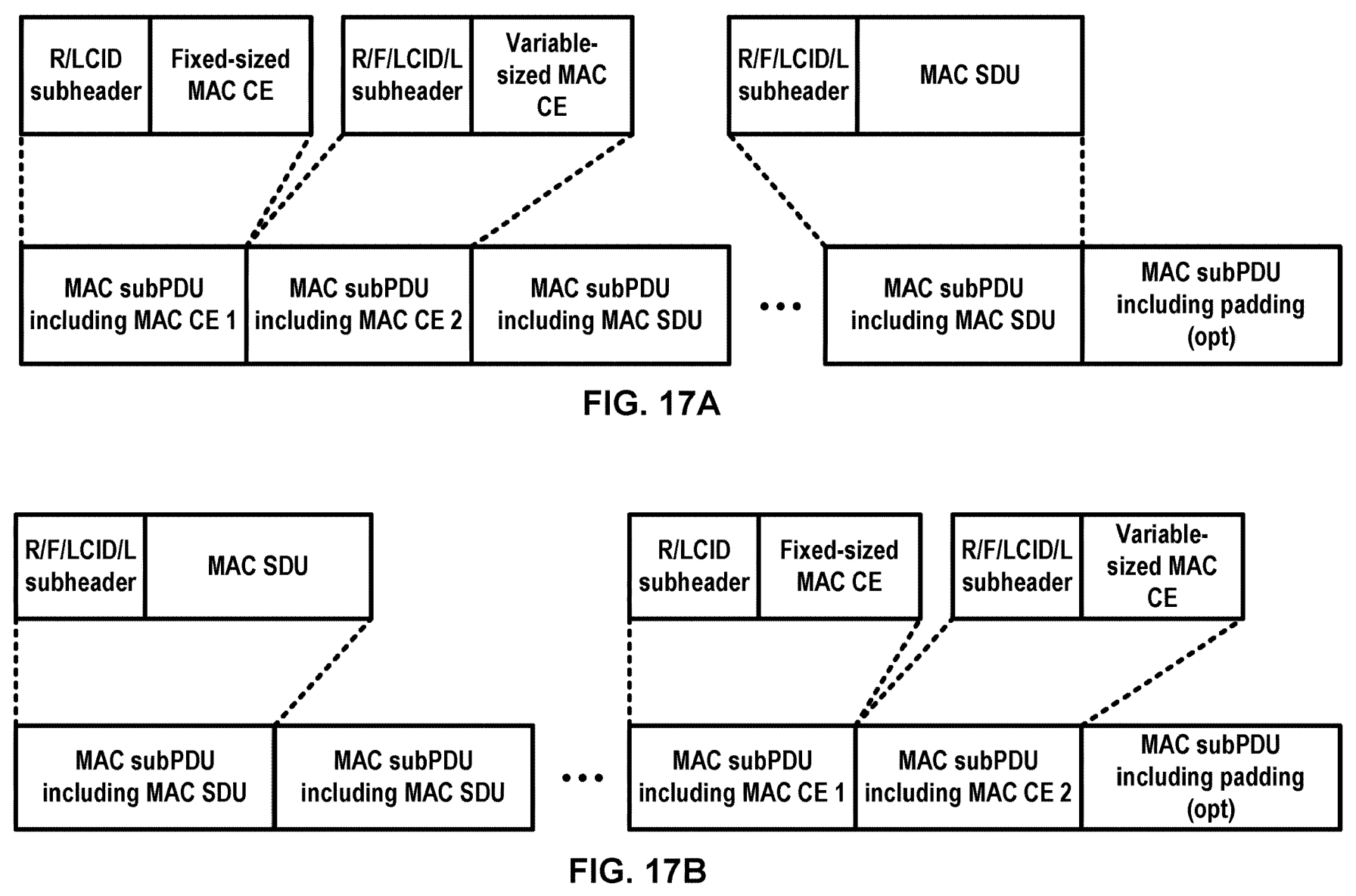

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

FIG. 17B shows an example of a UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18A shows an example of multiple LCIDs associated with the one or more MAC CEs. A MAC entity of a base station may send (e.g., transmit) to a MAC entity of a wireless device one or more MAC CEs. The one or more MAC CEs may comprise at least one of: a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

FIG. 18B shows an example of the one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation. A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDe-activationTimer timer) associated with the activated SCell, for example, if at least one first PDCCH on an activated SCell indicates an uplink grant or a downlink assignment. A wireless device may restart a timer (e.g., an sCellDeactiva-tionTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

FIG. 18A shows an example of a first LCID. FIG. 18B shows an example of a second LCID. The left columns comprise indices. The right columns comprises corresponding LCID values for each index.

Figure 19A:
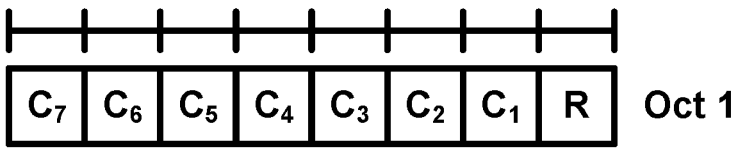
FIG. 19A and FIG. 19B show examples of secondary cell activation and/or deactivation MAC control element (CE).

FIG. 19A shows an example of an SCell activation/deactivation MAC CE of one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 19B:
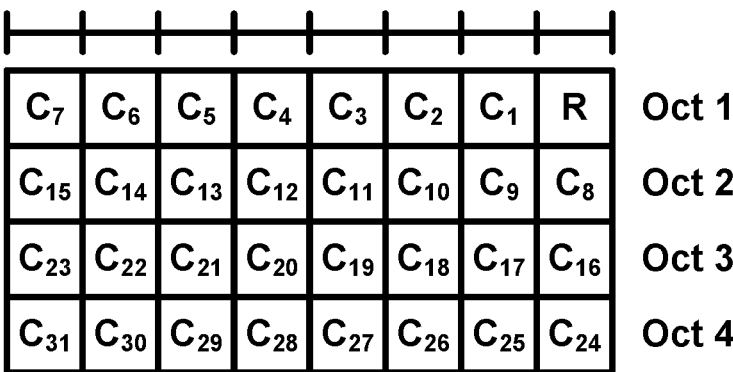

FIG. 19B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A C_i field may indicate an activation/deactivation status of an SCell with an SCell index i. An SCell with an SCell index i may be activated, for example, if the C_i field is set to one. An SCell with an SCell index i may be deactivated, for example, In an example, if the C_i field is set to zero. An R field may indicate a reserved bit. The R field may be set to zero.

A base station may send (e.g., transmit) a DCI via a PDCCH for at least one of: a scheduling assignment and/or grant; a slot format notification; a pre-emption indication; and/or a power-control command. The DCI may comprise at least one of: an identifier of a DCI format; a downlink scheduling assignment(s); an uplink scheduling grant(s); a slot format indicator; a pre-emption indication; a power-control for PUCCH/PUSCH; and/or a power-control for SRS.

A downlink scheduling assignment DCI may comprise parameters indicating at least one of: an identifier of a DCI format; a PDSCH resource indication; a transport format;

HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for a DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different control resource sets (e.g., coresets), for example, to support a wide bandwidth operation. A base station may transmit one or more RRC messages comprising configuration parameters of one or more coresets. A coreset may comprise at least one of: a first OFDM symbol; a number of consecutive OFDM symbols; a set of resource blocks; and/or a CCE-to-REG mapping. A base station may send (e.g., transmit) a PDCCH in a dedicated coreset for particular purpose, for example, for beam failure recovery confirmation. A wireless device may monitor a PDCCH for detecting DCI in one or more configured coresets, for example, to reduce the power consumption.

BFR procedure A base station and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery request (BFRQ) procedure, for example, if at least a beam failure occurs. A beam failure may occur if a quality of beam pair link(s) of at least one PDCCH falls below a threshold. The threshold comprise be an RSRP value (e.g., −140 dbm, −110 dbm, or any other value) and/or a SINR value (e.g., −3 dB, −1 dB, or any other value), which may be configured in a RRC message.

Figures 20A, 20B:
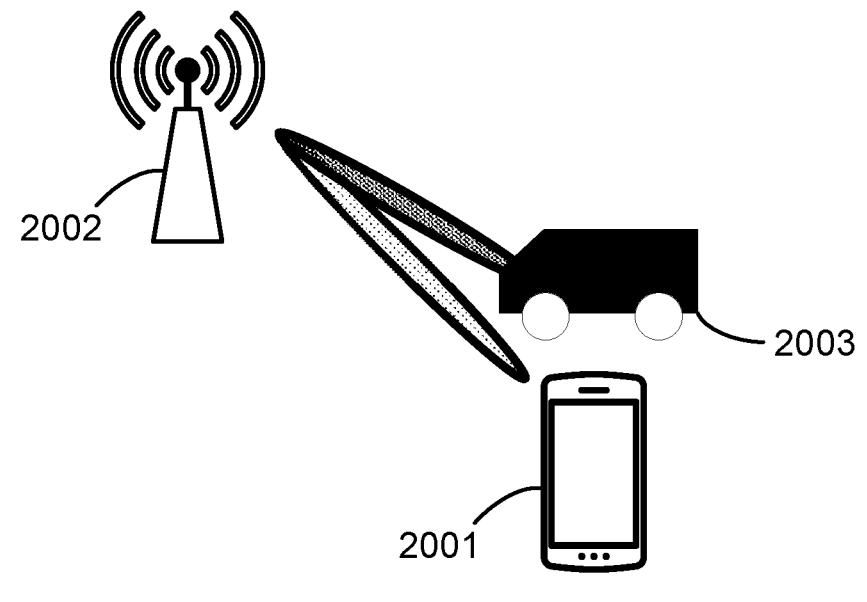
FIG. 20A and FIG. 20B show examples of a downlink beam failure.

FIG. 20A shows an example of a first beam failure event. A base station 2002 may send (e.g., transmit) a PDCCH from a transmission (Tx) beam to a receiving (Rx) beam of a wireless device 2001 from a TRP. The base station 2002 and the wireless device 2001 may start a beam failure recovery procedure on the TRP, for example, if the PDCCH on the beam pair link (e.g., between the Tx beam of the base station 2002 and the Rx beam of the wireless device 2001) have a lower-than-threshold RSRP and/or SINR value due to the beam pair link being blocked (e.g., by a moving vehicle 2003, a building, or any other obstruction).

FIG. 20B shows an example of a second beam failure event. A base station may send (e.g., transmit) a PDCCH from a beam to a wireless device 2011 from a first TRP 2014. The base station and the wireless device 2011 may start a beam failure recovery procedure on a new beam on a second TRP 2012, for example, if the PDCCH on the beam is blocked (e.g., by a moving vehicle 2013, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if doppler shift and/or doppler shift of the channel from a transmission on an RS to a wireless device, and that from a transmission on a PDCCH to the wireless device, are the same.

A wireless device may monitor a PDCCH on M beams (e.g. 2, 4, 8) pair links simultaneously, where M≥1 and the value of M may depend at least on capability of the wireless device. Monitoring a PDCCH may comprise detecting a DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, a DCI, and/or any combinations of these signaling.

In A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFRQ signal on an uplink physical channel to a base station, for example, if starting a BFR procedure. The base station may send (e.g., transmit) a DCI via a PDCCH in a coreset, for example, after or in response to receiving the BFRQ signal on the uplink physical channel. The wireless may determine that the BFR procedure is successfully completed, for example, after or in response to receiving the DCI via the PDCCH in the coreset.

A base station may send (e.g., transmit) one or more messages comprising configuration parameters of an uplink physical channel, or signal, for transmitting a beam failure recovery request. The uplink physical channel or signal may be based on one of: a contention-free PRACH (BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting the BFRQ signal, for example, if the wireless device is configured with multiple resources for a BFRQ signal. The wireless device may select a BFR-PRACH resource for transmitting a BFRQ signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFRQ signal, for example, if the wireless device is configured with a BFR-PRACH resource, a BFR-PUCCH resource, and/or a CF-PRACH resource.

A base station may send (e.g., transmit) a response to a wireless device, for example, after receiving one or more BFRQ signals. The response may comprise the CRI associated with the candidate beam that the wireless device may indicate in the one or multiple BFRQ signals. A base station and/or a wireless device may perform one or more beam management procedures, for example, if the base station and/or the wireless device are configured with multiple beams (e.g., in system such as in an NR system). The wireless device may perform a BFR procedure, for example, if one or more beam pair links between the base station and the wireless device fail.

A wireless device may receive one or more messages (e.g., RRC messages) comprising one or more configuration parameters of a primary cell and one or more configuration parameters of a secondary cell. The one or more configurations parameters of the primary cell and the secondary cell may comprise one or more BFRQ resources. The one or more configuration parameters may indicate one or more first RSs of the primary cell and one or more second RSs of the secondary cell. The one or more configuration parameters may indicate a deactivation timer of the secondary cell. The wireless device may measure a radio link quality of one or more candidate beams associated with the one or more first RSs and/or the one or more second RSs. The one or more first RSs may comprise a CSI-RS or SS blocks. The one or more second RSs may comprise a CSI-RS or SS blocks. The wireless device may detect a beam failure of the secondary cell. The wireless device may detect the beam failure of the secondary cell based on the one or more RSs of the secondary cell. The wireless device may assess a first radio link quality of the one or more first RSs against a threshold for beam failure detection. The wireless device may indicate one or more beam failure instances based on the threshold for beam failure detection. The wireless device may detect a beam failure by comparing the one or more first RSs to a radio quality threshold, for example, by determining that the one or more first RSs have a radio quality that is lower than a first threshold. The wireless device may receive, from the base station, one or more configuration parameters of a primary cell and one or more configuration parameters of a secondary cell comprising a value for a first threshold. The wireless device may measure a block error rate (BLER) of one or more downlink control channels. The wireless device may compare a quality of the one or more downlink control channels (e.g., associated with one or more first RSs) with the first threshold, for example, the wireless device may measure the BLER of one or more downlink control channels and compare the measurement with the first threshold for the beam failure detection. In other words, the first threshold may be determined based on a block error rate (BLER). The wireless device may initiate a candidate beam identification procedure on the secondary cell, for example, after or in response to detecting the beam failure. The wireless device may receive, from the base station, one or more configuration parameters of a primary cell and one or more configuration parameters of a secondary cell comprising a value for a second threshold. The wireless device may attempts to find a candidate beam for the BFR procedure, for example, if the wireless device detects a beam failure. The wireless device may measure a layer-1 reference signal received power (L1-RSRP) of the one or more second RSs and may select one candidate beam (or RS), among the one or more second RSs. The wireless device may select a candidate beam, for example, if the measured quality of an associated RS is greater than the second threshold. The second threshold may be determined based on a layer-1 reference signal received power (L1-RSRP). The wireless device may select the candidate beam (or RS) having a L1-RSRP higher than the second threshold.

The wireless device may initiate a random access procedure on the primary cell. The wireless device may initiate the random access procedure on the primary cell in furtherance of a beam failure recovery (BFR) procedure of the secondary cell. The wireless device may initiate a random access procedure, for example, after or in response to detecting the beam failure of the secondary cell. The random access procedure may relate to the wireless device selecting an RS associated with a BFRQ resource. The BFRQ resource may comprise at least one preamble and at least one random access channel resource. The random access channel resource may be based on an associated RS. The BFRQ resource may comprise one or more time resources and/or one or more frequency resources on the primary cell. The random access procedure may relate to the wireless device sending (e.g., transmitting) a preamble via a PRACH resource of the primary cell. The wireless device may monitor a PDCCH in one or more coresets on the primary cell for receiving a DCI. The wireless device may receive the DCI from the base station. The wireless device may monitor the PDCCH within a configured response window. To complete the BFR procedure, the wireless device may receive a primary cell response (e.g., a downlink assignment or an uplink grant) on the PDCCH of the primary cell. The wireless device may activate the secondary cell, for example, after or in response to receiving a first medium-access control element (MAC CE) activating the secondary cell. The wireless device may start a deactivation timer, for example, after or in response to receiving the first MAC CE for activating the secondary cell. The wireless device may deactivate the secondary cell after sending the preamble, but prior to receiving the primary cell response. The wireless device may deactivate the secondary cell, for example, after or in response to receiving a second MAC CE for deactivating the secondary cell (e.g., an SCell Activation/Deactivation MAC CE). The wireless device may deactivate the secondary cell, for example, after or in response to the wireless device determining an expiry of the deactivation timer of the secondary cell (e.g., determining an expiry of an sCellDeactivationTimer timer). The wireless device may abort or stop the random access procedure (for the BFR procedure of the secondary cell) on the primary cell, for example, after or in response to deactivating the secondary cell (e.g., during the BFR procedure of the secondary cell). The wireless device may abort the random access procedure by stopping the sending (e.g., transmitting) of the at least one preamble on the primary cell.

The base station may send (e.g., transmit), to a wireless device, one or more messages (e.g., RRC messages) comprising one or more configuration parameters of a primary cell and a secondary cell. The one or more configuration parameters may indicate one or more BFRQ resources on the primary cell, one or more first reference signals (RSs) of the secondary cell, one or more second RSs of the secondary cell, and/or an association between each of the one or more first RSs and each of the one or more BFRQ resources. The one or more first RSs may comprise a CSI-RS or SS blocks. The one or more second RSs may comprise a CSI-RS or SS blocks. Additionally, or alternatively, the one or more configuration parameters of the BFR procedure may comprise at least a first threshold for beam failure detection; at least a second threshold for selecting a beam(s); and/or a first coreset associated with the BFR procedure. The base station may receive, from a wireless device, a preamble (e.g., a BFRQ resource) for a random access procedure for a beam failure of the secondary cell. The base station may receive, from the wireless device, the preamble via at least one random access channel resource of the primary cell. The base station may send (e.g., transmit), to a wireless device, one or more messages comprising a first set of RS resource configurations for a secondary cell. The first set of RS resource configurations may comprise one or more first RSs of the secondary cell.

The base station may also send (e.g., transmit), to a wireless device, one or more messages comprising configuration parameters of one or more cells. The one or more cells may comprise at least a primary cell or a PSCell, and one or more secondary cells. The base station may receive, from a wireless device, a BFRQ signal. The base station may receive the BFRQ signal, for example, after or in response to the wireless device selecting a candidate beam. The base station may not send (e.g., transmit) a PDCCH in the first coreset, for example, if the base station does not receive the BFRQ signal on an uplink resource. The base station may send (e.g., transmit) a PDCCH in a second coreset, for example, if the base station does not receive the BFRQ signal. The second coreset may be different from the first coreset. The base station may send (e.g., transmit), to the wireless device, one or more messages comprising a time, for example, an sCellDeactivationTimer timer. The wireless device may deactivate the secondary cell, for example, after or in response to an expiry of the sCellDeactivationTimer timer. The wireless device may receive, from the base station, the sCellDeactivationTimer timer. The base station may stop transmitting a random access response for the random access procedure in response to the deactivating of the secondary cell.

Figure 21:
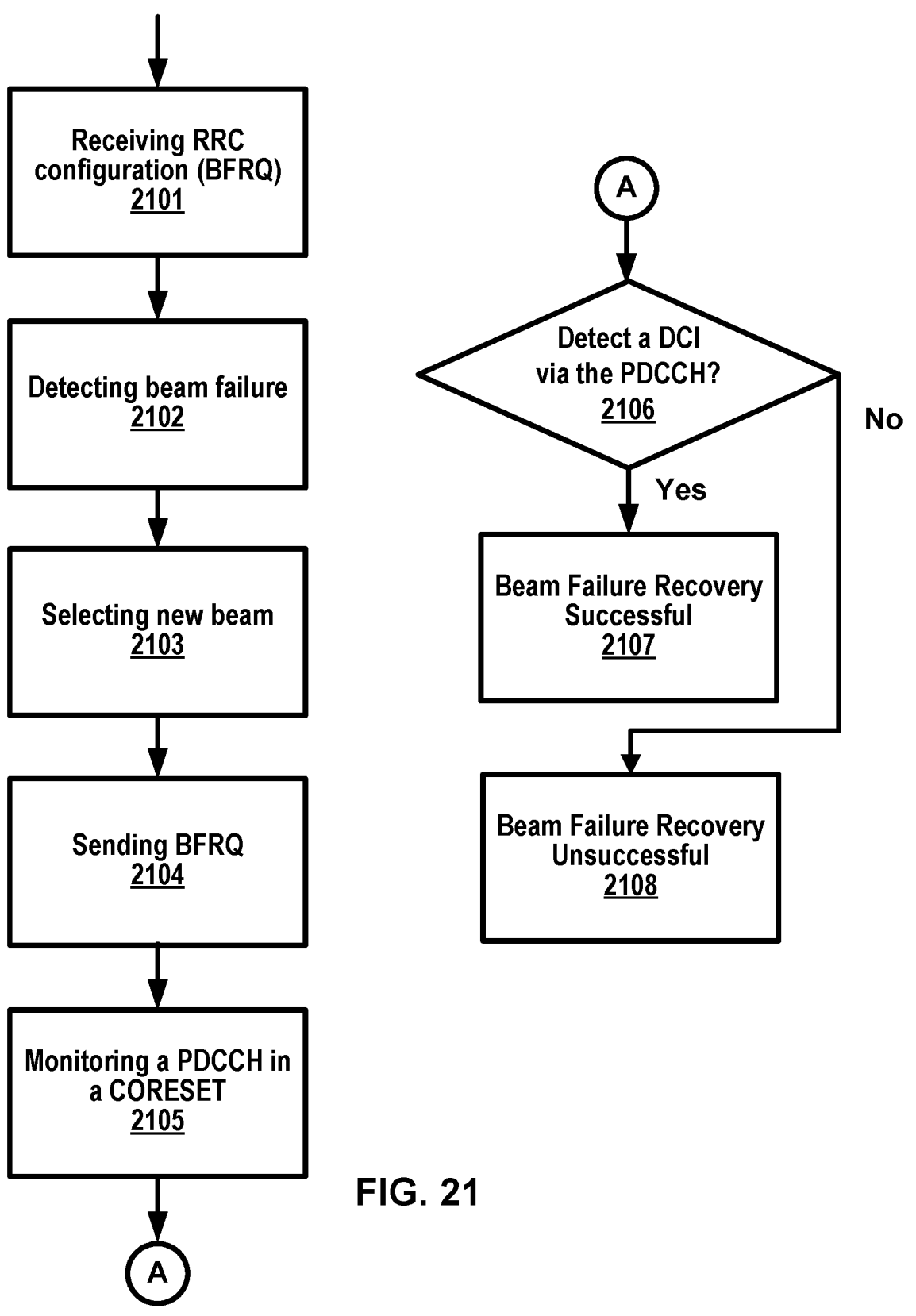
FIG. 21 shows a diagram of example beam failure recovery (BFR) procedures for a primary cell.

FIG. 21 shows an example diagram of beam failure recovery (BFR) procedures. The BFR procedures shown in FIG. 21 may be for a primary cell. At step 2101, a wireless device may receive one or more messages (e.g., RRC messages) comprising one or more BFRQ parameters. At step 2102, the wireless device may detect a beam failure according to one or more BFRQ parameters, for example, the one or more BFRQ parameters received at step 2101. The wireless device may start a first timer, for example, after or in response to detecting the beam failure. At step 2103, the wireless device may select a candidate beam, for example, after or in response to detecting the beam failure. At step 2104, the wireless device may send (e.g. transmit) a first BFRQ signal, to a base station, for example, after or in response to the selecting of the candidate beam. The wireless device may start a response window, for example, after or in response to sending (e.g., transmitting) the first BFRQ signal. The response window may be a timer with a value configured (or determined) by the base station. At step 2105, the wireless device may monitor a PDCCH in a first coreset, for example, during the window. The wireless device may monitor the PDCCH for a BFRQ response (e.g., downlink control information) from the base station. The first coreset may be associated with the BFR procedure. The wireless device may monitor the PDCCH in the first coreset, for example, in condition of sending (e.g., transmitting) the first BFRQ signal. At step 2106, the wireless device may receive a first DCI via the PDCCH in the first coreset, for example, during the response window. At step 2107, the wireless device may determine that the BFR procedure is successfully completed, for example, after or in response to receiving the first DCI via the PDCCH in the first coreset. At step 2107, the wireless device may also determine that the BFR procedure is successfully completed, for example, before the response window expires. The wireless device may stop the first timer and/or stop the response window, for example, after or in response to the BFR procedure being successfully completed.

The wireless device may, before the first timer expires, for example, perform one or more actions comprising at least one of: a BFRQ signal transmission; starting the response window; or monitoring the PDCCH. The wireless device may perform one or more of said actions, for example, if the response window expires and/or the wireless device does not receive the DCI. The wireless device may repeat one or more of said actions, for example, until the BFR procedure successfully is completed and/or the first timer expires.

At step 2108, the wireless device may declare (and/or indicate) a BFR procedure failure, for example, if the first timer expires and/or the wireless device does not receive the DCI. A wireless device may declare (and/or indicate) a BFR procedure failure, for example, if a number of transmissions of BFRQ signals is greater than a configured number. The base station may determine this number in the beam failure recovery configuration parameters sent to the wireless device. The wireless device may receive, from the base station, one or more configuration parameters comprising the configured number, for example, the maximum number of BFRQ transmission.

The wireless device may trigger a BFR procedure, for example, if a number of beam failure instances (e.g. contiguous beam failure instances) are detected. A beam failure instance may occur, for example, if a quality of a beam pair link is lower than a configured threshold. The base station may determine this threshold (value) in the beam failure recovery configuration parameters sent to the wireless device. The wireless device may receive, from the base station, one or more configuration parameters comprising the configured threshold, for example, the value of the threshold used for beam failure detection. A beam failure instance may occur, for example, if the RSRP value and/or the SINR value of a beam pair link is lower than a first threshold value. A beam failure instance may also occur, for example, if the block error rate (BLER) of the beam pair link is higher than a second threshold value. Sporadic beam failure instance may not necessarily trigger a BFR procedure. Examples described herein provide methods and systems for triggering a BFR procedure, for example, triggering a BFR procedure in a NR system.

A wireless device may receive, from a base station, one or more RRC messages comprising one or more configuration parameters of a BFR procedure. The one or more configuration parameters of the BFR procedure may comprise at least a first threshold for beam failure detection; at least a second threshold for selecting a beam(s); and/or a first coreset associated with the BFR procedure. The first coreset may comprise one or more RBs in the frequency domain and/or a symbol in the time domain.

The first coreset may be associated with the BFR procedure. The wireless device may monitor at least a first PDCCH in the first coreset, for example, after or in response to sending (e.g., transmitting) a BFRQ signal indicating the beam failure. The wireless device may not monitor the first PDCCH in the first coreset, for example, after or in response to not sending (e.g., transmitting) the BFRQ signal. A base station may not send (e.g., transmit) a PDCCH in the first coreset, for example, if the base station does not receive the BFRQ signal on an uplink resource. The base station may send (e.g., transmit) a PDCCH in a second coreset, for example, if the base station does not receive the BFRQ signal. The wireless device may monitor a PDCCH in a second coreset, for example, before the BFR procedure is triggered. The second coreset may be different from the first coreset.

The one or more configuration parameters of the BFR procedure may indicate a first set of RSs for beam failure detection. Additionally, or alternatively, the one or more configuration parameters of the BFR procedure may indicate one or more PRACH resources associated with a second set of RSs (beams) for candidate beam selection. The one or more PRACH resources may comprise at least one of: one or more preambles, one or more time resources, and/or one or more frequency resources. Each RS of the second set of RSs may be associated with a preamble, a time resource, and/or a frequency resource of at least one of the one or more PRACH resources.

The one or more configuration parameters of the BFR procedure may indicate one or more PUCCH resources or scheduling request (SR) resources associated with a third set of RSs (beams). The one or more PUCCH resources or SR resources may comprise at least one of: a time allocation; a frequency allocation; a cyclic shift; an orthogonal cover code; and/or a spatial setting. One or more RSs of the third set of RSs may be associated with each of the one or more PUCCH or SR resources.

The first set of RSs may comprise one or more first CSI-RSs or one or more first SS blocks (SSBs). The second set of RSs may comprise one or more second CSI-RSs or one or more second SSBs. The third set of RSs may comprise one or more third CSI-RSs or one or more third SSBs. A BFRQ signal may comprise a PRACH preamble sent (e.g., transmitted) via a time or frequency resource of a PRACH resource. A BFRQ signal may comprise a PUCCH or SR resource sent (e.g., transmitted) on a PUCCH or SR resource.

The one or more configuration parameters of the BFR procedure may comprise at least a first value indicating a number of beam failure instances that may trigger the BFR procedure; a second value of a second timer indicating a duration of time after which the BFR procedure may be triggered; a third value indicating a number of BFRQ signal transmissions; a fourth value of a fourth timer indicating a duration of time at (e.g., during) which the wireless device may receive a response from a base station; and/or a fifth value of a fifth timer indicating a duration of time after which the wireless device may declare (or indicate) a BFR procedure failure.

The wireless device (e.g., a physical layer of the wireless device) may measure the first set of RSs. The physical layer of the wireless device may indicate one or more beam failure instances and/or one or more beam non-failure instances periodically to the MAC entity of the wireless device, for example, based on the first threshold (e.g., the first threshold for beam failure detection). The physical layer of the wireless device may indicate a beam failure instance, for example, if the measured quality (e.g., RSRP or SINR) of at least one of the first set of RSs is lower than the first threshold (e.g., the first threshold for beam failure detection). The physical layer of the wireless device may indicate a beam non-failure instance, for example, if the measured quality (e.g., RSRP or SINR) of at least one of the first set of RSs is equal to or higher than the first threshold (e.g., the first threshold for beam failure detection). The periodicity of the indication (e.g., the indication of the beam failure or non-failure instance) may be a value, for example, a value configured or determined by the base station. The periodicity of the indication may be the same as the periodicity of transmission of the first set of RSs.

The MAC entity of the wireless device may set an instance counter (e.g., increment the instance counter by one), for example, after or in response to receiving a first beam failure indication from the physical layer. The MAC entity may increment the instance counter (e.g., increment the instance counter by one), for example, after or in response to receiving a contiguous second beam failure indication. The MAC entity may reset the instance counter (e.g., zero), for example, after or in response to receiving a third beam non-failure indication. The wireless device may receive a non-failure indication, which indicates that no beam failure has been detected and/or that the downlink control channels are of a sufficient quality (e.g., above a threshold quality).

The MAC entity may start the second timer associated with the second value (e.g., the value indicating the duration of time after which the BFR procedure may be triggered), for example, after or in response to receiving a first beam failure indication from the physical layer of the wireless device. The MAC entity may restart the second timer, for example, after or in response to receiving a second beam non-failure indication from the physical layer of the wireless device. The MAC entity may not trigger the BFR procedure, for example, if the second timer expires and the instance counter indicates a value smaller than the first value (e.g., the number of beam failure instances that may trigger the BFR procedure). The MAC entity may reset the instant counter (e.g., reset the instance counter to zero), for example, if the second timer expires and/or the instance counter indicates a value smaller than the first value (e.g., the number of beam failure instances that may trigger the BFR procedure). The MAC entity may also reset the second timer, for example, if the second timer expires and/or the instance counter indicates a value smaller than the first value (e.g., the number of beam failure instances that may trigger the BFR procedure). The MAC entity may trigger a BFR procedure, for example, if the instance counter indicates a value equal to or greater than the first value (e.g., the number of beam failure instances that may trigger the BFR procedure). The MAC entity may also trigger a BFR procedure, for example, if the MAC entity receives the first value (e.g., the number of beam failure instances that may trigger the BFR procedure) from the physical layer BFR procedure.

BFR procedure The MAC entity may perform at least one of: resetting the instance counter (e.g., resetting the instance counter to zero); resetting the second timer; and/or indicating to the physical layer to stop beam failure instance indication. The MAC entity may perform at least one of said actions, for example, after or in response to triggering the BFR procedure. The MAC entity may ignore the periodic beam failure instance indication, for example, after or in response to triggering the BFR procedure.

The MAC entity may start the fifth timer associated with the fifth value (e.g., the value indicating the duration of time after which the wireless device may declare or indicate a BFR procedure failure), for example, after or in response to triggering the BFR procedure. The MAC entity may request the physical layer of the wireless device to indicate a beam and/or the quality of the beam, for example, after or in response to starting the fifth timer. The physical layer of the wireless device may measure at least one of the second set of RSs. The physical layer of the wireless device may select a beam based on the second threshold. The beam may be determined by a CSI-RS resource index or a SS blocks index. The physical layer of the wireless device may select a beam, for example, if the measured quality (e.g., RSRP or SINR) of a RS associated with the beam is greater than the second threshold. The physical layer of the wireless device may not necessarily indicate the beam to the MAC entity periodically. Alternatively, the physical layer of the wireless device may indicate the beam to the MAC entity, for example, after or in response to receiving the request from the MAC entity.

The physical layer of the wireless device may indicate a beam to the MAC entity periodically, for example, after or in response to indicating a beam failure instance. The MAC entity may instruct the physical layer of the wireless device to send (e.g. transmit) a BFRQ signal promptly, since the MAC entity may have the beam available, for example, after or in response to triggering a BFR procedure.

The MAC entity may select a BFRQ signal based on the beam (e.g., the beam indicated by the physical layer) and instruct the physical layer to send (e.g., transmit) the BFRQ signal to a base station, for example, if the fifth timer is running Additionally, or alternatively, the MAC entity may select a BFRQ signal based on the beam and instruct the physical layer to send (e.g., transmit) the BFRQ signal to a base station, for example, after or in response to receiving the indication of the beam from the physical layer. The BFRQ signal may be a PRACH preamble associated with the beam. The BFRQ signal may be a PUCCH or SR signal associated with the beam.

The wireless device may start monitoring a PDCCH for receiving a DCI, at least in the first coreset, after a time period since sending (e.g., transmitting) the BFRQ signal. The time period may be a fixed period (e.g., four slots), or a value determined by a RRC message. The wireless device may start the fourth timer with a fourth value (e.g., the value indicating the duration of time during which the wireless device may receive a response from the base station), for example, after or in response to the time period since sending (e.g., transmitting) the BFRQ signal. The wireless device may monitor the PDCCH in the first coreset, for example, if the fourth timer is running The wireless device may receive a DCI via the PDCCH at least in the first coreset if the fourth timer is running The wireless device may consider the BFR procedure successfully completed in response to receiving the DCI via the PDCCH at least in the first coreset, for example, if the fourth timer is running. The wireless device may stop the fourth timer and/or stop the fifth timer, for example, after or in response to the BFR procedure being successfully completed. The wireless device may keep monitoring the PDCCH in the first coreset until receiving an indication for QCL parameters of a second PDCCH in a second coreset, for example, after or in response to the BFR procedure is successfully completed.

The wireless device may set a BFRQ transmission counter to a value (e.g., set the BFRQ counter to one, or any other value) in response to the fourth timer expiring. The wireless device may perform one or more actions comprising at least one of: sending (e.g., transmitting) the BFRQ signal; starting the fourth timer; monitoring the PDCCH; and/or incrementing the BFRQ transmission counter (e.g., incrementing the BFRQ transmission counter by one). The wireless device may perform the one or more actions, for example, after or in response to the fourth timer expiring. The wireless device may repeat the one or more actions, for example, until the BFR procedure is successfully completed or the fifth timer expires. The wireless device may determine (or indicate) the BFR procedure failure, for example, after or in response to the fifth timer expiring.

In existing BFR procedures, a wireless device may perform a BFR procedure on an SpCell (e.g., a PCell or a PSCell). A base station may send (e.g., transmit), to a wireless device, one or more messages comprising configuration parameters of one or more cells. The one or more cells may comprise at least a PCell (e.g., primary cell) or a PSCell, and one or more SCells (e.g., secondary cells). An SpCell (e.g., a PCell or a PSCell) and one or more secondary cells may operate on different frequencies and/or different bands. A secondary cell may support a multi-beam operation. In the multi-beam operation, a wireless device may perform one or more beam management procedures (e.g., a BFR procedure) on the secondary cell. The wireless device may perform a BFR procedure, for example, if at least one beam pair link of one or more beam pair links between the secondary cell and the wireless device fails. Existing BFR procedures may result in inefficiencies, for example, if there is a beam failure for one secondary cell of the one or more secondary cells. Accordingly, existing BFR procedures may be inefficient, take a long time, or increase battery power consumption. The enhanced BFR procedures described herein decrease the number of time-frequency resources configured for the BFR procedure of secondary cells, thereby increase the resource overhead efficiency of the BFR procedure. Moreover, the enhanced BFR procedures described herein share a dedicated coreset for BFR procedures of multiple cells (e.g., primary and/or secondary cells), such that the wireless device monitors fewer coresets, thereby increasing the efficiency of battery/power consumption as the wireless device monitors coresets.

Examples described herein enhance existing BFR procedures to improve downlink radio efficiency and to reduce uplink signaling overhead, for example, if there is a beam failure for one or more secondary cells. An enhanced process described herein uses a first cell control channel resource, for example, if a beam failure for a secondary cell occurs. Downlink signaling processes may be enhanced for recovery of a beam failure for a secondary cell. Uplink signaling may be enhanced for recovery of a beam failure for a secondary cell. Beam failure recovery procedures may be suitable for secondary cells, as secondary cells may operate on higher frequencies than primary cells (e.g., PCells) to increase data rates. Primary cells may operate on lower frequencies to increase the robustness of data transfers. Accordingly, improving BFR procedures for use with secondary cells would be beneficial.

Examples described herein provide processes for a wireless device and a base station to enhance a BFR procedure for a secondary cell (e.g., SCell). Examples described herein may enhance efficiency of a BFR procedure, for example, if a wireless device receives a DCI in a second coreset on an SCell. The wireless device may monitor at least a PDCCH in the second coreset on the SCell for the DCI with a cyclic redundancy check (CRC) scrambled by a C-RNTI. The BFR procedure may be successfully completed, for example, after or in response to the wireless device receiving a downlink assignment or an uplink grant, on the PDCCH of the secondary cell, addressed to the C-RNTI. Examples described herein may reduce a duration of the BFR procedure and may reduce battery power consumption, thereby providing increased efficiencies in the event of a beam failure.

A wireless device may not send (e.g., transmit) an uplink signal (e.g., a preamble) for a BFR procedure, for example, if a beam failure occurs on the SCell. Additionally, or alternatively, the wireless device may not send (e.g., transmit) the uplink signal for the BFR procedure, for example, if the wireless device is configured with an SCell, which may comprise downlink-only resources. The wireless device may not perform the BFR procedure on the SCell. Also, a base station may not be aware of the beam failure on the SCell. BFR procedures may be enhanced, for example, if an SCell comprises downlink-only resources.

An SCell may operate in a high frequency (e.g., 23 GHz, 60 GHz, 70 GHz, or any other frequency). In an example, an SpCell may operate in a low frequency (e.g., 2.4 GHz, 5 GHz, or any other frequency). The channel condition of the SCell may be different from the channel condition of the SpCell. The wireless device may use uplink resources of the SpCell to send (e.g., transmit) a preamble for a beam failure recovery request for the SCell, for example, to improve robustness of transmission of the preamble. BFR procedures may be enhanced, for example, if an Scell operates in a different frequency than PCell.

A base station may configure a wireless device with one or more bandwidth parts (BWPs) to achieve a bandwidth adaptation (BA). A base station may indicate, to a wireless device, which of the one or more BWPs (e.g., configured BWPs) is an active BWP. A wireless device may perform one or more beam management procedures (e.g., a BFR procedure) on the active BWP. The wireless device may perform a BFR procedure, for example, if at least one beam pair link of one or more beam pair links between the active BWP and the wireless device fails. Existing BFR procedures may also be enhanced to improve downlink radio efficiency and reduce uplink signaling overhead, for example, if bandwidth parts are configured for a cell.

A wireless device may initiate a BFR procedure on the active BWP, for example, if the wireless device detects a beam failure on the active BWP. The active BWP may comprise an active UL BWP and/or an active DL BWP, for example, an active UL BWP and/or an active DL BWP configured by a higher layer parameter (e.g., a RRC). The wireless device may switch to an initial BWP configured by a higher layer parameter (e.g., a RRC), for example, if the wireless device is not configured with at least a PRACH resource for the active UL BWP. The initial BWP may comprise an initial DL BWP and/or an initial UL BWP. The wireless device may initiate a BFR procedure on the initial BWP, for example, after or in response to the switching. The wireless device may use uplink resources of the initial BWP (e.g., UL BWP) to send (e.g., transmit) a preamble for a beam failure recovery request for the active BWP.

As described above, a BFR procedure may comprise the wireless device transmitting a preamble, for example, in response to identifying a candidate beam. Additionally, the BFR procedure may comprise the wireless device receiving, from a base station, a BFR response, for example, via a dedicated coreset that is configured for the BFR procedure. A secondary cell may comprise both an uplink channel and a downlink channel for transferring data, or may comprise only a downlink channel for data transfer. A BFR procedure may be supported for both types of secondary cells and, for example, under four different examples. The first example is the wireless device transmitting the preamble via the primary cell and receiving the BFR response via the primary cell. The second example is the wireless device transmitting the preamble via the primary cell and receiving the BFR response via the secondary cell. The third example is the wireless device transmitting the preamble via the secondary cell and receiving the BFR response via the primary cell. The fourth example is the wireless device transmitting the preamble via the secondary cell and receiving the BFR response via the secondary cell. As described above, the BFR procedure may be supported for a secondary cell having downlink only capabilities, for example, if the secondary cell does not have an uplink channel for preamble transmission (e.g., the third and fourth examples).

Figure 22A:
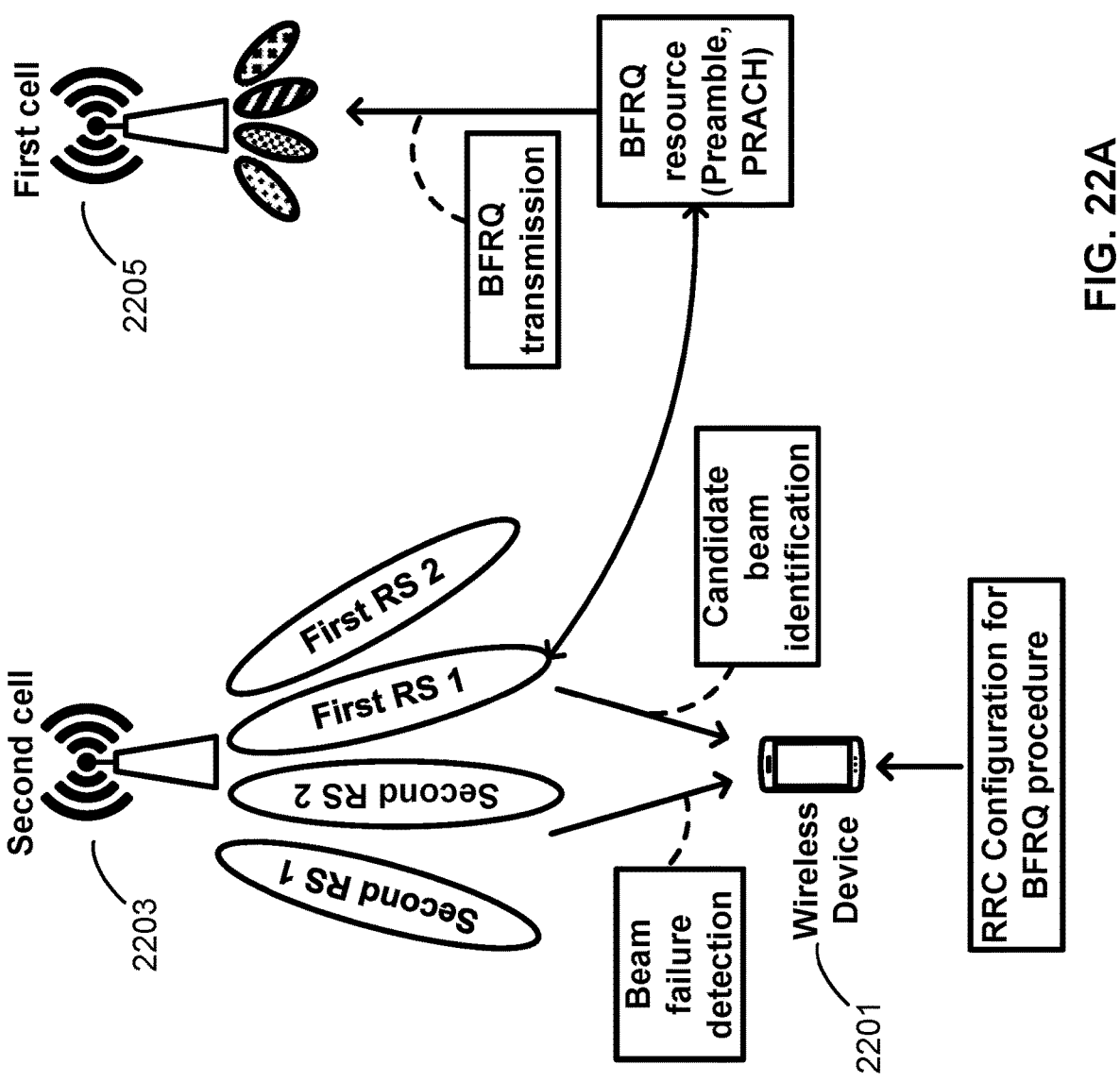
FIG. 22A and FIG. 22B show diagrams of example BFR procedures for a secondary cell.
Figure 22B:
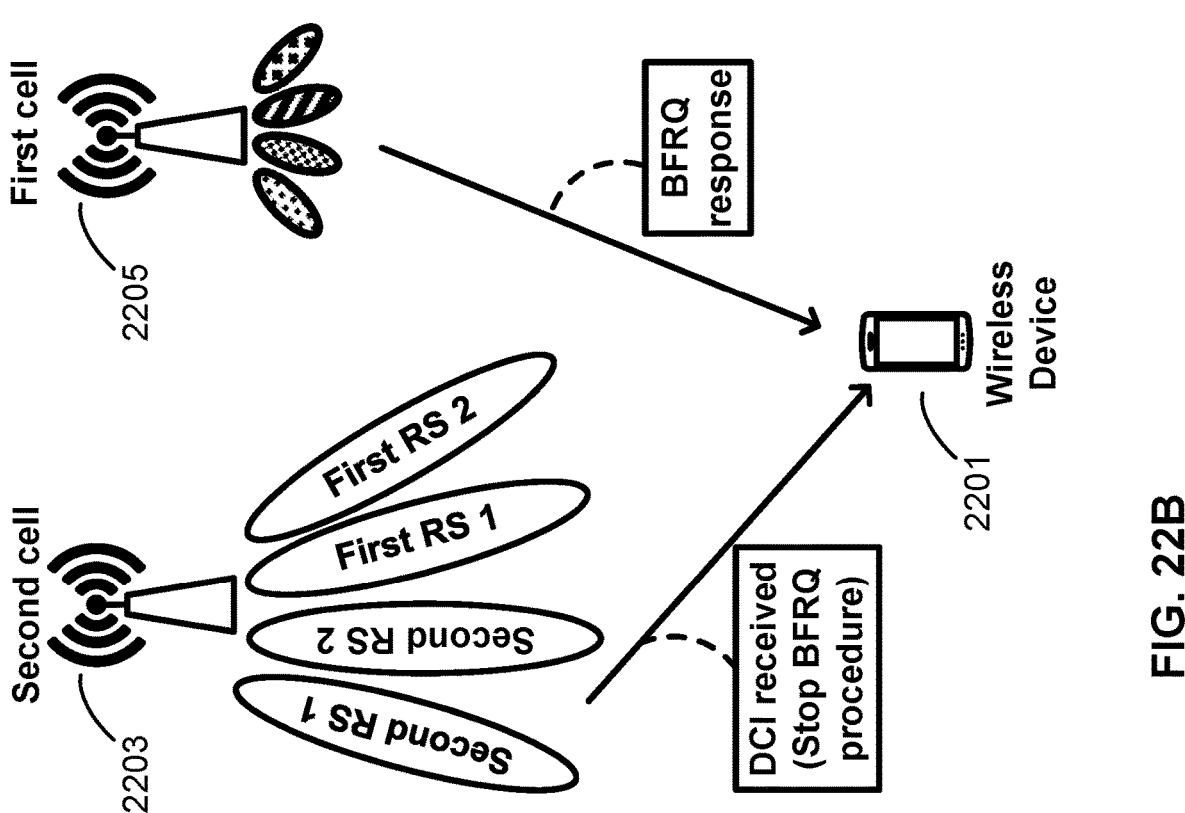

FIG. 22A and FIG. 22B show example diagrams for beam failure recovery procedures for a second (or secondary) cell. FIG. 22A shows a beam failure recovery procedure where preamble transmission and BFRQ response are performed via a first (or primary) cell, for example, as described above concerning the first example. In FIG. 22A, a base station sends (e.g., transmits) to a wireless device (e.g., a wireless device 2201), one or more messages comprising a first set of RS resource configurations for a second cell (e.g., a second cell 2203). The first set of RS resource configurations may comprise one or more first RSs (e.g., a CSI-RS or SS blocks) of the second cell 2203 (e.g., the Second RS 1 and the Second RS 2 shown in FIG. 22A). The one or more messages may further comprise a second set of RS resource configurations comprising one or more second RSs (e.g., a CSI-RS or SS blocks) of the second cell 2203 (e.g., the First RS 1 and the First RS 2 shown in FIG. 22A). The wireless device may measure radio link quality of one or more beams associated with the one or more first RSs and/or the one or more second RSs. The one or more messages may further comprise one or more BFRQ resources (e.g., the BFRQ resource shown in FIG. 22A) on a first cell (e.g., a first cell 2205). The one or more messages may further comprise an association between each of the one or more second RSs and each of the one or more BFRQ resources (e.g., the association between First RS 1 and BFRQ resource shown in FIG. 22A).

As shown in FIG. 22A, the wireless device 2201 may assess (or compare) a first radio link quality (e.g., a BLER, L1-RSRP) of the one or more first RSs against a first threshold. The first threshold (e.g., a BLER, L1-RSRP) may be a first value provided by a higher layer parameter (e.g., a RRC, a MAC). The wireless device 2201 may monitor a PDCCH of the second cell 2203. At least a RS (e.g., a DM-RS) of the PDCCH may be associated with (e.g., QCLed with) the one or more first RSs.

A base station may send (e.g., transmit) one or more messages comprising configuration parameters of a beam failure recovery procedure (e.g., the RRC configuration for the BFR procedure shown in FIG. 22A). As shown in FIG. 22A, the wireless device 2201 may detect a beam failure on the second cell (e.g., the SCell 2203), for example, if the first radio link quality of the one or more first RSs meets certain criteria. A beam failure may occur, for example, if the RSRP or SINR of the one or more first RSs is lower than the first threshold and/or if the BLER is higher than a second threshold. The first threshold and the second threshold may be the same value. The assessment may be for a consecutive number of times with a value provided by a higher layer parameter (e.g., the RRC, MAC).

The wireless device 2201 may initiate a candidate beam identification procedure on the second cell 2203, for example, after or in response to detecting the beam failure on the second cell 2203. For the candidate beam identification procedure, the wireless device may identify a first RS (e.g., the First RS 1 shown in FIG. 22A) among the one of the one or more second RSs. The first RS may be associated with a BFRQ resource (e.g., the BFRQ resource shown in FIG. 22A) of the one or more BFRQ resources on the first cell 2205. The BFRQ resource may comprise a preamble and a PRACH resource (e.g., a time and frequency resource). A second radio link quality (e.g., BLER, L1-RSRP) of the first RS may be better than a second threshold, for example, the second radio link quality of the first RS may have a lower BLER, a higher L1-RSRP, and/or a higher SINR than the second threshold. The second threshold may be a second value provided by the higher layer parameter (e.g., a RRC, a MAC).

The wireless device may send (e.g., transmit), in a first slot, the preamble via the PRACH resource (e.g., the BFRQ resource) on the first cell (e.g., the PCell 2205) for a BFR procedure of the second cell 2203, for example, after or in response to detecting the beam failure on the second cell 2203 and identifying the first RS of the second cell 2203. The wireless device 2201 may start, from a second slot, monitoring at least a first PDCCH in one or more first coresets on the first cell 2205 for a DCI within a response window, for example, after or in response to sending (e.g., transmitting) the preamble in the first slot. The DCI may be configured with a cyclic redundancy check (CRC) scrambled by a C-RNTI.

The BFR procedure may be successfully completed, for example, after or in response to receiving, within the configured response window, a downlink assignment or an uplink grant on the first PDCCH of the first cell 2205 in one or more coresets on the first cell 2205. The downlink assignment or the uplink grant may be received at the wireless device 2201 as shown by the BFRQ response in FIG. 22B. The downlink assignment or the uplink grant may be addressed to the C-RNTI. The wireless device 2201 may detect the beam failure caused by a fading dip (e.g., deep fading) on the second cell (e.g., the SCell 2203). Control channels of the second cell 2203 may improve, for example, during the BFR procedure. The one or more first RSs of the second cell 2203 may recover (e.g., recover from the fading dip). The wireless device 2201 may monitor control channels of the first cell 2205 and/or the control channels of the second cell 2203. The wireless device 2201 may monitor at least a second PDCCH in one or more second coresets of the second cell 2203 for a DCI. The DCI may be configured with the CRC scrambled by the C-RNTI. The BFR procedure may be successfully completed, for example, after or in response to receiving a second downlink assignment or a second uplink grant, addressed to the C-RNTI, on the second PDCCH in one or more second coresets on the second cell 2203. The one or more second coresets may be coresets where the wireless device may monitor the second PDCCH before the BFR procedure is triggered. Completing the BFR procedure based on the receiving the second downlink assignment or the second uplink grant may reduce a duration of the BFR procedure and may reduce battery power consumption.

Figure 23:
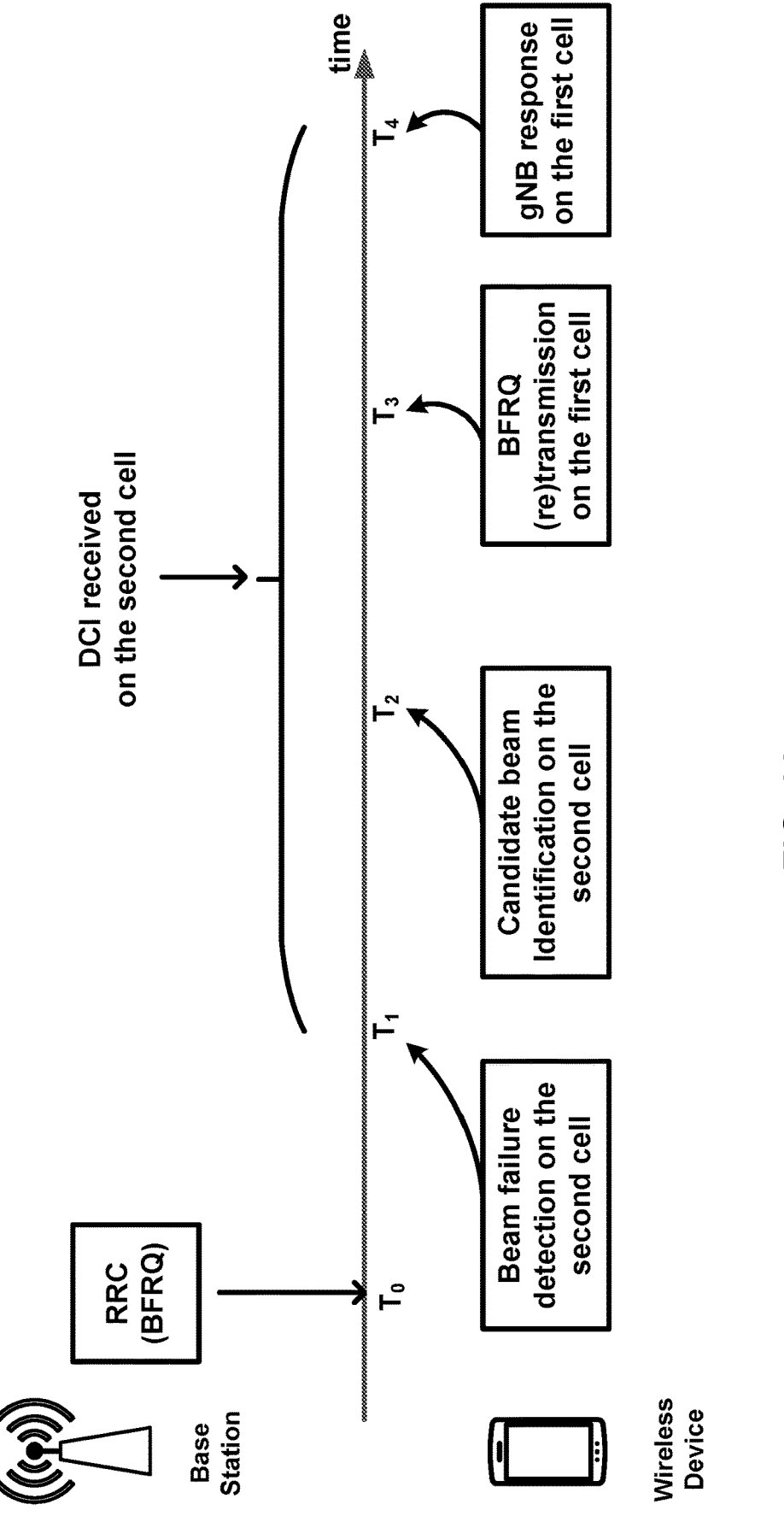
FIG. 23 shows examples of aborting a BFR procedure associated with a secondary cell via received downlink control information (DCI).

FIG. 23 shows an example of aborting a beam failure recovery procedure on a secondary cell. As shown at time $T_0$ in FIG. 23, the wireless device (e.g., the wireless device 2201) may receive, from a base station, one or more RRC messages comprising one or more configuration parameters of the BFR procedure. The wireless device may detect the beam failure on a second cell (e.g., the second cell 2203) at time $T_1$. The wireless device may detect a beam failure on a downlink control channel by determining that the black error rate (BLER) of the downlink control channel (e.g., beam pair link) is higher than a threshold value. The wireless device may initiate a candidate beam identification procedure on the second cell, for example, after or in response to detecting the beam failure on the second cell. For the candidate beam identification procedure, the wireless device may identify the first RS of the second cell at time $T_2$, as shown in FIG. 23. The wireless device may send (e.g., transmit) a preamble via a PRACH resource on the first cell (e.g., the first cell 2205) at time $T_3$, for example, after or in response to detecting the beam failure on the second cell (e.g., the second cell 2203) and identifying the first RS of the second cell. The wireless device may start monitoring, within a configured (or determined) response window, the first PDCCH in one or more first coresets on the first cell for a DCI with the CRC scrambled by a C-RNTI, for example, after or in response to sending (e.g., transmitting) the preamble. The wireless device may receive, at time $T_4$, a first cell response comprising a downlink assignment or an uplink grant, addressed to the C-RNTI, on the first PDCCH of the first cell in one or more first coresets on the first cell. BFR procedure The one or more first RSs of the second cell (e.g., the second cell 2203) may recover (e.g., recover from the fading dip), for example, during the BFR procedure. As shown in FIG. 23, the one or more first RSs of the second cell may recover (e.g., recover from the fading dip), for example, between time $T_1$ and time $T_4$. BFR procedure A blockage between the second cell (e.g., the second cell 2203) and the wireless device (e.g., the wireless device 2201) causing the beam failure may disappear or be removed, for example, during the BFR procedure (e.g., between time $T_1$ and time $T_4$ as shown in FIG. 23). If such blockage is removed, the BLER of the downlink control channel would no longer be above a threshold for detecting the beam failure, for example the first threshold. BFR procedure The BFR procedure may be successfully completed, for example, after or in response to receiving a downlink assignment or an uplink grant, addressed to the C-RNTI in (e.g., during) the BFR procedure (e.g., between $T_1$ and $T_4$ as shown in FIG. 23), on the second PDCCH of the second cell (e.g., the second cell 2203) in one or more second coresets on the second cell.

The wireless device may monitor a first downlink control channel (or a first coreset) and a second downlink control channel (or a second coreset) on a second cell (e.g., the second cell 2203), for example, under transmission and reception procedures. At To, the wireless device may detect a beam failure on the first downlink control channel and second downlink control channel The wireless device may initiate a BFR procedure for the second cell, for example, after or in response to detecting the beam failure. In (e.g., during) the BFR procedure (e.g., between $T_1$ and $T_4$ as shown in FIG. 23), the wireless device may monitor a dedicated coreset (configured for the BFR procedure) on the first cell or on the second cell. The wireless device may monitor the dedicated coreset for a BFR response. As described above, in (e.g., during) the BFR procedure and prior to receiving a downlink control information (DCI) or BFR response, the first downlink control channel and/or the second downlink control channel may recover, for example, the BFR procedure may be initiated due to a sudden drop in signal quality caused by signal blockage and then may recover after the blockage disappears or is removed. If the wireless device receives a downlink control information (DCI) in the first downlink control channel and/or the second downlink control channel of the second cell (e.g., the second cell 2203), the wireless device may abort or stop the BFR procedure for the second cell, for example, if the first downlink control channel and/or the second downlink control channel, for which the wireless device initiated the BFR procedure, begin to function again (e.g., the signal blockage disappears/dissipates).

The wireless device may deactivate a secondary cell, for example, by configuring the secondary cell with an SCell deactivation timer. The secondary cell may remain active, for example, if the SCell deactivation timer of that secondary cell is still running, and the secondary cell may deactivate, for example, if the SCell deactivation timer expires. The base station may deactivate a secondary cell by transmitting, to the wireless device, a MAC CE requesting the deactivation of the secondary SCell. The wireless device may deactivate the SCell, for example, after or in response to receiving the MAC CE.

The wireless device may transmit a preamble on the uplink channels of the secondary cell and receive the random access response on the primary cell, for example, if the wireless device is initiating a random access procedure for the secondary cell. Since the preamble transmission is performed on the uplink channel of the secondary cell, the wireless device may have to stop the random access procedure, for example, if the secondary cell is deactivated in (e.g., during) the random access procedure, given that the wireless device would be unable to transmit an uplink signal via a deactivated secondary cell.

The wireless device may send (e.g., transmit), via the primary cell, the preamble for the BFR procedure. The wireless device may monitor on the primary cell for the BFR procedure. The random access procedure for the BFR of the secondary cell may not be affected by a secondary cell being deactivated, for example, because the preamble transmission and the BFR response monitoring are performed, by the wireless device, on the primary cell. Some BFR procedures may require stopping the ongoing random access procedure if the secondary cell is deactivated, for example, if the preamble transmission would be performed by the wireless device on the secondary cell. An improved BFR procedure described herein provides the wireless device an option of stopping the random access procedure for the BFR procedure of the secondary cell or continuing the random access procedure for the beam failure recovery.

Figure 24A:
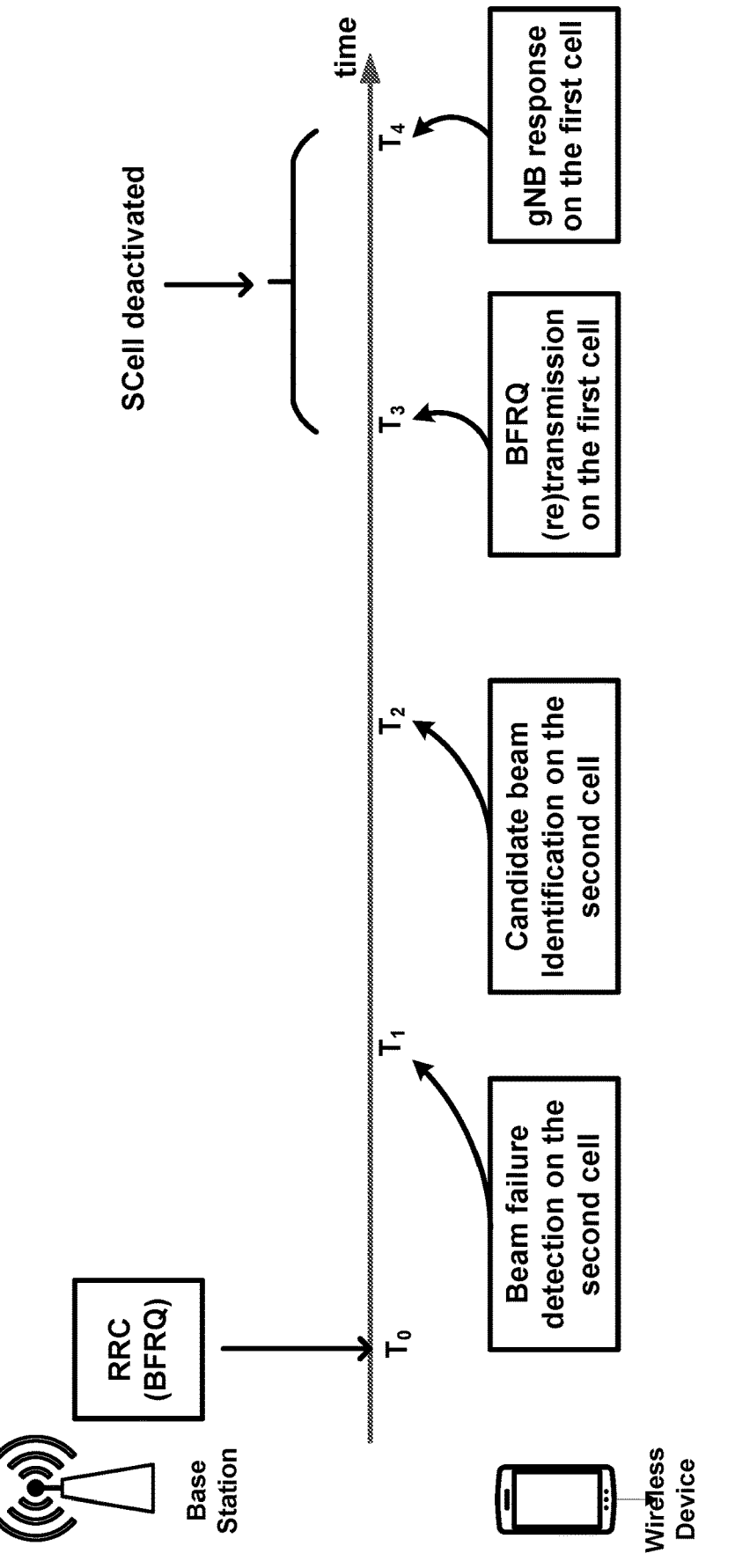
FIG. 24A and FIG. 24B show examples of secondary cell deactivation and aborting a random access procedure for the BFR procedure.
Figure 24B:
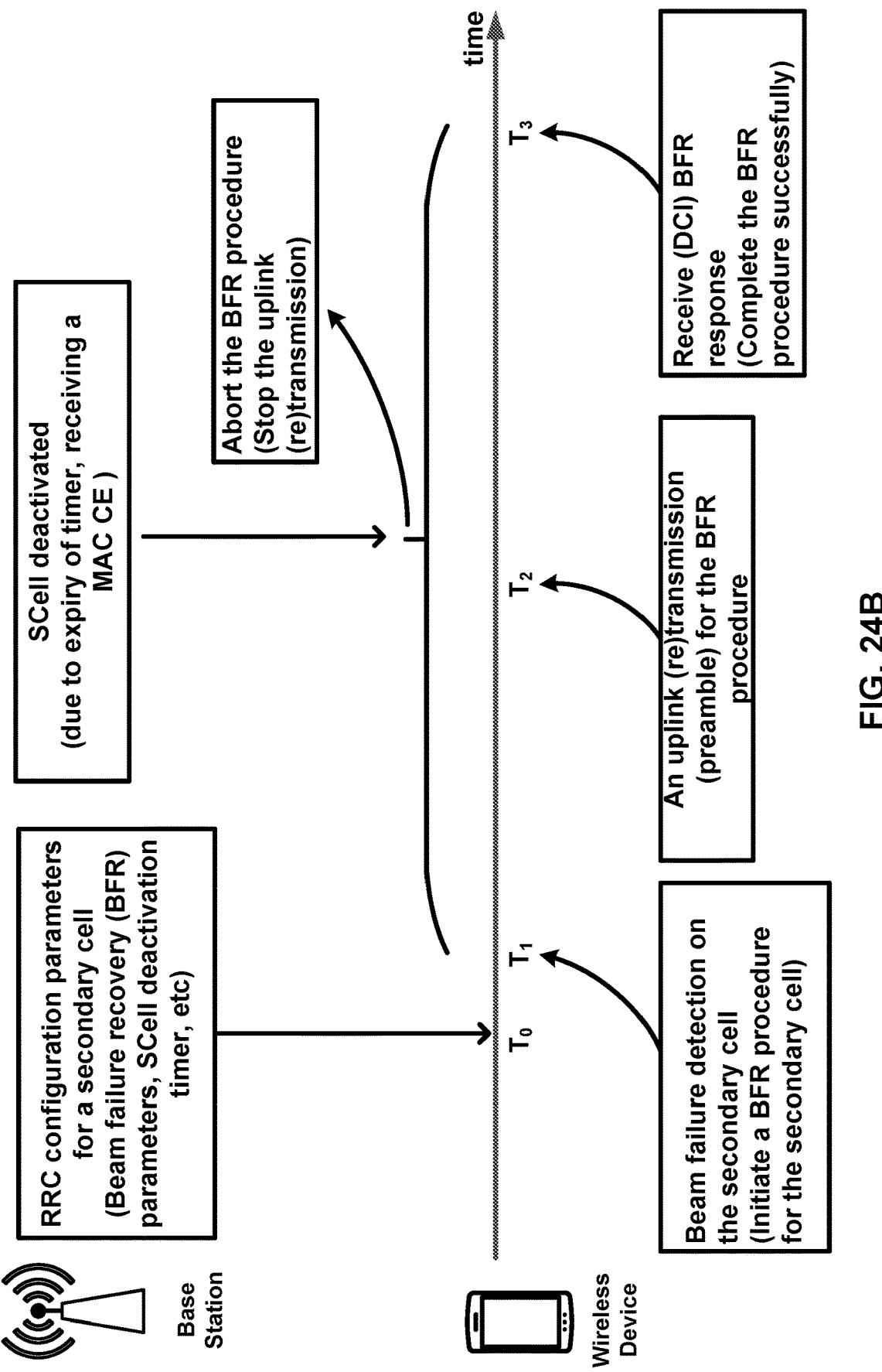

FIG. 24A and FIG. 24B show examples of secondary cell deactivation and aborting random access procedures for a BFR procedure. As shown at time $T_0$ in FIGS. 24A and 24B, the wireless device (e.g., the wireless device 2201) may receive from a base station, one or more RRC messages comprising one or more configuration parameters of the BFR procedure. The one or more configuration parameters may comprise BFR parameters and an SCell deactivation timer. The wireless device may detect a beam failure on the second cell (e.g., the second cell 2203) at time $T_1$, as shown in FIGS. 24A and 24B. At time $T_2$, as shown in FIG. 24A, the wireless device may initiate a candidate beam identification procedure on the second cell, for example, after or in response to the detecting the beam failure on the second cell. For the candidate beam identification procedure, the wireless device may identify the first RS of the second cell. At time $T_3$, as shown in FIG. 24A, the wireless device may send (e.g., transmit) the preamble via a PRACH resource on the first cell, for example, after or in response to detecting the beam failure on the second cell and identifying the first RS of the second cell. The wireless device may start monitoring, within a configured response window, a first PDCCH in one or more first coresets on the first cell (e.g., the first cell 2205) for a DCI, which may be configured with a cyclic redundancy check (CRC) scrambled by a C-RNTI. The wireless device may receive, at time $T_4$, a first cell response comprising a downlink assignment or an uplink grant, addressed to the C-RNTI, on the first PDCCH of the first cell in one or more first coresets on the first cell. As shown in FIG. 24B, at time $T_2$, the wireless device may send (e.g., transmit) the preamble for the BFR procedure, for example, via a PRACH resource on the first cell. The wireless device may send the preamble for the BFR procedure, for example, after or in response to detecting the beam failure on the second cell and identifying the first RS of the second cell.

As shown in FIG. 24A, the wireless device may deactivate the second cell, for example, at (e.g., during) a time period between the sending (e.g., transmitting) of the preamble and the receiving of the first cell response (e.g., between $T_3$ and $T_4$). As shown in FIG. 24B, the wireless device may deactivate the second cell, for example, at (e.g., during) a time period between initiating the BFR procedure for the secondary cell and the receiving of the BFR response (e.g., between $T_1$ and $T_4$). The wireless device may deactivate the second cell, for example, after or in response to receiving an SCell Activation/Deactivation MAC CE. The SCell Activation/Deactivation MAC CE may be received, for example, on the first cell (e.g., the first cell 2205). The base station may send (e.g., transmit), to the wireless device, one or more messages comprising a time, for example, an sCellDeactivationTimer timer. The wireless device may deactivate the second cell, for example, after or in response to an expiry of the sCellDeactivationTimer timer. The wireless device may not perform one or more operations comprising sending (e.g., transmitting) a SRS on the second cell; reporting a CQI, a PMI, a RI, or a CRI for the second cell on the first cell; sending (e.g., transmitting) an UL-SCH on the second cell; sending (e.g., transmitting) a RACH on the second cell; monitoring at least a third PDCCH on the second cell; monitoring at least a fourth PDCCH for the second cell on the first cell; or sending (e.g., transmitting) a PUCCH on the second cell. The wireless device may not perform the one or more operations, for example, in response to the deactivating the second cell (e.g., the second cell 2203). The wireless device may further not perform sending (e.g., transmitting) a RACH, via the first cell, for the BFR procedure for the second cell. The wireless device may stop sending (e.g., transmitting) uplink signals, such as the preamble, for the BFR procedure of the second cell on the first cell, for example, if the second cell has an ongoing BFR procedure on the first cell.

A wireless device (e.g., the wireless device 2201) may start a random access procedure (RACH) for a BFR procedure of the second cell on the first cell. BFR procedure The wireless device may abort the random access procedure for the BFR procedure of the second cell on the first cell, for example, if the wireless device deactivates the second cell in (e.g., during) the BFR procedure of the second cell.

In the event that the base station desires to serve the wireless device with a secondary cell, the base station may continue to transmit a DCI indicating an uplink grant and/or a downlink assignment on the secondary cell. The DCI transmitted by the base station restarts the SCell deactivation timer to ensure that the secondary cell is not deactivated, for example, if the base station desires to use the secondary cell to serve the wireless device. The wireless device may not receive, from the base station, the DCI restarting the SCell deactivation timer, for example, if there is a beam failure on the secondary cell. The wireless device may not receive the DCI, for example, because the downlink control channels of the secondary cell may fail with (e.g., during) the beam failure. The SCell deactivation timer may expire before the base station expects it to do so, for example, after or in response to not restarting the SCell deactivation timer. The base station may attempt to reactivate the secondary cell, for example if the secondary cell is deactivated, by sending a MAC-CE reactivating the secondary cell. Before the base station may transmit the MAC-CE to reactivate the secondary cell, the base station may attempt to ensure that there is no beam failure associated with the secondary cell. Accordingly, the base station may attempt to first complete the ongoing BFR procedure and after or in response to the successful completion of the BFR procedure, the base station may attempt to reactivate the secondary cell such that if the secondary cell is reactivated, the secondary cell may operate with functioning downlink control channels. To that end, the wireless device may not abort an ongoing random access procedure of the secondary cell, for example, if the secondary cell is deactivated. The wireless device may continue with the BFR procedure and, if the BFR procedure is successfully completed, the base station may reactivate the secondary cell.

As described above concerning FIGS. 24A & 24B and in more detail below concerning FIG. 25, for the improved BFR procedure(s) described herein, the wireless device may abort the BFR procedure of the secondary cell, for example, if the secondary cell is deactivated (e.g., via an SCell deactivation timer or MAC CE). The wireless device may stop or abort the sending (e.g., transmission) of a preamble for the BFR procedure on the primary cell (e.g., PCell). The wireless device may abort or stop the BFR procedure, for example, because the base station may no longer want to serve the wireless device with the secondary cell.

The wireless device may continue retransmitting the preamble for the BFR procedure, for example, if the wireless device does not stop or abort the BFR procedure. The base station may not want or attempt to recover the secondary cell, for example, because the base station may have already terminated attempts at recovering the secondary cell and/or assigned a different secondary cell for the wireless device. By continuing to send (e.g., transmit), to the base station, the preamble for the secondary cell, which the base station may not want to recover, the wireless device may waste resources and increase interference to other wireless devices. Moreover, the wireless device may monitor the dedicated coreset for a BFR response from the base station, for example, if the wireless device continues sending (e.g., transmitting) preambles for the BFR procedure. Given that the base station may not likely send (e.g., transmit) the BFR response if the base station may not want to recover the secondary cell, the wireless device may continue to needlessly monitor the coreset for the BFR response. By monitoring the dedicated coreset for the BFR response, the wireless device increases its power consumption. The wireless device may not determine the intention of the base station whether to keep the secondary cell activated or deactivated. Accordingly, the improved BFR procedures described herein provide the wireless device an option to stop or abort an ongoing BFR procedure, for example, if the secondary cell is deactivated, thereby reducing power consumption.

Figure 25:
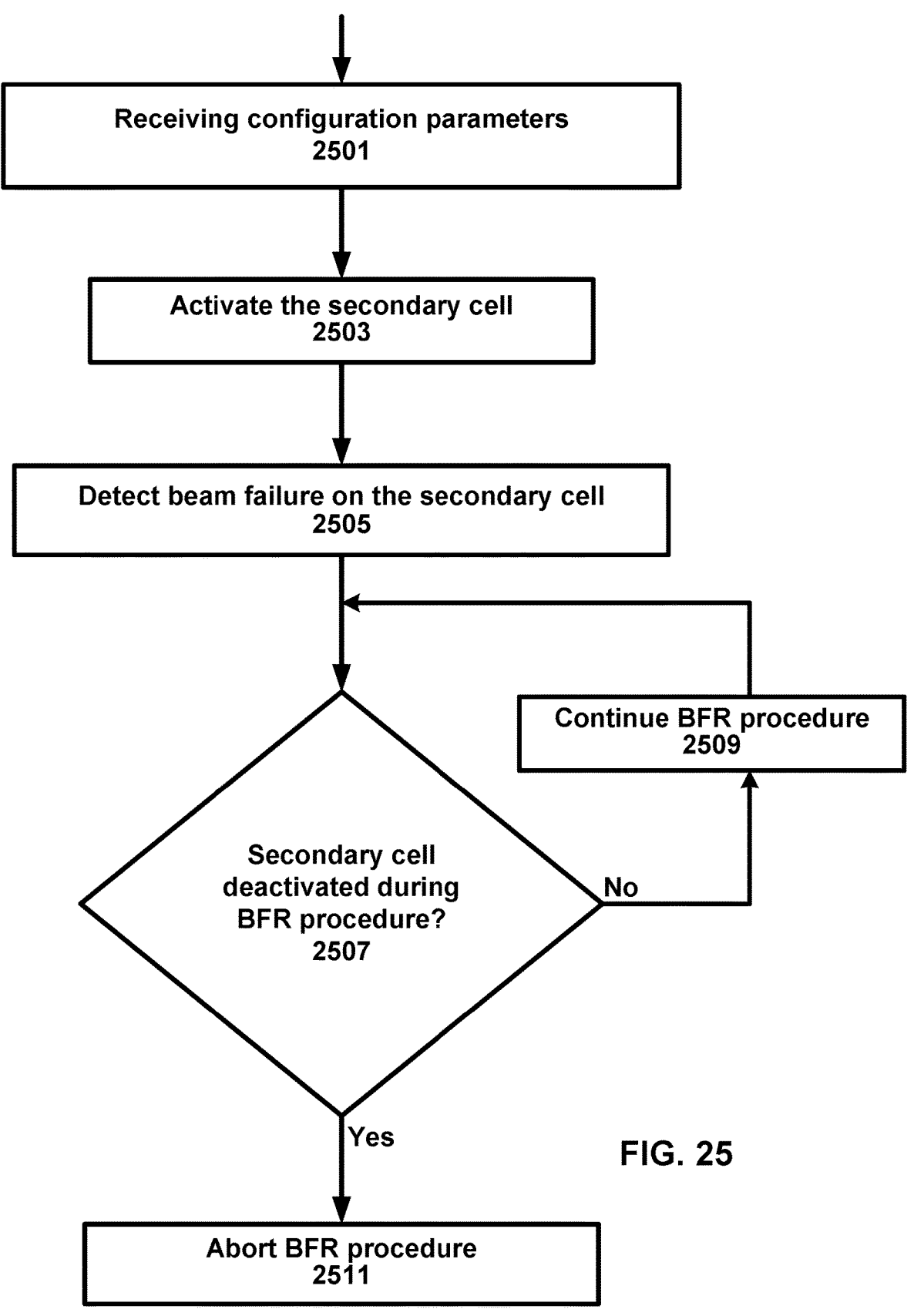
FIG. 25 shows a diagram of example BFR procedures for deactivating a secondary cell and continuing and/or aborting a BFR procedure.

FIG. 25 shows a diagram of example BFR procedures for deactivating a secondary cell and continuing and/or aborting a BFR procedure. At step 2501, a wireless device (e.g., the wireless device 2201) may receive, from a base station, one or more messages comprising one or more configuration parameters (e.g., RRC configuration parameters) of a first cell (e.g., the first cell 2205) and a second cell (e.g., the second cell 2203). The one or more configuration parameters may indicate one or more beam failure recovery request (BFRQ) resources on the first cell, one or more first reference signals (RSs) of the second cell, one or more second RSs of the second cell, and/or an association between each of the one or more first RSs and each of the one or more BFRQ resources. The one or more first RSs may comprise one or more first CSI-RSs and/or one or more first SS blocks. The one or more second RSs may comprise one or more second CSI-RSs and/or one or more second SS blocks. The PRACH resource may comprise one or more time resources and/or one or more frequency resources. At step 2503, the wireless device may activate the secondary cell (e.g., the second cell 2203), for example, after or in response to receiving a first medium-access control element (MAC CE) activating the secondary cell. The wireless device may start a deactivation timer, for example, in response to receiving the first MAC CE for activating the secondary cell.

At step 2505, the wireless device (e.g., the wireless device 2201) may detect a beam failure on the second cell (e.g., second cell 2203). The wireless device may initiate a BFR procedure, for example, after or in response to detecting a beam failure based on the one or more second RSs. The detecting the beam failure may comprise assessing (or comparing) one or more downlink control channels associated with the one or more second RSs having a radio quality lower than a first threshold value. The first threshold may be based on a first received signal strength (e.g., BLER and/or RSRP). The wireless device may select a selected candidate beam associated with a selected RS in the one or more first RSs. The selected RS may be associated with one of the one or more first RSs having a radio quality higher than a second threshold value. The second threshold value may be based on a second received signal strength, for example a BLER and/or a RSRP.

The selected RS may be associated with a BFRQ resource of the one or more BFRQ resources. The BFRQ resource may comprise a preamble and a PRACH resource. The wireless device (e.g., the wireless device 2201) may send (e.g., transmit) the preamble via the PRACH resource. The wireless device may monitor, for a DCI, a PDCCH of the second cell (e.g., the second cell 2203). The wireless device may complete the BFR procedure, for example, after or in response to receiving the DCI. The monitoring of the PDCCH may comprise searching for the DCI addressed for a C-RNTI in the PDCCH. The DCI may comprise a downlink assignment and/or an uplink grant.

At step 2507, the wireless device may determine whether the secondary cell is deactivated in (e.g., during) the BFR procedure. The wireless device may deactivate the secondary cell, for example, after sending the preamble and prior to receiving the primary cell response. The wireless device may deactivate the secondary cell, for example, after or in response to receiving a MAC CE for deactivating the secondary cell (e.g., an SCell Activation/Deactivation MAC CE). The wireless device may deactivate the secondary cell, for example, after or in response to the wireless device determining an expiry of the deactivation timer of the secondary cell (e.g., determining an expiry of an sCellDeactivationTimer timer). The wireless device may continue the BFR procedure, for example, after or in response to the wireless device determining that the secondary cell has not been deactivated in (e.g., during) the BFR procedure. At step 2511, the wireless device may abort the random access procedure (for the BFR procedure of the secondary cell) on the primary cell, for example, after or in response to deactivating the secondary cell (e.g., during the BFR procedure of the secondary cell). The wireless device may abort the random access procedure by stopping the sending (e.g., transmitting) of the preamble on the primary cell. At step 2511, the wireless device may abort the BFR procedure of the secondary cell, for example, after or in response to deactivating the secondary cell. The wireless device may abort the BFR procedure by stopping the sending (e.g., transmitting) of the preamble on the primary cell.

A wireless device may receive, from a base station, one or more messages (e.g., RRC messages) comprising one or more configuration parameters of a BFR procedure. The wireless device may receive, from the base station, one or more configuration parameters of a primary cell and a secondary cell. The one or more configurations parameters of the primary cell and the secondary cell may indicate a coreset (configured) on the primary cell for beam failure recovery of the primary cell and/or the secondary cell. The one or more configuration parameters may indicate one or more beam failure recovery request (BFRQ) resources on the primary cell, one or more first reference signals (RSs) of the secondary cell, a third RS of the primary cell, a fourth RS of the primary cell, one or more second RSs of the secondary cell, and/or an association between each of the one or more first RSs and each of the one or more BFRQ resources.

The wireless device may initiate a first beam failure recovery procedure, for example, after or in response to detecting a beam failure of the secondary cell. The first beam failure recovery procedure may relate to the wireless device sending (e.g., transmitting) a preamble. The wireless device may identify a first RS of the secondary cell. The first RS may be associated with a BFRQ resource on the primary cell. The BFRQ resource may comprise a preamble and a PRACH resource, for example a time resource and/or a frequency resource. The wireless device may send (e.g., transmit) a preamble via the PRACH resource on the primary cell (for a BFR procedure of the secondary cell), for example, in response to detecting the beam failure on the secondary cell and identifying a first RS of the secondary cell. The wireless device may detect a beam failure on the secondary cell, for example, if a first radio link quality of the one or more first RSs meets certain criteria.

The wireless device may monitor a first coreset for a first downlink control information (DCI). The first DCI may comprise a first resource grant for the primary cell. The wireless device may monitor a first control resource set (coreset) of the primary cell to monitor a first beam failure recovery response associated with the primary cell. Additionally, or alternatively, the wireless device may monitor the first coreset of the primary cell to monitor a second beam failure recovery response associated with the secondary cell. The wireless device may start monitoring, within a first response window, a PDCCH in one or more coresets on the primary cell for a DCI, for example, after or in response to sending (e.g., transmitting) the preamble. The DCI may be configured with a cyclic redundancy check (CRC) scrambled by a C-RNTI. The wireless device may monitor the PDCCH of the first cell according to an antenna port associated with a third RS of the primary cell, for example, the antenna port may be associated with (e.g., QCLed with) the third RS of the primary cell. The wireless device may select the third RS based on a timing of the sending (e.g., transmitting) the preamble. The wireless device may start, monitoring, from a second slot and within a response window, a PDCCH in one or more coresets on the primary cell for a DCI, for example, after or in response to transmitting the preamble in the first slot. The wireless device may monitor the one or more coresets for a beam failure recovery response from the base station. The beam failure recovery response may be associated with a beam failure on the primary cell and/or may be associated with a beam failure on one or more secondary cells. The wireless device may complete the first beam failure recovery procedure, for example, after or in response to receiving the first DCI. The wireless device may determine that the BFR procedure is successfully completed, for example, after or in response to receiving, within the response window, a downlink assignment or an uplink grant on the first PDCCH of the primary cell.

The wireless device may initiate a second beam failure recovery procedure, for example, after or in response to detecting a second beam failure of the secondary cell. The second beam failure recovery procedure may relate to the wireless device sending (e.g., transmitting) a preamble. The wireless device may use (or initiate) a second BFRQ transmission. The wireless device may monitor the first coreset for a second DCI. The second DCI may comprise a second resource grant for the secondary cell. The wireless device may monitor the PDCCH of the primary cell according to an antenna port associated with (e.g., QCLed with) the Third RS 2. The wireless device may receive a first DCI comprising a downlink assignment or an uplink grant, addressed to the C-RNTI, on the PDCCH of the primary cell. The wireless device may monitor the first coreset of the primary cell to monitor (or determine) a second beam failure recovery response associated with the secondary cell. The wireless device may complete the second beam failure recovery procedure, for example, after or in response to receiving the second DCI. The wireless device may determine the BFR procedure is successfully completed, for example, after or in response to receiving the first DCI.

In some BFR procedures on a primary cell, the wireless device sends (e.g., transmits) a preamble via a time-frequency resources associated with a candidate RS, for example, if the wireless device identifies the candidate RS (or a candidate beam). The wireless device may monitor a physical downlink control channel (PDCCH) in a dedicated coreset to identify a BFR response (e.g., DCI), for example, after or in response to the sending (e.g., transmitting) the preamble. A demodulation reference signal (DM-RS) of a channel (e.g., PUSCH, PDCCH, PDSCH) may be used to decode the channel In some BFR procedures, the DM-RS of the PDCCH in the dedicated coreset may be quasi co-located (QCLed) with the candidate RS (e.g., candidate beam), for example, the base station may send (e.g., transmit) the DM-RS of the PDCCH and the candidate RS with the same beam from the same antenna port. By quasi co-locating the DM-RS with the candidate RS, the DM-RS and the candidate RS may have the same or similar spatial properties. The wireless device may decode the PDCCH with the candidate RS. The wireless device may also decode the PDCCH with the assumption that the DM-RS of the PDCCH is equal to (or the same as) the candidate RS.

During a BFR procedure for a secondary cell (e.g., one of the first or third examples described above where the BFR response is transmitted on the primary cell), the wireless device may not monitor the PDCCH in the dedicated coreset of the primary cell with the candidate RS. The wireless device may not monitor the PDCCH in the dedicated coreset of the primary cell with the candidate RS, for example, because the candidate RS may be located or configured on the secondary cell and the dedicated coreset may be located or configured on the primary cell. The wireless device may not monitor the dedicated coreset on the primary cell with a beam (or RS) configured on the secondary cell, for example, because the primary cell and the secondary cell may operate on different frequencies. For example, the primary cell may operate in low frequencies, and the secondary cell may operate in high frequencies. The candidate beam (or candidate RS) determined for the secondary cell may not be applicable for receiving a BFR response via the PDCCH on the primary cell. As described below in FIG. 26, this issue may be resolved by using a BFR procedure for a secondary cell where the wireless device may use or select a reference signal, rather than a candidate beam, configured on a primary cell to monitor the BFR response on a dedicated coreset of the primary cell.

During a BFR procedure of a primary cell, a wireless device may select a candidate reference signal (RS) in response to detecting a beam failure for the primary cell and may transmit a preamble associated with the candidate RS. The wireless device may monitor a coreset on the primary cell using the candidate RS. In the enhanced BFR procedures for a secondary cell described herein (and described below concerning FIG. 26), the wireless device may select a candidate RS after or in response to detecting a beam failure for the secondary cell. The wireless device may transmit a preamble associated with the candidate RS. However, the coreset may be located on the primary cell, while the candidate RS is located on the secondary cell. Therefore, unlike the primary cell case described above, the wireless device may not monitor the coreset on the primary cell with the candidate RS on the secondary cell, as these cells operate on different frequencies. Accordingly, the wireless device may select another RS configured on the primary cell to monitor the coreset on the primary cell.

Figure 26:
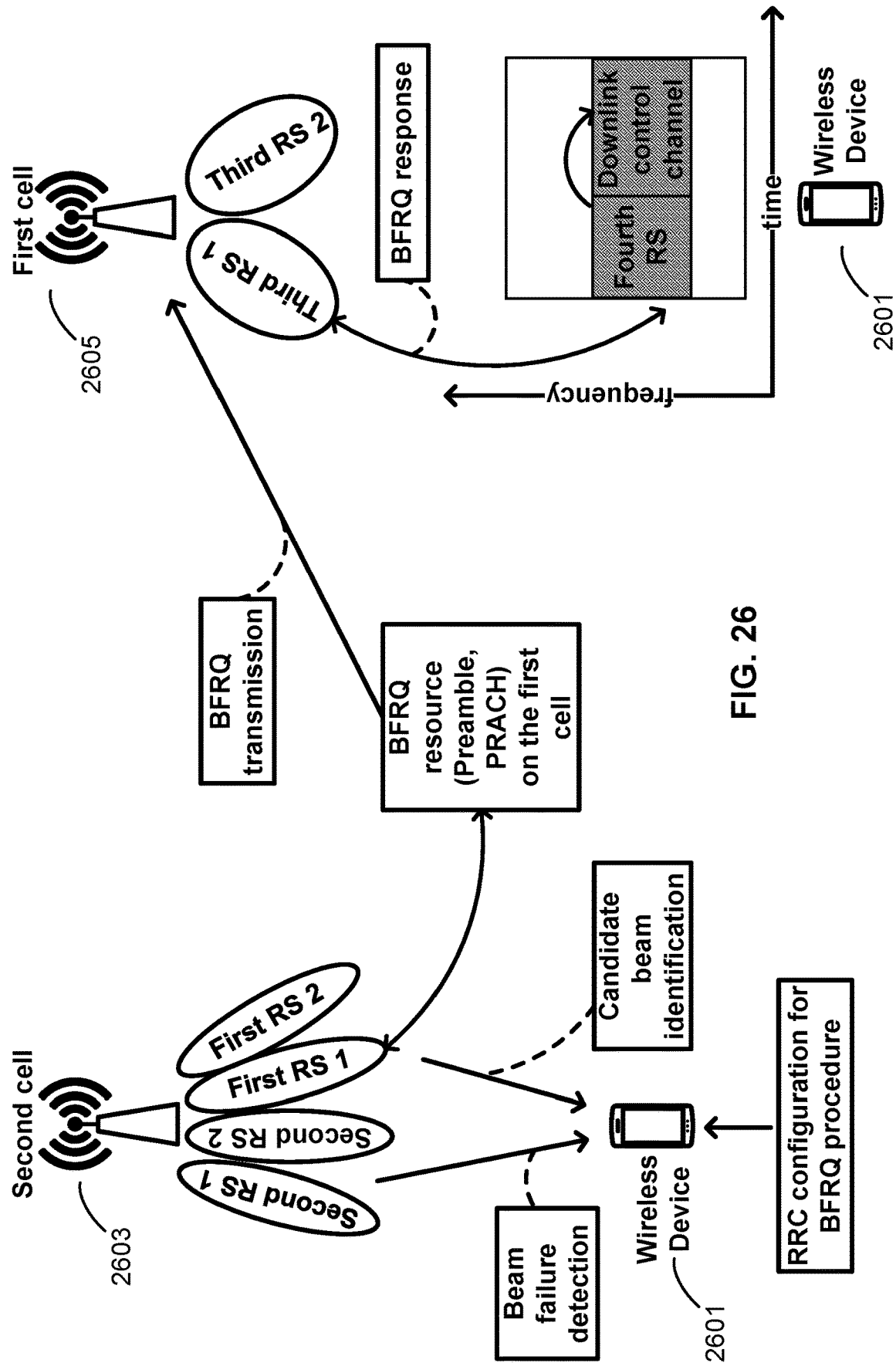
FIG. 26 shows a diagram of example BFR procedures for a secondary cell and selecting a reference signal (RS) configured on a primary cell.

FIG. 26 shows an example diagram of beam failure recovery procedures for a secondary cell and selecting a reference signal (RS). The BFR procedures shown in FIG. 26 may be performed for a secondary cell. The wireless device may use or select a reference signal (RS) configured on a primary cell, instead of selecting a candidate RS, to monitor the BFR response on the dedicated coreset of the primary cell. As shown in FIG. 26, a base station sends (e.g., transmits) to a wireless device (e.g., the wireless device 2601), one or more messages comprising a first set of RS resource configurations for a second cell (e.g. the second cell 2603). The first set of RS resource configurations may comprise one or more first RSs (e.g., a CSI-RS or SS blocks) of the second cell 2603, for example, the Second RS 1 and the Second RS 2 shown in FIG. 26. The one or more messages may further comprise a second set of RS resource configurations. The second set of RS resource configurations may comprise one or more second RSs (e.g., a CSI-RS or SS blocks) of the second cell 2603, for example, the First RS 1 and the First RS 2 shown in FIG. 26. The wireless device 2601 may measure radio link quality of one or more beams associated with the one or more first RSs and/or the one or more second RSs. The one or more messages may further comprise one or more BFRQ resources (e.g., the BFRQ resource shown in FIG. 26) on a first cell 2605 (e.g. PCell). The one or more messages may further comprise an association between each of the one or more second RSs and each of the one or more BFRQ resources, for example, an association between the First RS 1 and the BFRQ resource shown in FIG. 26. The one or more messages may comprise a third set of RS resource configurations. The third set of RS resource configurations may comprise one or more third RSs (e.g., a CSI-RS and/or SS blocks) of the first cell 2605, for example, the Third RS 1 and the Third RS 2 shown in FIG. 26).

The wireless device 2601 may assess (or compare) a first radio link quality (e.g., a BLER or L1-RSRP) of the one or more first RSs against a first threshold. The first threshold (e.g., the BLER, L1-RSRP) may be a first value provided by a higher layer parameter (e.g., a RRC, a MAC). The wireless device 2601 may monitor a PDCCH of the second cell 2603. A RS (e.g., a DM-RS) of the PDCCH may be associated with the one or more first RSs, for example, the PDCCH may be QCLed with the one or more first RSs.

A base station may send (e.g., transmit), to the wireless device, one or more messages comprising configuration parameters of a beam failure recovery procedure, for example, the RRC configuration for the BFR procedure shown in FIG. 26. As shown in FIG. 26, the wireless device 2601 may detect a beam failure on the second cell (e.g., the SCell 2603), for example, if the first radio link quality of the one or more first RSs meets certain criteria. A beam failure may occur, for example, if the RSRP or SINR of the one or more first RSs is lower than the first threshold and/or the BLER is higher than a threshold (e.g., the first threshold). The assessment may be performed for a consecutive number of times. The number of consecutive performances of the assessment may be determined by a higher layer parameter (e.g., a RRC, a MAC).

The wireless device 2601 may initiate a candidate beam identification procedure on the second cell 2603, for example, in response to detecting the beam failure on the second cell. For the candidate beam identification procedure, the wireless device 2601 may identify a first RS (e.g., the First RS 1 shown in FIG. 26) among a second RS of the one or more second RSs. The first RS may be associated with a BFRQ resource (e.g., the BFRQ resource shown in FIG. 26) of the one or more BFRQ resources on the first cell 2605. The BFRQ resource may comprise a preamble and a PRACH resource, for example a time resource and/or a frequency resource. A second radio link quality (e.g., a BLER, a L1-RSRP) of the first RS may be better than a second threshold, for example, the second radio link quality of the first RS may have a lower BLER, a higher L1-RSRP, or a higher SINR than the second threshold. The second threshold may comprise a second value provided by the higher layer parameter (e.g., a RRC, a MAC).

The wireless device 2601 may send (e.g., transmit), in a first slot, the preamble via the PRACH resource (e.g., the BFRQ resource) on the first cell (e.g., the PCell 2605) for a BFR procedure of the second cell 2603, for example, after or in response to detecting the beam failure on the second cell and identifying the first RS of the second cell. The wireless device 2601 may start, from a second slot, monitoring, within a response window, a PDCCH in one or more coresets on the first cell 2605 for a DCI, for example, after or in response to sending (e.g., transmitting) the preamble in the first slot. The DCI may be configured with a cyclic redundancy check (CRC) scrambled by a C-RNTI.

A base station may send (e.g., transmit), to a wireless device (e.g., the wireless device 2601), one or more messages comprising configuration parameters of one or more cells. The one or more cells may comprise at least a PCell or a PSCell, and one or more SCells. The one or more messages may further comprise one or more control resource sets (coresets) on the PCell or PSCell. The wireless device 2601 may monitor the one or more control resource sets for a beam failure recovery response from the base station. The beam failure recovery response may be associated with a beam failure on the PCell or the PSCell, and/or may be associated with a beam failure on the one or more SCells. BFR procedure The one or more control resource sets may be used to monitor the beam failure recovery response of the beam failure on one of the PCell or the PSCell, or one of the one or more SCells, for example, if the wireless device 2601 is configured to support a single BFR procedure. BFR procedure One or more second control resource sets may be needed, for example, if the wireless device 2601 is configured to support one or more simultaneous BFR procedures. The one or more messages may further comprise an association between each of the one or more second control resource sets and each of the PCell or the PSCell, and the one or more SCells. The base station may send (e.g., transmit) a beam failure recovery response on a first coreset resource of the one or more second control resource sets. The base station may use the first coreset resource for one of the PCell or the PSCell, or one of the one or more SCells. The one more second control resource sets may be used, by the wireless device 2601 and/or the base station, to differentiate a cell associated with a beam failure. A first beam failure and a second beam failure may occur on a PCell and a SCell, respectively. The wireless device 2601 may monitor a first control resource set of the PCell and a second control resource set of the PCell to monitor a first beam failure recovery response associated with the PCell. Additionally, or alternatively, the wireless device 2601 may monitor the first control resource set of the PCell and the second control resource set of the PCell to monitor a second beam failure recovery response associated with the SCell.

A first accuracy of channel estimation via an RS (e.g., a DM-RS) may be lower than a second accuracy of channel estimation via a third RS (e.g., a CSI-RS). A wireless device (e.g., the wireless device 2601) may improve the first accuracy of channel estimation via the RS (e.g., a DM-RS) based on information about radio channel characteristics acquired by channel estimation via the third RS (e.g., a CSI-RS), for example, if the third RS is associated with (e.g., QCLed with) the RS.

As shown in FIG. 26, a wireless device (e.g., the wireless device 2601) may monitor the PDCCH of the first cell 2605 in the one or more first coresets according to an antenna port associated with a third RS, for example, an antenna port associated with (e.g., QCLed with) a third RS. The third RS, for example, the Third RS 1 shown in FIG. 22, may be selected from the one or more third RSs of the first cell 2605. A fourth RS (e.g., a DM-RS) of the PDCCH, such as the Fourth RS shown in FIG. 26, may be associated with the third RS, for example, the fourth RS may be QCLed with the third RS. A base station may send (e.g., transmit) an indication of quasi co-location between antenna port(s) of the third RS and the fourth RS.

A wireless device (e.g., the wireless device 2601) may determine that the BFR procedure is successfully completed, for example, after or in response to receiving, within the response window, a downlink assignment or an uplink grant on the first PDCCH of the first cell. The downlink assignment or the uplink grant may be received at the wireless device 2601 as shown by the BFRQ response in FIG. 26B. Additionally, or alternatively, the downlink assignment or the uplink grant may be addressed to a C-RNTI.

Figure 27:
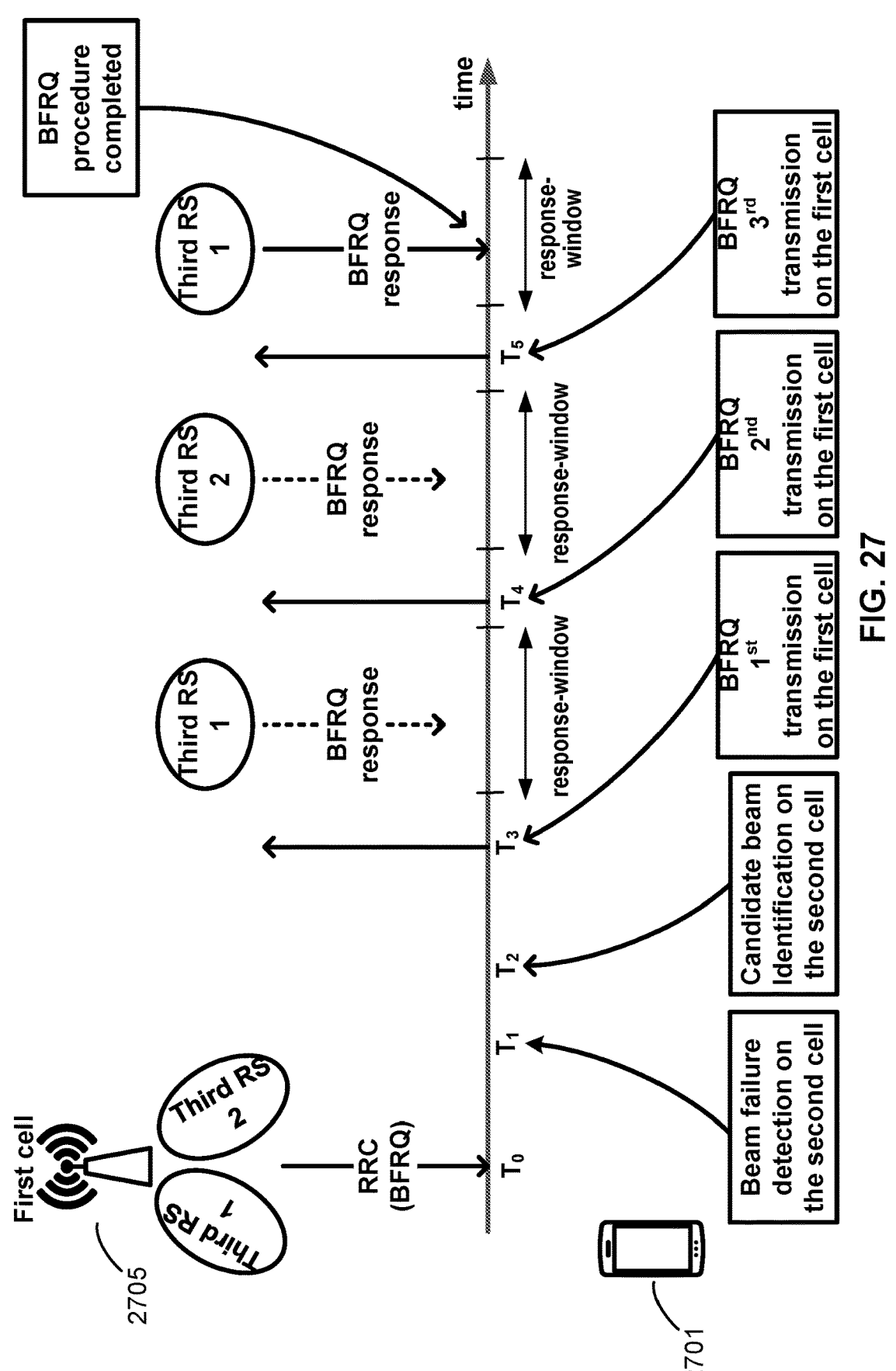
FIG. 27 shows examples of quasi co-locating (QCL) a demodulated reference signal (DM-RS) with a reference signal (RS) for the primary cell.

The candidate beam (or candidate RS) determined for the secondary cell may not be applicable (e.g., in some systems) for receiving the BFR response via the PDCCH on the primary cell. This issue may be traversed via the enhanced BFR procedures described herein by ensuring that whichever RS (or beam) that the base station may use for the primary cell (e.g., if the wireless device monitors for the BFR response on the primary cell or the wireless device sends the preamble for the BFR procedure), the DM-RS of the PDCCH in the dedicated coreset of the primary cell may be associated with (e.g., QCLed with) the RS (or beam) that the base station may use for the primary cell. As shown in FIG. 27 and as described in more detail below, for a first preamble transmission, the base station may serve the primary cell with a first RS (e.g., the Third RS-1 shown in FIG. 27), for example, if the wireless device monitors for a BFR response. The wireless device may decode the PDCCH in the coreset, for example, with the assumption that the DM-RS of the PDCCH is equal to or the same as the Third RS-1. For the second preamble transmission, the base station may serve the primary cell with a second RS (e.g., the Third RS-2 shown in FIG. 27), for example, if the wireless device monitors for a BFR response. The wireless device may decode the PDCCH in the dedicated coreset, for example, with the assumption that the DM-RS of the PDCCH is equal to or the same as the Third RS-2. Accordingly, the selected RS (e.g., the Third RS-1 or the Third RS-2) may be based on a timing of the preamble transmission (e.g., the first or second preamble transmissions shown in FIG. 27).

FIG. 27 shows an example diagram of beam failure recovery procedures and quasi co-locating (QCL) a demodulated reference signal (DM-RS) with a RS for the primary cell. At time $T_0$, a wireless device (e.g., the wireless device 2701) may receive, from a base station, one or more RRC messages comprising one or more configuration parameters of a BFR procedure. At time $T_1$, the wireless device (e.g., the wireless device 2701) may detect a beam failure on a second cell. The wireless device 2701 may initiate a candidate beam identification procedure on the second cell, for example, after or in response to the detecting the beam failure on the second cell. For the candidate beam identification procedure, at time $T_2$, the wireless device 2601 may identify a first RS of the second cell. At time $T_3$, the wireless device 2701 may send (e.g., transmit) a preamble via a PRACH resource on the first cell 2705, for example, in response to detecting the beam failure on the second cell and identifying the first RS of the second cell. The wireless device 2701 may start monitoring, within a first response window, a PDCCH in one or more coresets on the first cell 2705 for a DCI, for example, after or in response to sending (e.g., transmitting) the preamble. The DCI may be configured with a cyclic redundancy check (CRC) scrambled by a C-RNTI. The wireless device 2701 may monitor the PDCCH according to an antenna port associated with a third RS of the first cell 2705, for example, an antenna port QCLed with the third RS of the first cell 2705. The third RS may be selected among the one or more third RSs of the first cell 2705. The third RS may be selected based on a timing of the sending (e.g., transmitting) of the preamble, for example, the timing of the first BFRQ transmission ($T_3$) and the second BFRQ transmission ($T_4$).

The base station may use the one or more third RSs in a time slot for control channels of the first cell 2705. The wireless device 2701 may identify the one or more third RSs of the first cell 2705 in the time slot, for example, using RRC configuration parameters and/or MAC/PHY configuration parameters. The base station may use the one or more third RSs (e.g., the Third RS 1 shown in FIG. 27) for the control channels, for example, during the first response window. The wireless device 2701 may monitor a PDCCH of the first cell 2705 according to an antenna port associated with (e.g., QCLed with) the Third RS 1, for example, after or in response to the base station using the Third RS 1 in (e.g., during) the first response window. At time $T_4$, the wireless device 2701 may use a second BFRQ transmission, for example, if the wireless device does not receive a response from the base station. The base station may use the one or more third RSs (e.g., the Third RS 2 shown in FIG. 27) for the control channels, for example, during a second response window after the second BFRQ transmission. The wireless device 2701 may monitor the PDCCH of the first cell 2705 according to an antenna port associated with (e.g., QCLed with) the Third RS2. At time $T_5$, the wireless device 2701 may use a third BFRQ transmission, for example, if the wireless device does not receive a response from the base station. The wireless device 2701 may receive a first DCI comprising a downlink assignment or an uplink grant, addressed to the C-RNTI, on the PDCCH, for example, in (e.g., during) a third response window and/or after the third BFRQ transmission. The wireless device 2701 may determine the BFR procedure is successfully completed, for example, after or in response to receiving the first DCI.

The wireless device may monitor a dedicated coreset on the primary cell with a preconfigured RS. The wireless device may decode the PDCCH in the dedicated coreset with the assumption that the DM-RS of the PDCCH is equal to or the same as the configured RS (e.g., Third RS-1), for example, if the base station configures the RS (e.g., the Third RS-1) for monitoring the dedicated coreset.

Figure 28:
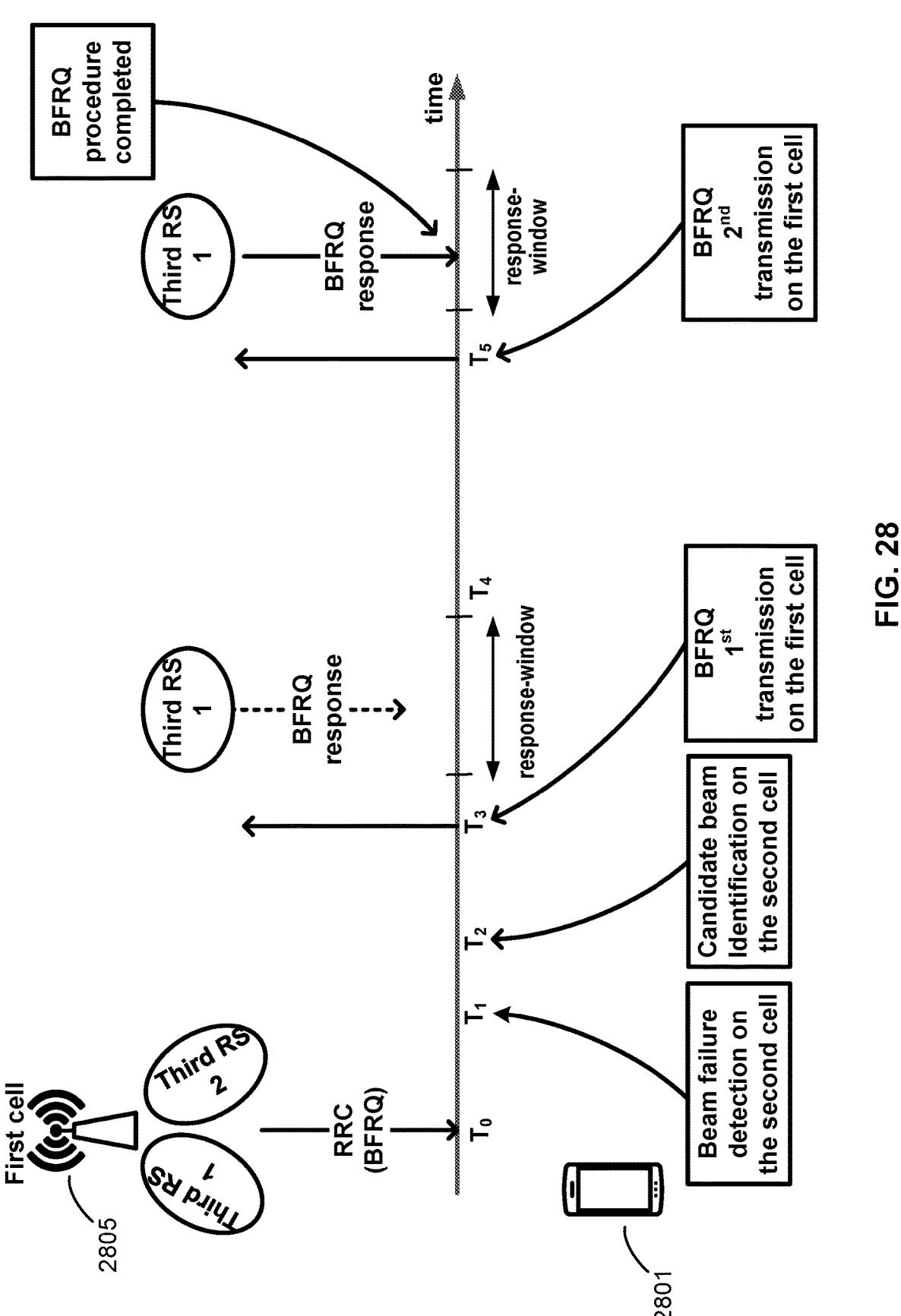
FIG. 28 shows examples of a wireless device monitoring a primary cell control resource set (coreset) via a preconfigured RS.

FIG. 28 shows an examples of a wireless device monitoring a primary cell control resource set (coreset) via a preconfigured RS. The one or more third RSs may be preconfigured. The third RS may be preconfigured by a parameter, for example, a parameter in a MAC CE, a parameter in a RRC message, a parameter in a DCI, and/or a parameter in a combination of these signals. As shown in FIG. 28, the wireless device (e.g., the wireless device 2801) may be configured with a third RS, (e.g., the Third RS 1) to monitor a PDCCH of the first cell (e.g., the first cell 2805). The wireless device 2801 may monitor, for example in (e.g., during) a response window, a PDCCH of the first cell 2805 according to an antenna port associated with (e.g., QCLed with) the Third RS 2. The wireless device 2801 may skip PRACH opportunities to send (e.g., transmit) a preamble associated with a BFR procedure. The wireless device 2801 may not perform a beam failure recovery request transmission, for example, if the base station uses the Third RS 2 for control channels of the first cell 2805.

A wireless device (e.g., the wireless device 2801) may receive from a base station one or more messages comprising one or more configuration parameters of a first cell (e.g., the first cell 2805) and a second cell. The one or more configuration parameters may indicate one or more beam failure recovery request (BFRQ) resources on the first cell 2805, one or more first reference signals (RSs) of the second cell, a third RS of the first cell 2805, a fourth RS of the first cell 2805, one or more second RSs of the second cell, and/or an association between each of the one or more first RSs and each of the one or more BFRQ resources. The one or more configuration parameters may indicate one or more beam failure recovery request (BFRQ) resources on the first cell 2805, one or more first reference signals (RSs) of the second cell, a third RS of the first cell 2805, a fourth RS of the first cell 2805, one or more second RSs of the second cell, and/or an association between a first RS of the one or more first RSs and a first BFRQ resource of the one or more BFRQ resources. The one or more first RSs may comprise one or more first CSI-RSs and/or one or more first SS blocks. The one or more second RSs may comprise one or more second CSI-RSs and/or one or more second SS blocks. The third RS may comprise one or more third CSI-RSs and/or one or more third SS blocks. The fourth RS may comprise one or more fourth DMRs. The PRACH resource may comprise one or more time resources and/or one or more frequency resources.

The wireless device (e.g., the wireless device 2801) may initiate a BFR procedure for the second cell, for example, after or in response to detecting a beam failure based on the one or more second RSs of the second cell. The detecting the beam failure may comprise assessing (or comparing) one or more downlink control channels associated with the one or more second RSs having a radio quality lower than a first threshold. The first threshold may be based on a first received signal strength, for example, a BLER and/or a RSRP.

The wireless device 2801 may identify (or determine) a selected RS of the one or more first RSs of the second cell. The selected RS may be associated with the one or more first RSs having a radio quality higher than a second threshold. The second threshold may be based on a second received signal strength (e.g., a BLER and/or a RSRP). The selected RS may be associated with a BFRQ resource of the one or more BFRQ resources of the first cell 2805. The BFRQ resource may comprise a preamble and a PRACH resource. The wireless device 2801 may send (e.g., transmit) the preamble via the PRACH resource.

The wireless device (e.g., the wireless device 2801) may select the third RS of the first cell 2805. The selecting of the third RS of the first cell may be based on a timing of the sending (e.g., transmitting) the preamble. The third RS may be preconfigured. The selected RS may correspond to a candidate serving beam of the second cell, for example, after the BFR procedure is completed. The wireless device 2801 may select the fourth RS of a downlink control channel of the first cell 2805. The fourth RS may be associated with the third RS.

The wireless device 2801 may monitor the downlink control channel of the first cell 2805 to detect a DCI, based on the fourth RS of the first cell 2805. The monitoring of the downlink control channel may comprise detecting the DCI in the downlink control channel addressed for a C-RNTI. The DCI may comprise a downlink assignment and/or an uplink grant. The wireless device 2801 may complete the BFR procedure for the second cell, for example, after or in response to receiving the downlink control information via the first cell.

By applying existing BFR procedures for a primary cell to a secondary cell, the base station would need to configure a dedicated coreset for the secondary cell in addition to configuring a dedicated coreset for the primary cell. Currently there may be at most three coresets per bandwidth part (BWP) in a cell. Thus, if one of the three coresets is a dedicated coreset, the wireless device is left with two coresets for communication. As described further below, the enhanced BFR procedures described herein allow for each cell to share a dedicated coreset, thereby causing only one cell to have up to two coresets while the remaining cells have up to three coresets. Accordingly, the base station has increased flexibility in schedule a wireless device since more coresets are available. By configuring a dedicated coreset for each cell, the system would waste time-frequency resources used by each coreset. By sharing a dedicated coreset for each cell (e.g., primary cell and secondary cell), the system would save resource overhead, for example time-frequency resources that would otherwise be used by multiple dedicated coresets.

In the enhanced BFR procedures described here, the wireless device may reuse a dedicated coreset configured on the primary cell for a BFR procedure of other cells (e.g., the primary cell and/or the secondary cells configured to the wireless device). Given that there may be at most one random access procedure for beam failure recovery that occurs at a time (e.g., either for the primary cell or for one of the secondary cells), dedicated coresets for the BFR procedure of each cell (e.g., the primary cell and the secondary cell) may not be configured. For the enhanced BFR procedures described herein, the base station may configure one dedicated coreset and monitor this dedicated coreset for the BFR procedure of each cell (e.g., the primary cell and the secondary cell). As discussed below concerning FIG. 29, the wireless device may monitor downlink coreset-1 and coreset-2 on a primary cell for uplink/downlink transmissions. The wireless device may also monitor downlink coreset-3, coreset-4 and coreset-5 on a secondary cell for uplink/downlink transmissions. Additionally, the wireless device may monitor a downlink coreset on the primary cell for both the BFR procedure of the primary cell and the BFR procedure of the secondary cell.

Figure 29:
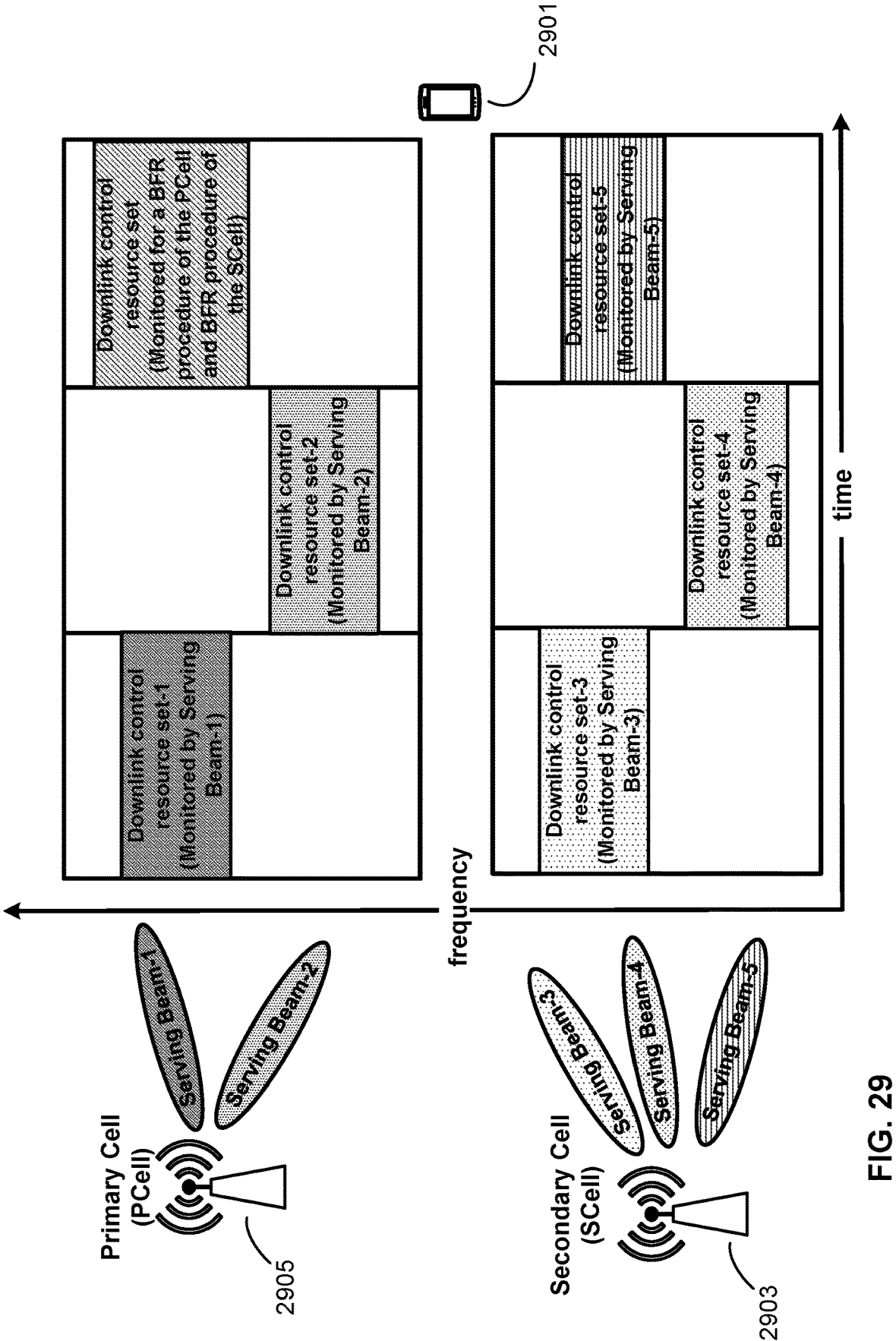
FIG. 29 shows examples of monitoring one or more coresets for a primary cell and a secondary cell.

FIG. 29 shows examples of monitoring one or more coresets for a primary cell and a secondary cell. A wireless device (e.g., the wireless device 2901) may monitor a first coreset configured on the primary cell (e.g., the primary cell 2905) for a BFR procedure of the primary cell, for example, monitoring for the downlink control resource set 1 or the downlink control resource set 2. The wireless device may also monitor a second coreset configured on the secondary cell (e.g., the secondary cell 2903) for a BFR procedure of the secondary cell, for example, monitoring for the downlink control resource set 3 or the downlink control resource set 4. In view of the enhanced BFR procedures described above concerning at least FIGS. 27 and 28, the base station may configure one dedicated coreset and monitor this dedicated coreset for the BFR procedure of the primary cell 2905 and the secondary cell 2903. Accordingly, the wireless device (e.g., wireless device 2901) may reuse a dedicated coreset configured on the primary cell (e.g., primary cell 2905) for a BFR procedure of the secondary cell (e.g., secondary cell 2903). Notwithstanding whether the primary cell and the secondary cell share the same coresets or have different coresets, the wireless device may monitor the primary cell for the BFR procedure of the secondary cell.

The base station may monitor the dedicated coreset, for example, if the primary cell has a BFR procedure, and the base station may also monitor the dedicated coreset, for example, if a secondary cell has a BFR procedure. These enhanced BFR procedures may save resource overhead, for example, because the base station may not need to configure a separate coreset for each cell (e.g., the primary cell and the secondary cell), which may consume additional resources. Rather the base station monitors the same dedicated coreset for the BFR procedure of the primary cell and the secondary cell. In some systems, the base station may configure a separate coreset for each cell. In these systems, the wireless device may be configured with at most three coresets (per BWP). Accordingly, if one of those three coresets is configured as a dedicated coreset for a BFR procedure in each cell, this would only leave up to two coresets available for uplink and downlink transmission, thereby reducing the scheduling diversity of the base station.

The wireless device may receive, from a base station, one or more messages comprising one or more configuration parameters of a primary cell and a secondary cell. The one or more configuration parameters may comprise a first preamble for a first beam failure recovery (BFR) procedure of the primary cell. The one or more configuration parameters (e.g., first BFR-PRACH resources) may be associated with one or more first RSs of the primary cell. The one or more configuration parameters may also comprise a second preamble for a second BFR procedure of the secondary cell.

The one or more configuration parameters (e.g., second BFR-PRACH resources) may be associated with one or more second RSs of the secondary cell. The first preamble may be different than the second preamble. The one or more configuration parameters may further comprise a time and frequency resource on the primary cell for both the first BFR procedure and the second BFR procedure.

The one or more configuration parameters (e.g., one or more first BFRQ resources) on the primary cell may be different from the one or more configuration parameters (e.g., one or more second BFRQ resources) on the primary cell, for example, the first BFRQ resources and the second BFRQ resources may be orthogonal. Various multiplexing methods may be used for the one or more first BFRQ resources and the one or more second BFRQ resources, for example, time division multiplexing (TDM), frequency division multiplexing (FDM), code division multiplexing (CDM), and/or any combination thereof. In the TDM, a first time resource of the one or more first BFRQ resources may be different from a second time resource of the one or more second BFRQ resources. The one or more first BFRQ resources (e.g., BFR-PRACH resources) and the one or more second BFRQ resources (e.g., BFR-PRACH resources) may be located in a different time instance, for example, a different symbol or a different slot. In the FDM, a first frequency resource of the one or more first BFRQ resources (e.g., BFR-PRACH resources) may be different from a second frequency resource of the one or more second BFRQ resources (e.g., BFR-PRACH resources). The one or more first BFR-PRACH resources and the one or more second BFR-PRACH resources may be located in a different subcarrier, a different RB, or a different subband. In the CDM, a first preamble of the one or more first BFRQ resources may be different from a second preamble of the one or more second BFRQ resources. The one or more first BFRQ resources (e.g., BFR-PRACH resources) may differentiate from the one or more second BFRQ resources (e.g., BFR-PRACH resources) based on preamble sequences. The one or more first BFR-PRACH resources and the one or more second BFR-PRACH resources may be assigned different preamble sequences. The one or more first BFRQ resources on the primary cell may differentiate from the one or more second BFRQ resources on the primary cell based on a time opportunity, a frequency index, a cyclic shift, or a combination thereof.

The wireless device may transmit the first preamble via the time-frequency resource on the primary cell. The wireless device may perform the first BFR procedure by transmitting the first preamble via the time-frequency resource on the primary cell, for example, after or in response to detecting a first beam failure on the primary cell. The wireless device may transmit the second preamble via the time-frequency resource on the primary cell. A wireless device may send (e.g., transmit) the second preamble via the PRACH resource (e.g., the BFRQ resource) on the primary cell. The wireless device may perform the second BFR procedure by transmitting the second preamble via the time-frequency resource on the primary cell, for example, after or in response to detecting a second beam failure on the secondary cell. The wireless device may initiate a second BFRQ transmission, for example, after or in response to identifying a first RS of a secondary cell in a candidate beam identification procedure. The wireless device may select a BFRQ resource (e.g., the BFR-PRACH-2 resource) on a primary cell for the second BFRQ transmission.

A base station may send (e.g., transmit), to a wireless device, one or more messages comprising configuration parameters of a beam failure recovery (BFR) procedure. A base station, for the BFR procedure, may configure one or more first BFRQ resources (e.g., a BFR-PRACH, a BFR-PUCCH) for a first BFR procedure of a primary cell. The base station may configure one or more second BFRQ resources for a second BFR procedure of a secondary cell. The one or more first BFRQ resources and the one or more second BFRQ resources may be on the primary cell. The base station may send (e.g., transmit), to a wireless device, one or more messages indicating a first association between each of one or more RSs (e.g., a CSI-RS, SS blocks) of the primary cell 3005 and each of the one or more first BFRQ resources on the primary cell. The base station may monitor one or more first BFRQ resources (e.g., BFR-PRACH resources) and one or more second BFRQ resources (e.g., BFR-PRACH resources). The base station may allocate a first set of sequences (e.g., preamble sequences) for the one or more first BFR-PRACH resources. The base station may allocate a second set of sequences (e.g., preamble sequences) for the one or more second BFR-PRACH resources. The base station may determine a cell identity associated with a beam failure and/or a first RS associated with a candidate beam, for example, after or in response to receiving one or more first BFRQ resources (e.g., a preamble on a particular time opportunity and frequency index).

A base station may configure (e.g., in some systems) the wireless device with a set of candidate RSs. The wireless device may measure the set of candidate RSs and selects a candidate RS among the set of candidate RSs, for example, if the wireless device detects a beam failure for a primary cell. Each candidate RS of the set of candidate RSs may be associated with a preamble and a time-frequency resource, for example, a first candidate RS may configured/associated with a first preamble, and a first time and a first frequency resource. The base station may determine that the wireless device has a beam failure for the primary cell and the wireless device may select the first candidate RS for the BFR procedure, for example, if the base station receives the first preamble via the first time and first frequency resource. Each resource of each candidate RS of the set of candidate RSs may be orthogonal (e.g., via time, frequency, or preamble) to each other candidate RS such that the resource selection associated with a candidate RS may indicate the selected candidate RS to the base station. The wireless device may use the uplink channels of the primary cell for the preamble transmission of the BFR procedure for the secondary cell, for example, if the secondary cell has no uplink channel such as in the first and second examples described above. The enhanced BFR procedures described herein use improved methods of configuring the candidate RSs of the secondary cell on the primary cell, which may be applicable where the uplink channels of the primary cell are used for the preamble transmission for the BFR procedure of a secondary cell.

Figure 30:
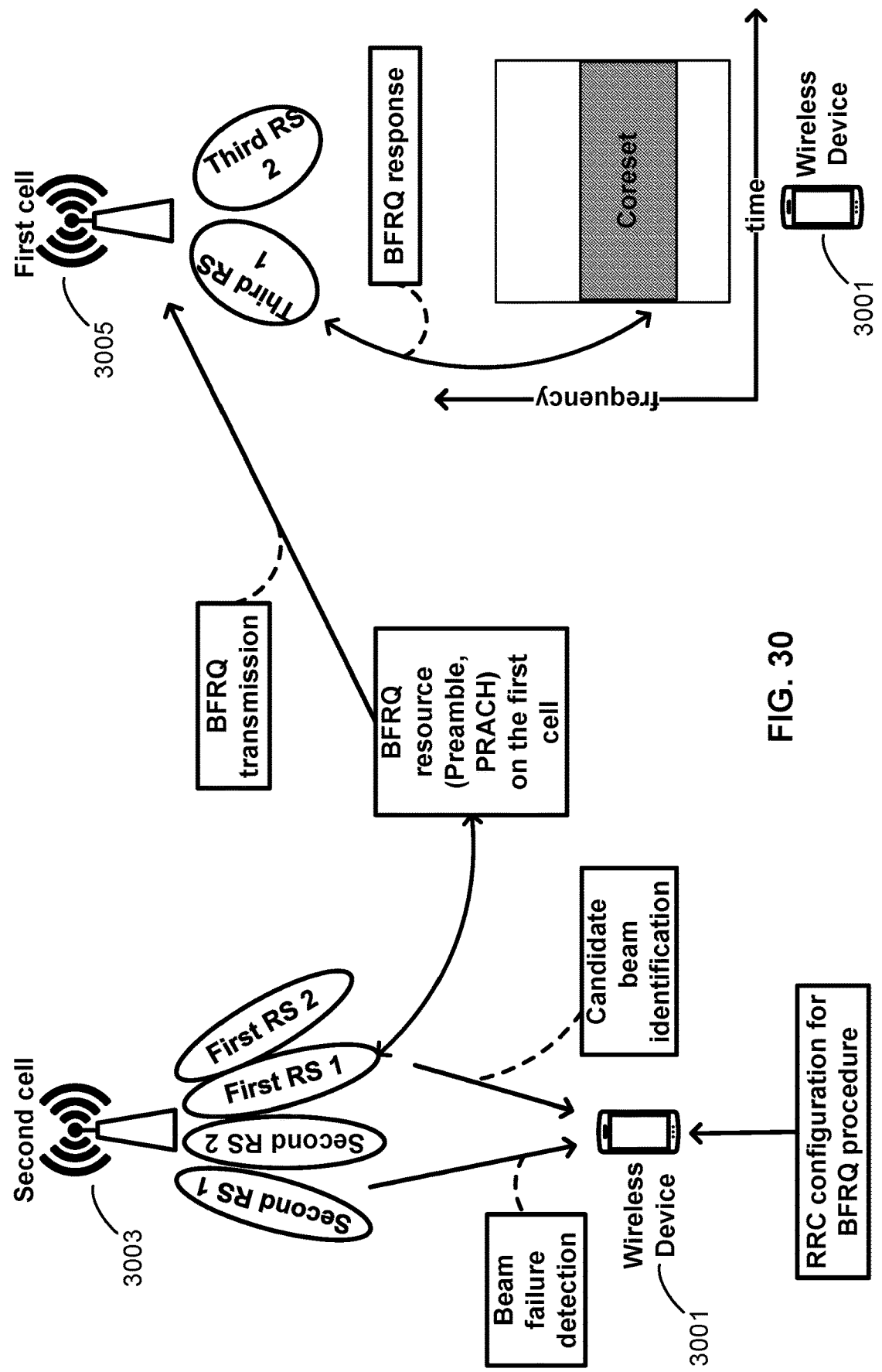
FIG. 30 shows a diagram of example BFR procedures for a secondary cell.

As described in more detail below, FIG. 30 describes the overall secondary cell BFR procedure where the uplink channels of the primary cell are used for the preamble transmission for the BFR procedure. FIG. 30 shows an example diagram for beam failure recovery procedures or a secondary cell. As shown in FIG. 30, a base station sends (e.g., transmits) to a wireless device (e.g., a wireless device 3001), one or more messages comprising a first set of RS resource configurations for a second cell (e.g., a second cell 3003). The first set of RS resource configurations may comprise one or more first RSs (e.g., a CSI-RS or SS blocks) of the second cell 3003, for example, the Second RS 1 and the Second RS 2 shown in FIG. 30. The one or more messages may further comprise a second set of RS resource configurations comprising one or more second RSs (e.g., a CSI-RS or SS blocks) of the second cell 3003, for example, the First RS 1 and the First RS 2 shown in FIG. 30. The wireless device 3001 may measure radio link quality of one or more beams associated with the one or more first RSs and/or the one or more second RSs. The one or more messages may further comprise one or more BFRQ resources (e.g. the BFRQ resource shown in FIG. 22) on a first cell (e.g., a first cell 3005). The one or more messages may further comprise an association between each of the one or more second RSs and each of the one or more BFRQ resources, for example, an association between the First RS 1 and the BFRQ resource shown in FIG. 30.

As shown in FIG. 30, a wireless device (e.g., the wireless device 3001) may assess (or compare) a first radio link quality (e.g., a BLER, a L1-RSRP) of the one or more first RSs against a first threshold. The first threshold (e.g., a BLER, a L1-RSRP) may be a first value provided by a higher layer parameter (e.g., a RRC, a MAC). The wireless device 3001 may monitor a PDCCH of the second cell 3003. A RS (e.g., a DM-RS) of the PDCCH may be associated with the one or more first RSs (e.g., QCLed with the one or more first RSs).

A base station may send (e.g., transmit) one or more messages comprising configuration parameters of a beam failure recovery procedure, for example, the RRC configuration for BFR procedure shown in FIG. 30. As shown in FIG. 30, a wireless device (e.g., the wireless device 3001) may detect a beam failure on the second cell (e.g., the SCell 3003), for example, if the first radio link quality of the one or more first RSs meets certain criteria. A beam failure may occur, for example, if a RSRP or a SINR of the one or more first RSs is lower than the first threshold. Additionally, or alternatively, a beam failure may occur, for example, if the BLER is higher than a threshold. This wireless device may receive, from the base station, one or more configuration parameters indicating a value for the threshold. The wireless device may measure a block error rate (BLER) of one or more downlink control channels. The wireless device may compare a quality of the one or more downlink control channels (e.g., associated with one or more first RSs) with the threshold, for example, the wireless device may measure the BLER of one or more downlink control channels and compare the measurement with the threshold for the beam failure detection. The wireless device may increment a beam failure counter, for example, if the BLER of a downlink control is higher than the threshold. The assessment may be performed for a consecutive number of times. The number of consecutive performances of the assessment may be determined by a higher layer parameter (e.g., a RRC, a MAC).

The wireless device (e.g., the wireless device 3001) may initiate a candidate beam identification procedure on the second cell 3003, for example, after or in response to detecting the beam failure on the second cell. For the candidate beam identification procedure, the wireless device 3001 may identify a first RS (e.g., the First RS 1 shown in FIG. 30) among the one or more second RSs. The first RS may be associated with a BFRQ resource (e.g., the BFRQ resource shown in FIG. 22) of the one or more BFRQ resources on the first cell 3005. The BFRQ resource may comprise a preamble and a PRACH resource, for example, a time resource and/or a frequency resource. A second radio link quality (e.g., a BLER, a L1-RSRP) of the first RS may be better than a second threshold, for example, the second radio link quality of the first RS have a lower BLER, a higher L1-RSRP, or a higher SINR than the second threshold. The second threshold may comprise a second value provided by the higher layer parameter (e.g., a RRC, a MAC).

The wireless device 3001, may send (e.g., transmit), in a first slot, the preamble via the PRACH resource (e.g., the BFRQ resource) on the first cell (e.g., the PCell 3005) for a BFR procedure of the second cell 3003, for example, after or in response to detecting the beam failure on the second cell and identifying the first RS of the second cell. The wireless device 3001 may start, from a second slot, monitoring, within a response window, a first PDCCH in one or more first coresets on the first cell 3005 for a DCI (e.g., the BFRQ response shown in FIG. 30), for example, after or in response to sending (e.g., transmitting) the preamble in the first slot. The DCI may be configured with a cyclic redundancy check (CRC) scrambled by a C-RNTI.

The BFR procedure may be successfully completed, for example, after or in response to receiving, within the configured response window, a downlink assignment or an uplink grant on the first PDCCH of the first cell 3005 in one or more first coresets on the first cell. The downlink assignment or the uplink grant may be received at the wireless device 3001 as indicated by the BFRQ response shown in FIG. 30. The downlink assignment or the uplink grant may be addressed to the C-RNTI.

A wireless device (e.g., the wireless device 3001) may monitor a first PDCCH of a first cell (e.g., the first cell 3005), for example, in a multiple beam example with multiple cells configured. A first RS (e.g., a DM-RS) of the first PDCCH may be associated with one or more RSs of the first cell 3005 (e.g., QCLed with one or more RSs of the first cell). The wireless device 3001 may monitor a second PDCCH of a second cell (e.g., the second cell 3003). A second RS (e.g., a DM-RS) of the second PDCCH may be associated with one or more RSs of the second cell 3003 (e.g., QCLed with one or more RSs of the second cell).

A base station may configure one or more first BFRQ resources (e.g., a BFR-PRACH, a BFR-PUCCH) for a first BFR procedure of a first cell (e.g., the first cell 3005), for example, during a BFR procedure. Additionally, or alternatively, the base station may configure one or more second BFRQ resources for a second BFR procedure of a second cell (e.g., the second cell 3003). The one or more first BFRQ resources and the one or more second BFRQ resources may be on the first cell 3005. The base station may send (e.g., transmit) to a wireless device (e.g., the wireless device 3001) one or more messages indicating a first association between each of one or more third RSs (e.g., a CSI-RS, SS blocks) of the first cell 3005 and each of the one or more first BFRQ resources on the first cell 3005. The one or more messages may further indicate an association between each of one or more fourth RSs of the second cell 3003 and each of the one or more second BFRQ resources on the first cell 3005.

A first RS of a second cell (e.g., the second cell 3003), such as a first RS of the second cell determined in a candidate beam identification procedure, may be associated with a second BFRQ resource of the one or more second BFRQ resources on the first cell 3005. The second BFRQ resource may comprise a preamble and a PRACH resource (e.g., a time resource and/or a frequency resource) determined by a higher layer parameter (e.g., a RRC). A wireless device (e.g., the wireless device 3001) may send (e.g., transmit) the preamble via the PRACH resource on the first cell 3005 for a BFRQ transmission.

The one or more first BFRQ resources on the first cell 3005 and the one or more second BFRQ resources on the first cell 3005 may be orthogonal. Multiplexing methods between the one or more first BFRQ resources and the one or more second BFRQ resources may comprise time division multiplexing (TDM), frequency division multiplexing (FDM), code division multiplexing (CDM), and/or any combination of the TDM, the FDM and/or the CDM. In the TDM, a first time resource of the one or more first BFRQ resources may be different from a second time resource of the one or more second BFRQ resources. In the FDM, a first frequency resource of the one or more first BFRQ resources may be different from a second frequency resource of the one or more second BFRQ resources. In the CDM, a first preamble of the one or more first BFRQ resources may be different from a second preamble of the one or more second BFRQ resources. The one or more first BFRQ resources on the first cell 3005 may differentiate from the one or more second BFRQ resources on the first cell 3005 based on a time opportunity, a frequency index, a cyclic shift, or a combination thereof, to provide flexibility in scheduling for the base station.

The enhanced BFR procedures described herein use an association between a candidate RS of a secondary cell and the time, frequency, and preamble resources on a primary cell. As described below regarding FIG. 31, the first resources for the candidate RSs of the primary cell and the second resources for the candidate RSs of the second cell may be frequency division multiplexed (FDM-ed). For example, a first candidate RS of the primary cell may be associated with a first preamble, a first time resource, and a first frequency resource on the primary cell. Additionally, a second candidate RS of the secondary cell may be associated with the first preamble, the first time resource, and a second frequency resource on the primary cell. Accordingly, the first candidate RS and the second candidate RS may use the same first preamble and the same time resource, but may use orthogonal frequency resources (e.g., the first frequency resource and the second frequency resource) such that the base station may distinguish the first candidate RS and the second candidate RS. In high frequencies (e.g., 24 GHz, 50 GHz, 77 GHz, etc), which may be used for NR or any other generation of mobile communication networks, there are a plurality of available frequency bands. Configuring the wireless device with FDM-ed resources may be beneficial in high frequencies as there may be a greater abundance of available (e.g., not used) frequencies, which may be used for multiplexing the primary cell and secondary cell resources. Configuring the wireless device with FDM-ed resources may be beneficial given that preambles may be a scarcely available resource and using orthogonal time resources may lead to delay of the secondary cell BFR procedure, for example, the secondary cell may need to wait until its time resources are utilized over time if the secondary cell has a BFR procedure.

Figure 31:
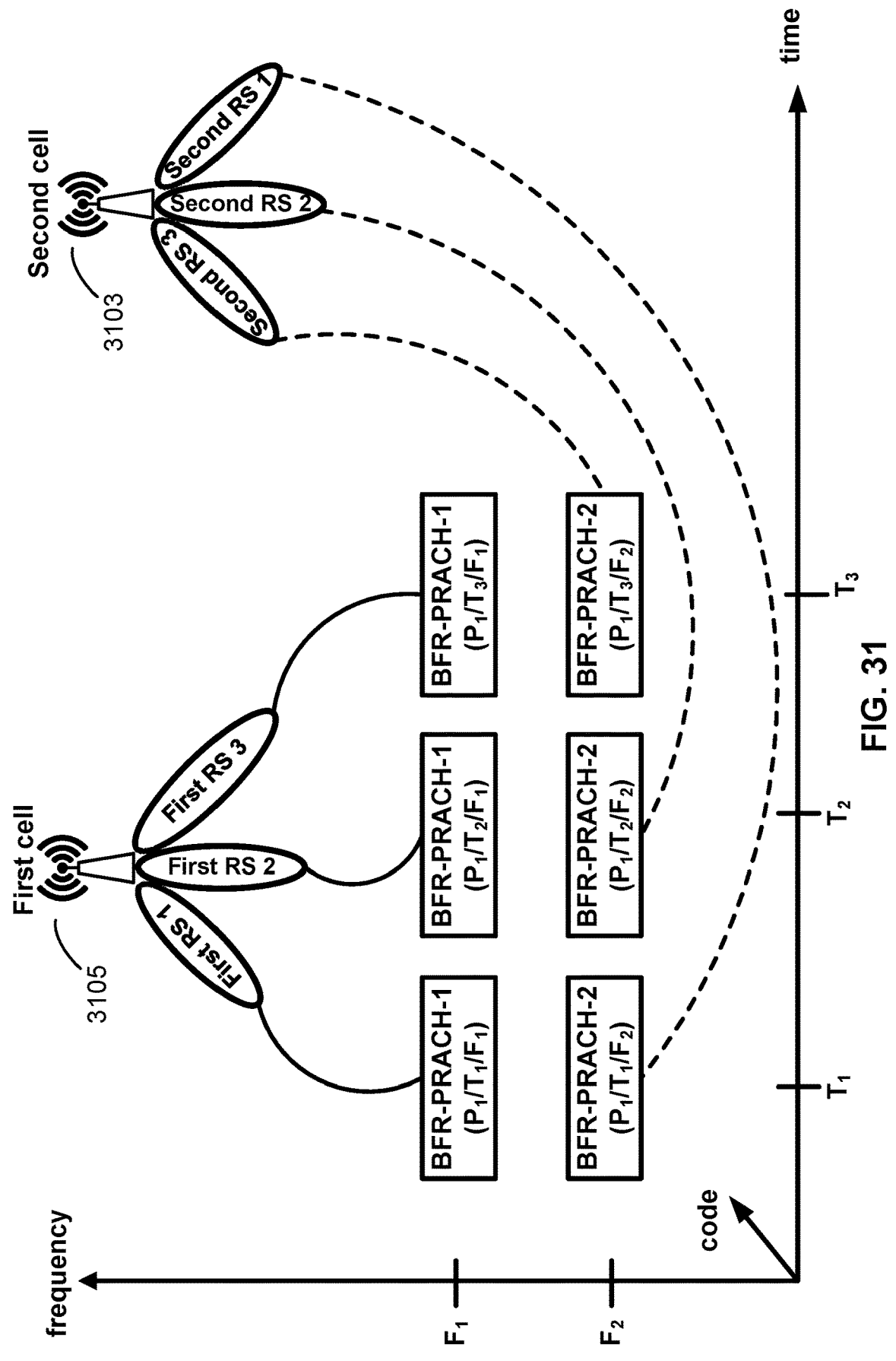
FIG. 31 shows examples of frequency division multiplexing (FDM) resources for candidate RSs of the primary cell and the secondary cell.

FIG. 31 shows an example of frequency division multiplexing (FDM) resources for candidate RSs of the primary cell and the secondary cell. A wireless device (e.g., the wireless device 3001) may use one or more first BFR-PRACH resources to send (e.g., transmit) a first BFRQ transmission of a first cell (e.g., the first cell 3105). Additionally, or alternatively, a wireless device (e.g., the wireless device 3001) may use one or more second BFR-PRACH resources to send (e.g., transmit) a second BFRQ transmission of a second cell 3103. Each of the one or more first BFR-PRACH resources (e.g., the BFR-PRACH-1 shown in FIG. 31) may be associated with one or more first RSs (e.g., a CSI-RSs, SS blocks) of the first cell 3105. Each of the one or more second BFR-PRACH resources (e.g., the BFR-PRACH-2 shown in FIG. 31) may be associated with one or more second RSs (e.g., a CSI-RSs, SS blocks) of the second cell 3103. The one or more first BFR-PRACH resources may differentiate from the one or more second BFRQ resources based on frequency (e.g., the FDM). The one or more first BFR-PRACH resources and the one or more second BFR-PRACH resources may be located in a different subcarrier, a different RB, or a different subband. The one or more first BFR-PRACH resources and the one or more second BFR-PRACH resources may be located in a same time instance, a same symbol, or a same slot. Additionally, or alternatively, the one or more first BFR-PRACH resources and the one or more second BFR-PRACH resources may use the same preambles. Differentiating the one or more first BFR-PRACH resources and the one or more second BFR-PRACH resources by frequency may be useful in a flat fading channel The flat fading channel may occur, for example, if a coherence bandwidth of a channel is larger than a bandwidth of a signal. Frequency components of the signal may experience a same magnitude of fading.

Each of the one or more first BFR-PRACH resources or the one or more second BFR-PRACH resources may provide an opportunity in a time, a frequency and/or a sequence domain for a wireless device (e.g., the wireless device 3001) to send (e.g., transmit) a preamble for a first BFRQ transmission (or a second BFRQ transmission) of a first cell (e.g., the first cell 3105) or a second cell (e.g., the second cell 3103). As shown in FIG. 31, the one or more BFR-PRACH resources in an n-th time opportunity, (e.g., "$T_n$", where n=1, 2, 3, etc.), may span different frequency indexes (e.g., "$F_k$", where k=1, 2, etc.), and may hold a beam correspondence relationship with one or more first RSs (e.g., the First RS 1, the First RS 2, the First RS 3) of the first cell 3105 and one or more second RSs (e.g., the Second RS 1, the Second RS 2, the Second RS 3) of the second cell 3103. As shown in FIG. 31, the First RS 1 of the first cell 3105 may be associated with the BFR-PRACH-1 comprising a preamble $P_1$, a time opportunity $T_1$, and a first frequency index $F_1$. The Second RS 1 of the second cell 3103 may be associated with the BFR-PRACH-2 comprising the preamble $P_1$, the time opportunity $T_1$, and a second frequency index $F_2$.

A wireless device (e.g., the wireless device 3001) may trigger a second BFRQ transmission, for example, after or in response to identifying a first RS (e.g., the Second RS 2 shown in FIG. 31) of a second cell (e.g., the second cell 3103) in a candidate beam identification procedure. The wireless device 3001 may select the BFR-PRACH-2 resource on a first cell (e.g., the first cell 3105) for the second BFRQ transmission. The BFR-PRACH-2 resource may comprise a preamble $P_1$, a time opportunity $T_2$ and a frequency index $F_2$. The wireless device 3001 may send (e.g., transmit) the preamble $P_1$ on the time opportunity $T_2$ and the frequency index $F_2$. A base station may monitor one or more first BFR-PRACH resources and one or more second BFR-PRACH resources. The base station may infer (or determine) a cell identity associated with a beam failure and the first RS associated with a candidate beam. Referring to the example in FIG. 31, the base station may determine a cell identity associated with a beam failure (e.g., the identity of the second cell 3103), and the first RS associated with a candidate beam (e.g. the Second RS 2), for example, after or in response to receiving the preamble $P_1$ on the time opportunity $T_2$ and the frequency index $F_2$.

As described below regarding FIG. 32, the first resources for the candidate RSs of the primary cell and the second resources for the candidate RSs of the secondary cell may be time division multiplexed (TDM-ed). For example, a first candidate RS of the primary cell may be associated with a first preamble, a time resource, and a frequency resource on the primary cell. Additionally, a second candidate RS of the secondary cell may be associated with the first preamble, a second time resource, and the first frequency resource on the primary cell. Accordingly, the first candidate RS and the second candidate RS may use the same first preamble and the same frequency resource, but may use orthogonal time resources (e.g., the first time resource and the second time resource) such that the base station may distinguish the first candidate RS and the second candidate RS. In low frequencies (e.g., 2.4 GHz, 5 GHz, 6 GHz, etc.), as compared to higher frequencies, the number of available frequency bands may be scarcer, for example, the bandwidth of the wireless device may be small, such as 20 MHz in the LTE mobile communication standard. Moreover, configuring the wireless device with TDM-ed resources may be beneficial given that given that preambles may be a scarcely available resource. The wireless device may accommodate a latency in BFR procedure of a secondary cell, for example, if the BFR procedure of the secondary cell may not be as urgent as the BFR procedure of the primary cell. As such, configuring the wireless device with TDM-ed resources may be beneficial to and provide efficiencies for the enhanced BFR procedures discussed below.

Figure 32:
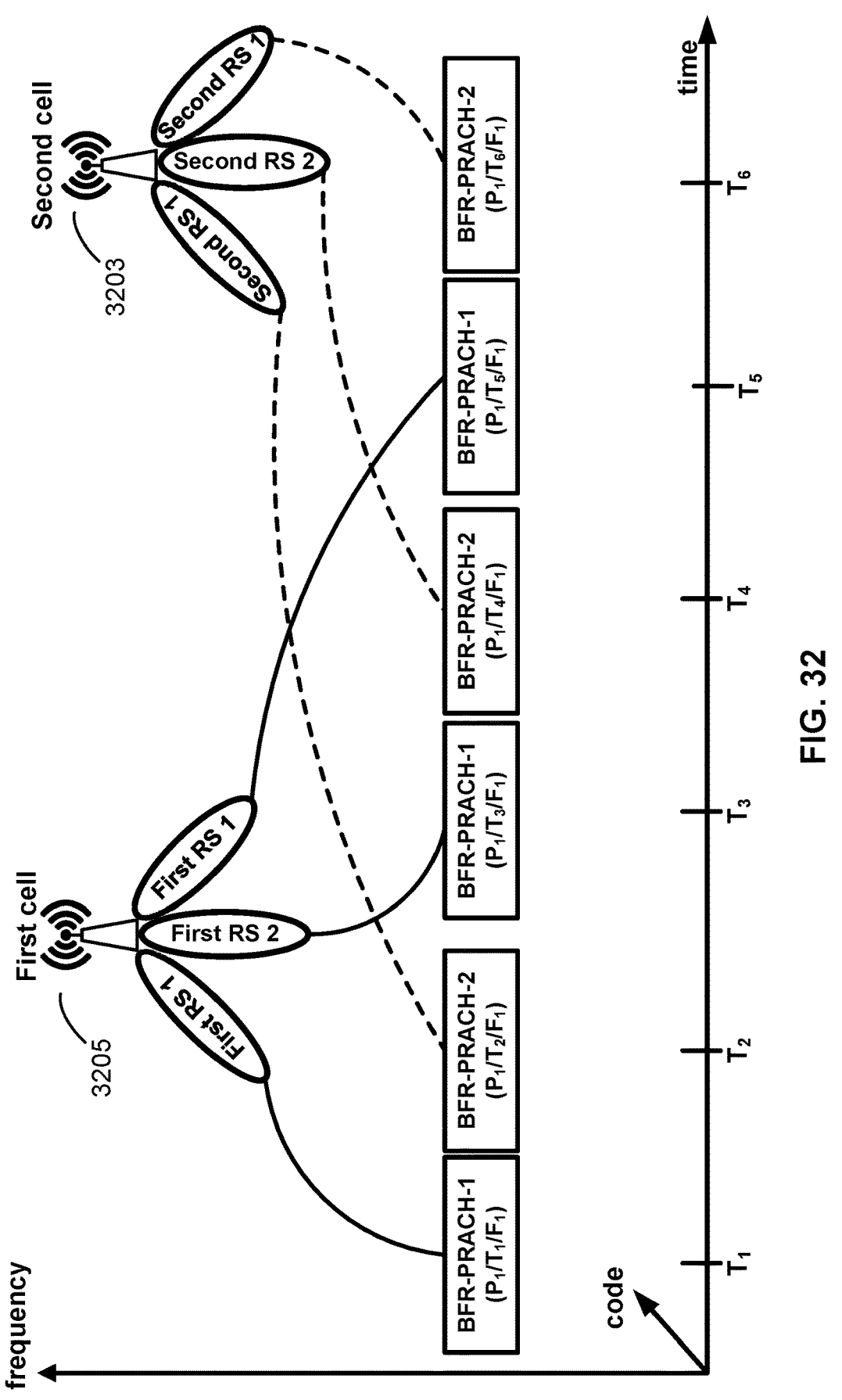
FIG. 32 shows examples of time division multiplexing (TDM) resources for candidate RSs of the primary cell and the secondary cell.

FIG. 32 shows examples of time division multiplexing (TDM) resources for candidate RSs of the primary cell and the secondary cell. A wireless device (e.g., the wireless device 3001) may use one or more first BFR-PRACH resources to send (e.g., transmit) a first BFRQ transmission of a first cell (e.g., the first cell 3105) and one or more second BFR-PRACH resources to send (e.g., transmit) a second BFRQ transmission of a second cell (e.g., the second cell 3103). Each of the one or more first BFR-PRACH resources (e.g., the BFR-PRACH-1 shown in FIG. 32) may be associated with one or more first RSs (e.g., a CSI-RS, SS blocks) of the first cell 3105. Each of the one or more second BFR-PRACH resources (e.g., the BFR-PRACH-2 shown in FIG. 32) may be associated with one or more second RSs (e.g., a CSI-RS, SS blocks) of the second cell 3103. The one or more first BFR-PRACH resources may differentiate from the one or more second BFRQ resources based on time (e.g., the TDM). The one or more first BFR-PRACH resources and the one or more second BFR-PRACH resources may be located in a different time instance, for example, a different symbol or a different slot. The one or more first BFR-PRACH resources and the one or more second BFR-PRACH resources may be located in a same subcarrier, a same RB, or a same subband. Additionally, or alternatively, the one or more first BFR-PRACH resources and the one or more second BFR-PRACH resources may use the same preambles. Differentiating the one or more first BFR-PRACH resources and the one or more second BFR-PRACH resources by time may be useful in a slow fading channel The slow fading channel may occur, for example, if a coherence time of a channel is large relative to a delay requirement of an application, for example, more than two symbols or more than a time slot. An amplitude and a phase change imposed by the channel may be constant over a period of use. In the slow fading channel, variations of the channel may be slow so that that the base station may track the channel of the wireless device (e.g., the wireless device 3001).

Each of the one or more first BFR-PRACH resources (or second BFR-PRACH resources) may provide an opportunity in a time domain, a frequency domain, and/or a sequence domain for a wireless device (e.g., wireless device 3001) to send (e.g., transmit) a preamble for a first BFRQ transmission (or a second BFRQ transmission) of a first cell (e.g., the first cell 3105) or a second cell (e.g., the second cell 3103). As shown in FIG. 32, the one or more BFR-PRACH resources in the n-th time opportunity, (e.g., "$T_n$", where n=1, 2, . . . 6, etc.) may hold a beam correspondence relationship with one or more first RSs (e.g., the First RS 1, the First RS 2, the First RS 3) of the first cell (e.g., the first cell 3105) and one or more second RSs (e.g., the Second RS 1, the Second RS 2, the Second RS 3) of the second cell (e.g., the second cell 3103). As shown in FIG. 32, the First RS 1 of the first cell 3105 may be associated with the BFR-PRACH-1 comprising a preamble $P_1$, a first time opportunity $T_1$, and a frequency index $F_1$. The Second RS 1 of the second cell 3103 may be associated with the BFR-PRACH-2 comprising the preamble $P_1$, a second time opportunity $T_2$, and the frequency index $F_1$.

A wireless device (e.g., the wireless device 3001) may trigger a second BFRQ transmission, for example, after or in response to identifying a first RS (e.g., the Second RS 2 shown in FIG. 32) of a second cell (e.g., the second cell 3103) in a candidate beam identification procedure. The wireless device 3001 may select the BFR-PRACH-2 resource on a first cell (e.g., the first cell 3105) for the second BFRQ transmission. The BFR-PRACH-2 resource may comprise a preamble $P_1$, a time opportunity $T_4$, and a frequency index $F_1$. The wireless device 3001 may send (e.g., transmit) the preamble $P_1$ on the time opportunity $T_4$ and the frequency index $F_1$. A base station may monitor one or more first BFR-PRACH resources and one or more second BFR-PRACH resources. The base station may infer (or determine) a cell identity associated with a beam failure and the first RS associated with a candidate beam. Referring to the example in FIG. 32, the base station may determine a cell identity associated with a beam failure (e.g., the second cell 3103) and the first associated with a candidate beam RS (e.g. the Second RS 2), for example, after or in response to receiving the preamble $P_1$ on the time opportunity $T_4$ and the frequency index $F_1$.

As described below regarding FIG. 33, the first resources for the candidate RSs of the primary cell and the second resources for the candidate RSs of the secondary cell are code division multiplexed (CDM-ed). For example, a first candidate RS of the primary cell may be associated with a first preamble, a first time resource, and a first frequency resource on the primary cell. Additionally, a second candidate RS of the secondary cell may be associated with a second preamble, the first time resource, and the first frequency resource on the primary cell. Accordingly, the first candidate RS and the second candidate RS may use the same time resource and the same frequency resource, but may use orthogonal preambles (e.g., the first preamble and the second preamble) such that the base station may distinguish the first candidate RS and the second candidate RS. Configuring the wireless device with CDM-ed resources may beneficial, for example, if the number of wireless devices and/or secondary cells is not high. Notably, in 5G systems, the wireless device may be configured with up to 32 secondary cells, while the number of wireless devices may be up to 100 devices. The base station may assign orthogonal preambles for each wireless device of each cell. As such, configuring the wireless device with CDM-ed resources may also be beneficial, for example, if the wireless device has limited bandwidth on the primary cell and/or uses a fast BFR procedure.

Figure 33:
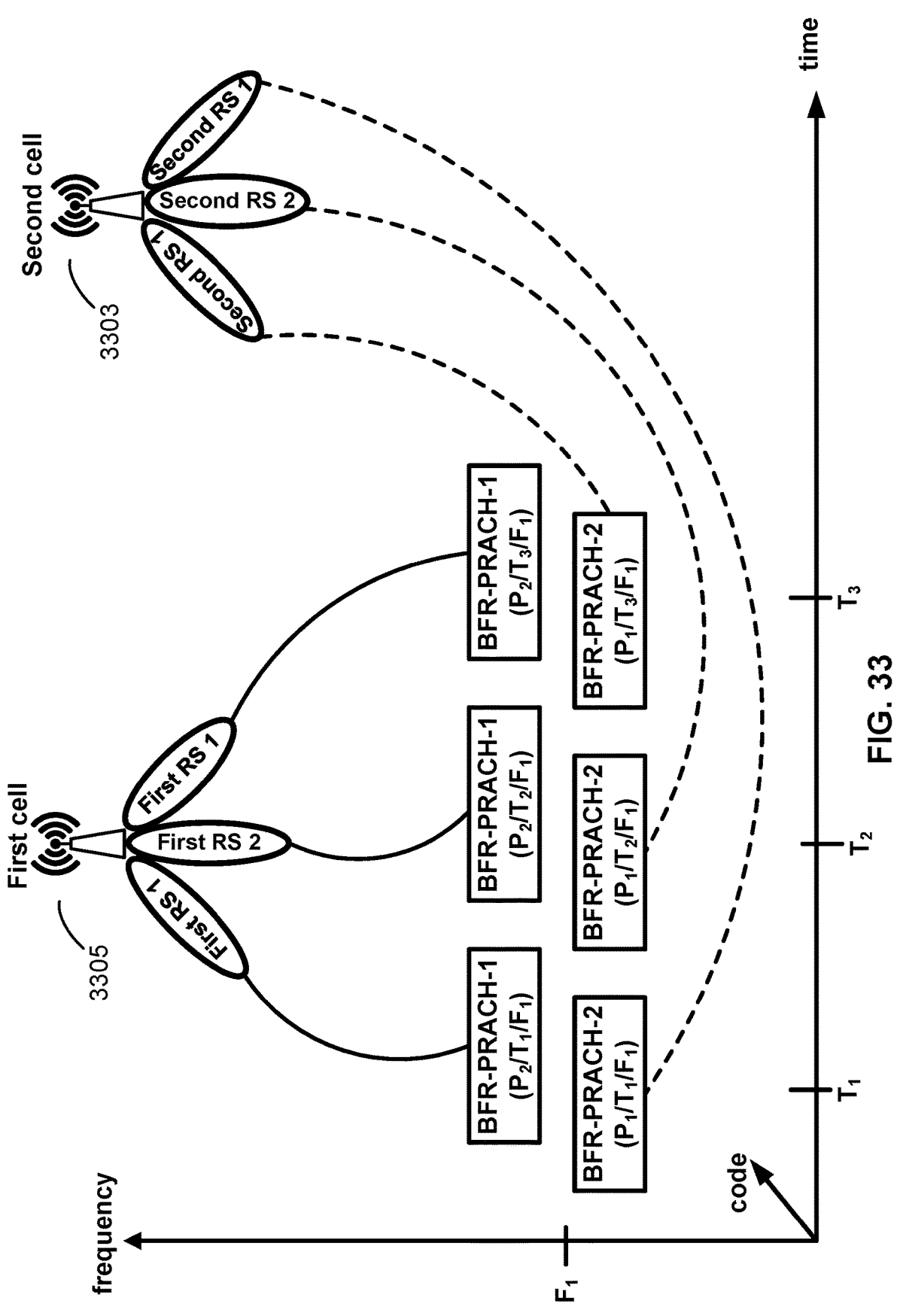
FIG. 33 shows examples of code division multiplexing (CDM) resources for candidate RSs of the primary cell and the secondary cell.

FIG. 33 shows examples of code division multiplexing (CDM) resources for candidate RSs of the primary cell and the secondary cell. A wireless device (e.g., the wireless device 3001) may use one or more first BFR-PRACH resources to send (e.g., transmit) a first BFRQ transmission of a first cell (e.g., the first cell 3305) and one or more second BFR-PRACH resources to send (e.g., transmit) a second BFRQ transmission of a second cell (e.g., the second cell 3303). Each of the one or more first BFR-PRACH resources (e.g., the BFR-PRACH-1 shown in FIG. 33) may be associated with one or more first RSs (e.g., a CSI-RS, SS blocks) of the first cell 3305. Each of the one or more second BFR-PRACH resources (e.g., the BFR-PRACH-2 shown in FIG. 33) may be associated with one or more second RSs (e.g., a CSI-RSs, SS blocks) of the second cell 3303. The one or more first BFR-PRACH resources may differentiate from the one or more second BFRQ resources based on preamble sequences (e.g., the CDM). The one or more first BFR-PRACH resources and the one or more second BFR-PRACH resources may be assigned different preamble sequences. The one or more first BFR-PRACH resources and the one or more second BFR-PRACH resource may be located in a same subcarrier, a same RB, or a same subband. Additionally, or alternatively, the one or more first BFR-PRACH resources and the one or more second BFR-PRACH resources may be located in the same time instance, for example, the same symbol, or the same slot). Differentiating the one or more first BFR-PRACH resources and the one or more second BFR-PRACH resources based on preamble sequences may be useful, for example, if there is a small number of wireless devices and/or secondary cells associated with the first cell 3305, for example fewer than 64 wireless devices and/or secondary cells. A base station may allocate a first set of sequences (e.g., preamble sequences) for the one or more first BFR-PRACH resources. The base station may allocate a second set of sequences (e.g., preamble sequences) for the one or more second BFR-PRACH resources. The first set of sequences and the second set of sequences may not overlap. This may provide a low PRACH collision probability, as providing orthogonal preambles may lower the collision probability to zero.

Each of the one or more first BFR-PRACH resources (or second BFR-PRACH resources) may provide an opportunity in a time domain, a frequency domain, and/or a sequence domain for a wireless device (e.g., wireless device 3001) to send (e.g., transmit) a preamble for a first BFRQ transmission (or second BFRQ transmission) of a first cell (e.g., the first cell 3305) or a second cell (e.g., the second cell 3303). As shown in FIG. 33, the BFR-PRACH resources in the n-th time opportunity (e.g., "$T_n$", where n=1, 2, 3, etc.) spanning different preamble sequences (e.g., "$P_k$", where k=1, 2, etc.) may hold a beam correspondence relationship with one or more first RSs (e.g., the First RS 1, the First RS 2, the First RS 3) of the first cell 3305 and one or more second RSs (e.g., the Second RS 1, the Second RS 2, the Second RS 3) of the second cell 3303. The First RS 1 of the first cell 3305 may be associated with the BFR-PRACH-1 comprising a first preamble $P_2$, a time opportunity $T_1$, and a frequency index $F_1$. The Second RS 1 of the second cell 3303 may be associated with the BFR-PRACH-2 comprising a second preamble $P_1$, the time opportunity $T_1$, and the frequency index F1.

A wireless device (e.g., the wireless device 3001) may trigger a second BFRQ transmission, for example, after or in response to identifying a first RS (e.g., the Second RS 2 shown in FIG. 33) of a second cell in a candidate beam identification procedure. The wireless device may select the BFR-PRACH-2 resource on a first cell (e.g., the first cell 3305) for the second BFRQ transmission. The BFR-PRACH-2 resource may comprise a preamble $P_1$, a time opportunity $T_2$, and a frequency index $F_1$. The wireless device may send (e.g., transmit) the preamble $P_1$ on the time opportunity $T_2$ and the frequency index $F_1$. A base station may monitor one or more first BFR-PRACH resources and one or more second BFR-PRACH resources. The base station may infer (or determine) a cell identity associated with a beam failure and the first RS associated with a candidate beam. Referring to the example shown in FIG. 33, the base station may determine a cell identity associated with a beam failure (e.g., the second cell 3303) and the first RS associated with a candidate beam (e.g., the Second RS), for example, after or in response to receiving the preamble $P_1$ on the time opportunity $T_2$ and the frequency index $F_1$.

Figure 34:
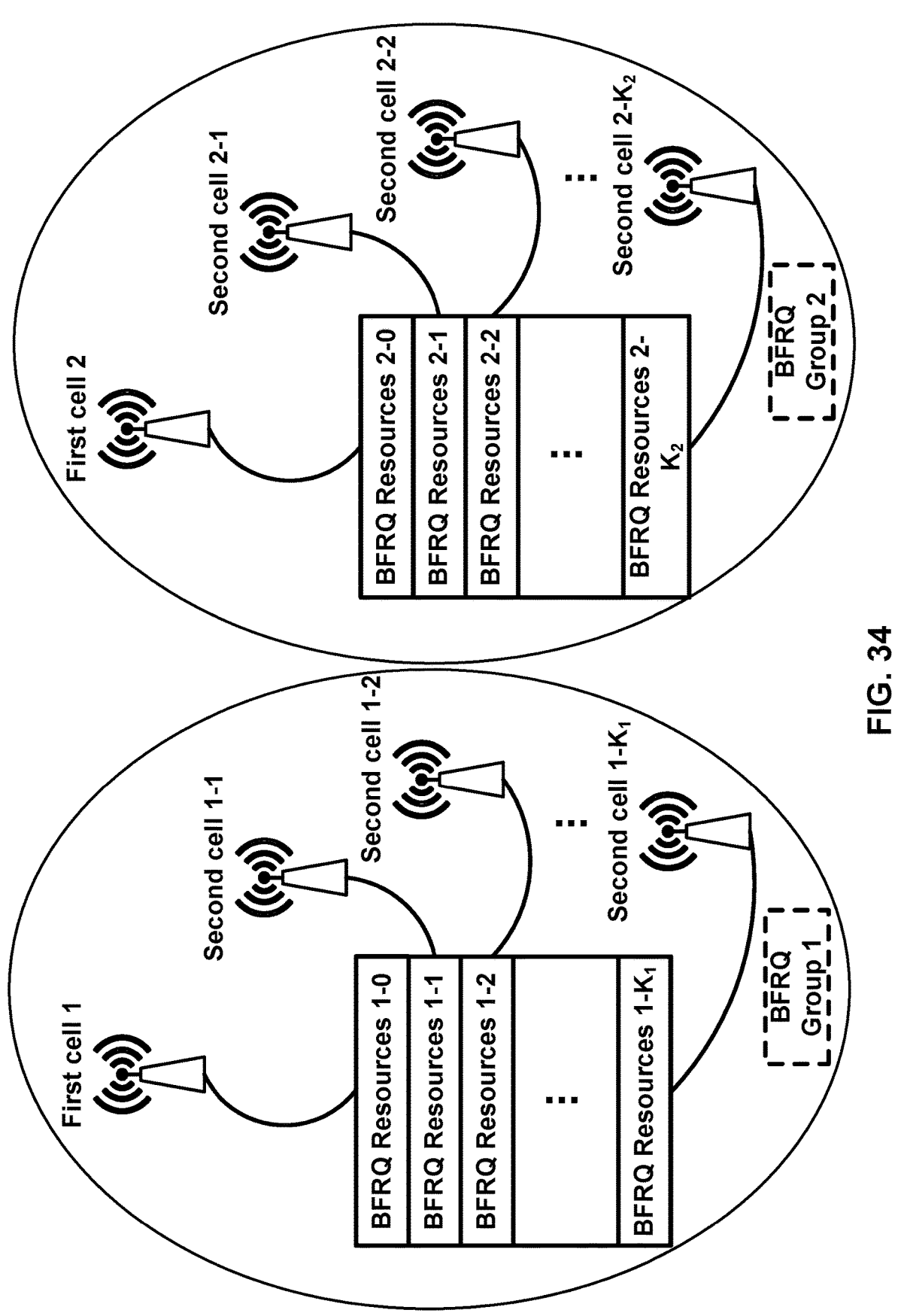
FIG. 34 shows examples of distributing the allocation of beam failure recovery request (BFRQ) resources to one or more cells.

Allocating one or more time and/or frequency resources on a cell (e.g., a primary cell) may increase the load on the Cell. A BFR procedure for a secondary cell may interrupt an uplink transmission on the primary cell, for example, as the wireless device uses the uplink channels (e.g., a PRACH) on the primary cell for the BFR procedure for the secondary cell. As shown in FIG. 34 and as described in more detail below, the enhanced beam failure recovery procedures described herein may distribute the allocation of resources to multiple cells. A first BFR group may comprise a primary cell, a first secondary cell-1 and a second secondary cell; and a second BFR group may comprise a third secondary cell, a fourth secondary cell, and a fifth secondary cell. The BFR resources for the primary cell, the first secondary cell, and the second secondary cell may be configured on the primary cell, and the BFR resources for the third secondary cell, the fourth secondary cell, and the fifth secondary cell may be configured on the third secondary cell. By distributing the allocation of resources to multiple cells, this may reduce the load on the primary cell, as otherwise compared to configuring the BFR resource for each cell (e.g., the primary cell, the first secondary cell, the second secondary cell, the third secondary cell, the fourth secondary cell, and the fifth secondary cell) on the primary cell, which would interrupt the operations on the primary cell and also limit the resources available on the primary cell. Accordingly, distributing the allocation of resources to multiple cells would reduce the amount of interruption occurring on the primary cell. Moreover, if one cell fails or is experience interruption issues, all other cells connected to the failing cell may also begin to fail. Thus, distributing the allocation of resources to multiple cells would increase the robustness and reliability of the system.

FIG. 34 shows examples of distributing the allocation of beam failure recovery request (BFRQ) resources to one or more cells. A plurality of cells may be grouped into one or more cell groups. A cell group (e.g., a BFRQ) may comprise a first cell (e.g. a PCell, a PUCCH SCell, a PsCell) and one or more second cells, for example, one or more SCells. A base station may configure multiple BFRQ resources (e.g., a BFR-PRACH) on the first cell. Each BFRQ resource of the multiple BFRQ resources may be associated with each of the first cell and the one or more second cells in the cell group. As shown in FIG. 34, the BFRQ-Group 1 may comprise the First cell 1 and a plurality of Second cells (e.g., the Second Cell 1-1, the Second Cell 1-2, ... the Second Cell 1-$K_1$). The plurality of Second cells and the First cell 1 may be grouped to utilize one or more BFRQ resources of the First cell 1. The one or more BFRQ resources of the First cell 1 may be orthogonal.

As shown in FIG. 34, a wireless device may trigger a BFRQ transmission on the BFRQ Resources 2-2 of the First cell 2, for example, after or in response to detecting a beam failure on the Second cell 2-2 of the BFRQ Group 2. The BFRQ Resources 2-2 may be orthogonal (e.g., TDM, FDM, CDM) to other BFRQ resources of the First cell 2, for example, the BFRQ Resources 2-0, the BFRQ Resources 2-1, the BFRQ Resources 2-$K_1$, etc. A BFRQ resource of the BFRQ Resources 2-2 may be associated with a first RS of the Second cell 2-2. The first RS may be determined in a candidate beam identification procedure of the Second cell 2-2. The BFRQ resource may comprise a preamble, a time opportunity, and a frequency index. The wireless device (e.g., the wireless device 3001) may send (e.g., transmit) the preamble on the time opportunity and the frequency index. A base station may monitor the BFRQ resources of the First cell 2. The base station may infer (or determine) a cell identity associated with a beam failure and the first RS associated with a candidate beam. As shown in FIG. 34, the base station may infer determine a cell identity associated with a beam failure (e.g., the Second cell 2-2) and determine the first RS associated with a candidate beam, for example, after or in response to receiving the preamble on the time opportunity and the frequency index.

A wireless device may receive from a base station one or more messages comprising one or more configuration parameters of a first cell and a second cell. The one or more configuration parameters may indicate a first RS of the second cell, a plurality of second RSs of the second cell, and/or a plurality of BRACH resources. Each of the BRACH resources may be associated with each of the plurality of second RSs of the second cell. Each of the BRACH resources may comprise a preamble and a PRACH resource of the first cell.

The wireless device may initiate a beam failure recovery procedure for the second cell, for example, after or in response to detecting a beam failure based on the first RS of the second cell. The wireless device may select a selected RS of the plurality of second RSs of the second cell, for example, after or in response to initiating the beam failure recovery procedure. The selected RS may be associated with a candidate beam.

The wireless device may send (e.g., transmit), on the first cell, the preamble via the PRACH resource of a BRACH resource of the plurality of BRACH resources of the first cell. The BRACH resource may be associated with the selected RS of the second cell.

Figure 35:
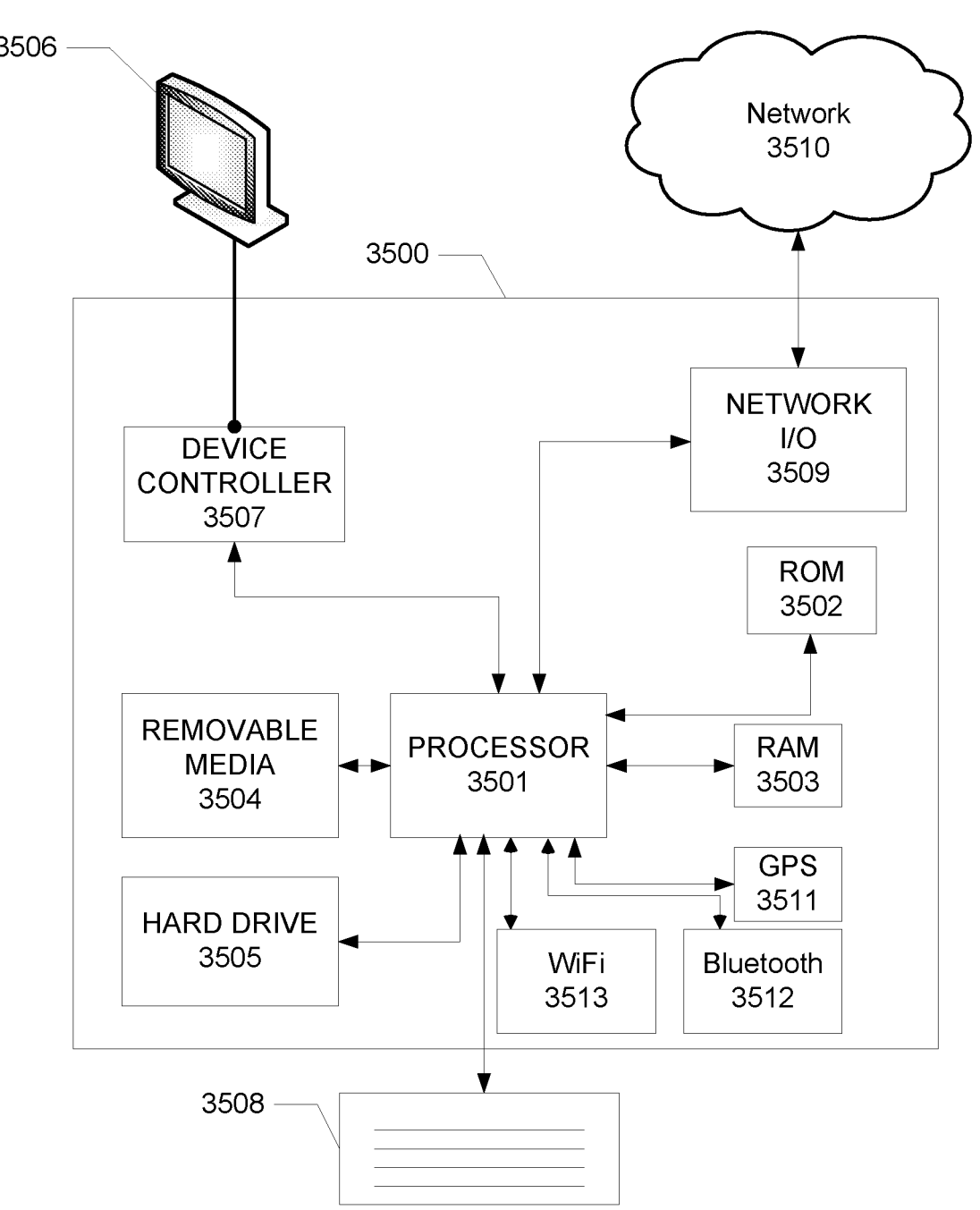
FIG. 35 shows example elements of a computing device that may be used to implement any of the various devices described herein.

FIG. 35 shows general hardware elements that may be used to implement any of the various computing devices discussed herein, including, e.g., the base station 120A and/or 120B, the wireless device 110 (e.g., 110A and/or 110B), or any other base station, wireless device, or computing device described herein. The computing device 3500 may include one or more processors 3501, which may execute instructions stored in the random access memory (RAM) 3503, the removable media 3504 (such as a Universal Serial Bus (USB) drive, compact disk (CD) or digital versatile disk (DVD), or floppy disk drive), or any other desired storage medium. Instructions may also be stored in an attached (or internal) hard drive 3505. The computing device 3500 may also include a security processor (not shown), which may execute instructions of one or more computer programs to monitor the processes executing on the processor 3501 and any process that requests access to any hardware and/or software components of the computing device 3500 (e.g., ROM 3502, RAM 3503, the removable media 3504, the hard drive 3505, the device controller 3507, a network interface 3509, a GPS 3511, a Bluetooth interface 3512, a WiFi interface 3513, etc.). The computing device XX00 may include one or more output devices, such as the display 3506 (e.g., a screen, a display device, a monitor, a television, etc.), and may include one or more output device controllers 3507, such as a video processor. There may also be one or more user input devices 3508, such as a remote control, keyboard, mouse, touch screen, microphone, etc. The computing device 3500 may also include one or more network interfaces, such as a network interface 3509, which may be a wired interface, a wireless interface, or a combination of the two. The network interface 3509 may provide an interface for the computing device 3500 to communicate with a network 3510 (e.g., a RAN, or any other network). The network interface 3509 may include a modem (e.g., a cable modem), and the external network 3510 may include communication links, an external network, an in-home network, a provider's wireless, coaxial, fiber, or hybrid fiber/coaxial distribution system (e.g., a DOCSIS network), or any other desired network. Additionally, the computing device 3500 may include a location-detecting device, such as a global positioning system (GPS) microprocessor 3511, which may be configured to receive and process global positioning signals and determine, with possible assistance from an external server and antenna, a geographic position of the computing device 3500.

The example in FIG. 35 may be a hardware configuration, although the components shown may be implemented as software as well. Modifications may be made to add, remove, combine, divide, etc. components of the computing device 3500 as desired. Additionally, the components may be implemented using basic computing devices and components, and the same components (e.g., processor 3501, ROM storage 3502, display 3506, etc.) may be used to implement any of the other computing devices and components described herein. For example, the various components described herein may be implemented using computing devices having components such as a processor executing computer-executable instructions stored on a computer-readable medium, as shown in FIG. 35. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions, and/or the like. There may be a plurality of base stations or a plurality of wireless devices in a coverage area that may not comply with the disclosed methods, for example, because those wireless devices and/or base stations perform based on older releases of LTE or 5G technology.

One or more features of the description may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the description, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the description. Accordingly, the foregoing description is by way of example only, and is not limiting.

What is claimed is:

1. A method comprising:
receiving, by a wireless device, one or more messages comprising one or more configuration parameters, wherein the one or more configuration parameters indicate an uplink resource, on an uplink bandwidth part of a cell, associated with beam failure recovery (BFR) for a cell group;
sending, by the wireless device, via the uplink resource on the uplink bandwidth part of the cell, and based on a first beam failure associated with a first cell of the cell group, a first uplink signal for BFR in one or more symbols of the uplink resource; and
sending, by the wireless device, via the uplink resource on the uplink bandwidth part of the cell, and based on a second beam failure associated with a second cell of the cell group, a second uplink signal for BFR in the one or more symbols of the uplink resource.

2. The method of claim 1, wherein the uplink resource comprises a physical uplink control channel (PUCCH) associated with a cell of the cell group.

3. The method of claim 1, further comprising detecting the first beam failure associated with the first cell of the cell group, wherein the detecting comprises:
determining that one or more first reference signals (RSs) of the first cell comprise a radio quality lower than a first threshold.

4. The method of claim 1, further comprising:
detecting, based on a block error rate (BLER), the first beam failure associated with the first cell of the cell group.

5. The method of claim 1, further comprising:
selecting a candidate reference signal (RS) from one or more second RSs of the first cell of the cell group, wherein the selected candidate RS is associated with a beam failure recovery request (BFRQ) resource, and wherein the selecting the candidate RS is before the sending the first uplink signal.

6. The method of claim 1, wherein a candidate reference signal (RS) from one or more second RSs of the first cell, of the cell group, comprises a radio quality higher than a second threshold.

7. The method of claim 6, further comprising:
determining, based on a layer-1 reference signal received power (L1-RSRP), the second threshold.

8. The method of claim 1, wherein the one or more configuration parameters further indicate:
one or more first reference signals (RSs) of the first cell of the cell group;
one or more second RSs of the first cell; or
one or more beam failure recovery request (BFRQ) resources associated with the second cell of the cell group.

9. The method of claim 1, wherein the one or more configuration parameters indicate:
a first preamble for BFR of the first cell of the cell group;
a second preamble for BFR of the second cell of the cell group, wherein the first preamble is different from the second preamble; and
a time-frequency resource associated with the first cell for the BFR of the first cell and the BFR of the second cell.

10. The method of claim 9, further comprising:
sending, by the wireless device, based on the first beam failure associated with the first cell, the first preamble via the time-frequency resource associated with the first cell to perform BFR of the first cell; and
sending, by the wireless device, based on the second beam failure associated with the second cell, the second preamble via the time-frequency resource associated with the first cell to perform BFR of the second cell.

11. A wireless device comprising:
one or more processors; and
memory storing instructions that, when executed by the one or more processors, cause the wireless device to:
receive one or more messages comprising one or more configuration parameters, wherein the one or more configuration parameters indicate an uplink resource, on an uplink bandwidth part of a cell, associated with beam failure recovery (BFR) for a cell group;
send, via the uplink resource on the uplink bandwidth part of the cell, and based on a first beam failure associated with a first cell of the cell group, a first uplink signal for BFR in one or more symbols of the uplink resource; and
send, via the uplink resource on the uplink bandwidth part of the cell, and based on a second beam failure associated with a second cell of the cell group, a second uplink signal for BFR in the one or more symbols of the uplink resource.

12. The wireless device of claim 11, wherein the uplink resource comprises a physical uplink control channel (PUCCH) associated with a cell of the cell group.

13. The wireless device of claim 11, wherein the instructions, when executed by the one or more processors, further cause the wireless device to detect the first beam failure associated with the first cell of the cell group by causing:
determining that one or more first reference signals (RSs) of the first cell comprise a radio quality lower than a first threshold.

14. The wireless device of claim 11, wherein the instructions, when executed by the one or more processors, further cause the wireless device to:
detect, based on a block error rate (BLER), the first beam failure associated with the first cell of the cell group.

15. The wireless device of claim 11, wherein the instructions, when executed by the one or more processors, further cause the wireless device to select, before sending the first uplink signal, a candidate reference signal (RS) from one or more second RSs of the first cell of the cell group, wherein the selected candidate RS is associated with a beam failure recovery request (BFRQ) resource.

16. The wireless device of claim 11, wherein a candidate reference signal (RS) from one or more second RSs of the first cell, of the cell group, comprises a radio quality higher than a second threshold.

17. The wireless device of claim 16, wherein the instructions, when executed by the one or more processors, further cause the wireless device to:

determine, based on a layer-1 reference signal received power (L1-RSRP), the second threshold.

18. The wireless device of claim 11, wherein the one or more configuration parameters further indicate:

one or more first reference signals (RSS) of the first cell of the cell group;

one or more second RSs of the first cell; or one or more beam failure recovery request (BFRQ) resources associated with the second cell of the cell group.

19. The wireless device of claim 11, wherein the one or more configuration parameters indicate:

a first preamble for BFR of the first cell of the cell group;

a second preamble for BFR of the second cell of the cell group, wherein the first preamble is different from the second preamble; and a time-frequency resource associated with the first cell for the BFR of the first cell and the BFR of the second cell.

20. The wireless device of claim 19, wherein the instructions, when executed by the one or more processors, further cause the wireless device to:

send, based on the first beam failure associated with the first cell, the first preamble via the time-frequency resource associated with the first cell to perform BFR of the first cell; and send, based on the second beam failure associated with the second cell, the second preamble via the time-frequency resource associated with the first cell to perform BFR of the second cell.

21. A method comprising:

sending, by a base station and to a wireless device, one or more messages comprising one or more configuration parameters, wherein the one or more configuration parameters indicate an uplink resource, on an uplink bandwidth part of a cell, associated with beam failure recovery (BFR) for a cell group;

receiving, from the wireless device, via the uplink resource on the uplink bandwidth part of the cell, and based on a first beam failure associated with a first cell of the cell group, a first uplink signal for BFR in one or more symbols of the uplink resource; and receiving, from the wireless device, via the uplink resource on the uplink bandwidth part of the cell, and based on a second beam failure associated with a second cell of the cell group, a second uplink signal for BFR in the one or more symbols of the uplink resource.

22. The method of claim 21, wherein the uplink resource comprises a physical uplink control channel (PUCCH) associated with a cell of the cell group.

23. The method of claim 21, wherein a candidate reference signal (RS) from one or more second RSs of the first cell of the cell group, comprises a radio quality higher than a second threshold.

24. The method of claim 21, wherein the one or more configuration parameters further indicate:

one or more first reference signals (RSs) of the first cell of the cell group;

one or more second RSs of the first cell; or one or more beam failure recovery request (BFRQ) resources associated with the second cell of the cell group.

25. The method of claim 21, wherein the one or more configuration parameters indicate:

a first preamble for BFR of the first cell of the cell group;

a second preamble for BFR of the second cell of the cell group, wherein the first preamble is different from the second preamble; and a time-frequency resource associated with the first cell for the BFR of the first cell and the BFR of the second cell.

26. The method of claim 21, wherein the one or more configuration parameters further comprise one or more of:

a first channel state information reference signal (CSI-RS); or a first synchronization signal (SS) block.

27. The method of claim 21, wherein the one or more configuration parameters further comprise one or more of:

a second channel state information reference signal (CSI-RS); or a second synchronization signal (SS) block.

28. A base station comprising:

one or more processors; and memory storing instructions that, when executed by the one or more processors, cause the base station to:

send, to a wireless device, one or more messages comprising one or more configuration parameters, wherein the one or more configuration parameters indicate an uplink resource, on an uplink bandwidth part of a cell, associated with beam failure recovery (BFR) for a cell group;

receive, from the wireless device, via the uplink resource on the uplink bandwidth part of the cell, and based on a first beam failure associated with a first cell of the cell group, a first uplink signal for BFR in one or more symbols of the uplink resource; and receive, from the wireless device, via the uplink resource on the uplink bandwidth part of the cell, and based on a second beam failure associated with a second cell of the cell group, a second uplink signal for BFR in the one or more symbols of the uplink resource.

29. The base station of claim 28, wherein the uplink resource comprises a physical uplink control channel (PUCCH) associated with a cell of the cell group.

30. The base station of claim 28, wherein a candidate reference signal (RS) from one or more second RSs of the first cell of the cell group, comprises a radio quality higher than a second threshold.

31. The base station of claim 28, wherein the one or more configuration parameters further indicate:

one or more first reference signals (RSs) of the first cell of the cell group;

one or more second RSs of the first cell; or one or more beam failure recovery request (BFRQ) resources associated with the second cell of the cell group.

32. The base station of claim 28, wherein the one or more configuration parameters indicate:

a first preamble for BFR of the first cell of the cell group;

a second preamble for BFR of the second cell of the cell group, wherein the first preamble is different from the second preamble; and a time-frequency resource associated with the first cell for the BFR of the first cell and the BFR of the second cell.

33. The base station of claim 28, wherein the one or more configuration parameters further comprise one or more of:

a first channel state information reference signal (CSI-RS); or a first synchronization signal (SS) block.

34. The base station of claim 28, wherein the one or more configuration parameters further comprise one or more of:

a second channel state information reference signal (CSI-RS); or a second synchronization signal (SS) block.

* * * * *